United States Patent
Katoh et al.

(10) Patent No.: US 9,285,171 B2
(45) Date of Patent: Mar. 15, 2016

(54) HEAT EXCHANGE SYSTEM AND VEHICLE REFRIGERATION CYCLE SYSTEM

(75) Inventors: Yoshiki Katoh, Chita-gun (JP); Satoshi Itoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 751 days.

(21) Appl. No.: 13/428,620

(22) Filed: Mar. 23, 2012

(65) Prior Publication Data

US 2012/0241139 A1    Sep. 27, 2012

(30) Foreign Application Priority Data

Mar. 25, 2011  (JP) .................................. 2011-067559
Mar. 30, 2011  (JP) .................................. 2011-075534

(51) Int. Cl.
| | |
|---|---|
| *F28D 1/04* | (2006.01) |
| *F28D 1/053* | (2006.01) |
| *B60H 1/00* | (2006.01) |
| *F28D 21/00* | (2006.01) |

(52) U.S. Cl.
CPC .......... *F28D 1/0426* (2013.01); *B60H 1/00042* (2013.01); *B60H 1/00335* (2013.01); *B60H 1/00921* (2013.01); *F28D 1/05391* (2013.01); *B60H 2001/00942* (2013.01); *F28D 2021/0096* (2013.01)

(58) Field of Classification Search
CPC .............. F28D 1/0426; F28D 1/05391; F28D 2021/0096; B60H 1/00335; B60H 1/00921; B60H 1/00042; B60H 2001/00942
USPC .............. 62/239; 165/202, 43, 65, 104.19, 61
See application file for complete search history.

(56) References Cited

U.S. PATENT DOCUMENTS

| | | | | |
|---|---|---|---|---|
| 5,299,431 A | * | 4/1994 | Iritani ................ | B60H 1/00021 62/159 |
| 5,975,191 A | * | 11/1999 | Ohashi ............... | B60H 1/00035 165/43 |
| 6,125,643 A | * | 10/2000 | Noda ................. | B60H 1/00914 165/202 |

(Continued)

FOREIGN PATENT DOCUMENTS

| | | |
|---|---|---|
| JP | 05-272882 | 10/1993 |
| JP | 05272882 A * | 10/1993 |

(Continued)

OTHER PUBLICATIONS

Office action dated Jun. 11, 2013 in corresponding Japanese Application No. 2011-067559.

(Continued)

*Primary Examiner* — Frantz Jules
*Assistant Examiner* — Martha Tadesse
(74) *Attorney, Agent, or Firm* — Harness, Dickey & Pierce, P.L.C.

(57) ABSTRACT

A unified heat exchanger includes a first heat exchanging arrangement and a second heat exchanging arrangement. The first heat exchanging arrangement is adapted to exchange heat between high pressure refrigerant and conditioning air. The second heat exchanging arrangement is adapted to exchange heat between low pressure refrigerant and the conditioning air. The first heat exchanging arrangement and the second heat exchanging arrangement are integrated together and are arranged to enable heat exchange of the conditioning air with both of the high pressure refrigerant and the low pressure refrigerant.

20 Claims, 15 Drawing Sheets

(56) References Cited

U.S. PATENT DOCUMENTS

| | | | | |
|---|---|---|---|---|
| 6,237,357 | B1 * | 5/2001 | Hirao | B60H 1/004 62/239 |
| 6,755,046 | B2 * | 6/2004 | Nishida | B60H 1/00921 62/239 |
| 2003/0079873 | A1 * | 5/2003 | Kuroda | B60H 1/00735 165/202 |
| 2004/0060316 | A1 * | 4/2004 | Ito | B60H 1/00328 62/324.1 |
| 2004/0163398 | A1 * | 8/2004 | Morishita | B60H 1/00278 62/186 |
| 2010/0251741 | A1 * | 10/2010 | Yoshimi | F25B 1/10 62/324.5 |
| 2013/0061631 | A1 | 3/2013 | Katoh | |

FOREIGN PATENT DOCUMENTS

| | | | |
|---|---|---|---|
| JP | 06-050675 | | 2/1994 |
| JP | 05-272882 | * | 3/1994 |
| JP | 8-258548 | | 10/1996 |
| JP | 09-039553 | | 2/1997 |
| JP | 10-100663 | * | 3/1998 |
| JP | 10-100663 | | 4/1998 |
| JP | 10100663 A | * | 4/1998 |
| JP | 3275415 | | 2/2002 |
| JP | 2002-340437 | | 11/2002 |
| JP | 2003-237357 | | 8/2003 |
| JP | 2003237357 A | * | 8/2003 |
| JP | 4023320 | | 12/2007 |
| JP | 2010-006153 | | 1/2010 |

OTHER PUBLICATIONS

Office action dated Jun. 11, 2013 in corresponding Japanese Application No. 2011-075534.

U.S. Appl. No. 13/884,086, filed May 8, 2013, Katoh.

* cited by examiner

HEAT EXCHANGE SYSTEM AND VEHICLE REFRIGERATION CYCLE SYSTEM

CROSS REFERENCE TO RELATED APPLICATION

This application is based on and incorporates herein by reference Japanese Patent Application No. 2011-67559 filed on Mar. 25, 2011 and Japanese Patent Application No. 2011-75534 filed on Mar. 30, 2011.

TECHNICAL FIELD

The present disclosure relates to a heat exchange system and a vehicle refrigeration cycle system.

BACKGROUND

A heat exchange system, which includes a unified heat exchanger that enables heat exchange between fluids of different types, is known (see, for example, JP3275415B2, or JP4311115B2 (corresponding to US20040060316A1).

Specifically, JP3275415B2 teaches a heat exchange system that includes a unified heat exchanger having a heating heat exchanging arrangement and a heater core, which are integrated together. The heating heat exchanging arrangement exchanges heat between refrigerant (first fluid), which is outputted from a compressor, and conditioning air (subject heat exchanging fluid) to be blown into a vehicle cabin to heat the conditioning air. The heater core exchanges heat between brine (second fluid), which is heated by a water heater of a combustion type, and the conditioning air (subject heat exchanging fluid) to heat the conditioning air.

JP4311115B2 (corresponding to US20040060316A1) teaches a heat exchange system, which includes a unified heat exchanger having the heating heat exchanging arrangement and a heater core, which are integrated together. The heating heat exchanger is similar to that of JP3275415B2. The heater core of JP4311115B2 (corresponding to US20040060316A1) exchanges heat between engine coolant (second fluid), which cools the engine, and the conditioning air (subject heat exchanging fluid) to heat the conditioning air.

However, JP3275415B2 and JP4311115B2 (corresponding to US20040060316A1) merely teach the heat exchange system, which heats the subject heat exchanging fluid by releasing the heat of the first or second fluid (the refrigerant, the brine or the engine coolant), which has the temperature higher than that of the subject heat exchanging fluid, at the unified heat exchanger to heat the subject heat exchanging fluid. Specifically, the heat exchange system of JP3275415B2 or JP4311115B2 (corresponding to US20040060316A1) functions only as the heating heat exchanger, which heats the subject heat exchanging fluid by the heat of the first or second fluid, and does not have a function of adjusting the temperature of the subject heat exchanging fluid, so that the temperature of the subject heat exchanging fluid cannot be adjusted to a desired temperature.

Furthermore, in a previously proposed vehicle refrigeration cycle system, which is applied to a vehicle (e.g., an electric vehicle or a hybrid vehicle) that does not have a dedicated heat source for heating a vehicle cabin, an indoor heat exchanger is used to cool or heat cabin conditioning air to be blown into the vehicle cabin. Specifically, at the time of cooling operation of the vehicle cabin, the indoor heat exchanger is used as an evaporator to cool the cabin conditioning air. At the time of heating operation of the vehicle cabin, the indoor heat exchanger is used as a radiator to heat the cabin conditioning air. This switching of the operation of the indoor heat exchanger between the cooling operation and the heating operation is achieved through switching of a flow of refrigerant in the cycle.

However, at the time of switching the operation from the cooling operation to the heating operation (at the time of switching the function of the indoor heat exchanger from the evaporator to the radiator), droplets of water (dew), which adhere to an outer surface of the indoor heat exchanger, are evaporated to cause an increase in a humidity of the cabin conditioning air, and the cabin conditioning air having the high humidity disadvantageously causes window condensation (condensation of moisture on a window glass) in the inside of the vehicle cabin.

In order to address such a disadvantage. Japanese patent JP3538845B2 (corresponding to U.S. Pat. No. 5,299,431A) teaches placement of an evaporator, which evaporates low pressure refrigerant, and a radiator, which radiates heat of high pressure refrigerant, in a casing that conducts the cabin conditioning air to be blown into the vehicle cabin. The radiator is used to heat the cabin conditioning air, and the evaporator is used to cool the cabin conditioning air. That is, according to Japanese patent JP3538845B2 (corresponding to U.S. Pat. No. 5,299,431A), the radiator, which heats the cabin conditioning air, and the evaporator, which cools the cabin conditioning air, are separately provided in the casing, so that the blowing of the cabin conditioning air having the high humidity into the cabin at the time of switching from the cooling operation to the heating operation is advantageously limited.

Here, it should be noted that in some cases, a temperature of first subject heat exchanging fluid, which is used to adjust a temperature of a first temperature adjusting subject, and a temperature of second subject heat exchanging fluid, which is used to adjust a temperature of a second temperature adjusting subject, are adjusted in the vehicle refrigeration cycle system.

For instance, a temperature of front seat side conditioning air to be blown into a front seat side space of the vehicle cabin and a temperature of rear seat side conditioning air to be blown into a rear seat side space of the vehicle cabin may be adjusted in the vehicle refrigeration cycle system. Alternatively, a temperature of the cabin conditioning air to be blown into the vehicle cabin and a temperature of heating medium, which adjusts a temperature of a subject operational device in the vehicle, may be adjusted.

In such a case, the vehicle refrigeration cycle system needs to have a second heat exchanging mechanism, which adjusts the temperature of the second subject heat exchanging fluid, in addition to the first heat exchanging mechanism (e.g., the evaporator and the radiator), which adjusts the temperature of the first subject heat exchanging fluid.

However, when the vehicle air conditioning system of Japanese patent JP3538845B2 (corresponding to U.S. Pat. No. 5,299,431A) is applied to such a structure, it is required to provide the evaporator and the radiator to each of the first and second heat exchanging mechanisms. Therefore, it may be difficult to have a sufficient installation space for installing the vehicle refrigeration cycle system in the vehicle, thereby resulting in deterioration in installability of the vehicle refrigeration cycle in the vehicle.

SUMMARY

The present disclosure is made in view of the above disadvantages.

According to the present disclosure, there is provided a heat exchange system, which includes a unified heat exchanger. The unified heat exchanger includes a first heat exchanging arrangement and a second heat exchanging arrangement. The first heat exchanging arrangement is adapted to exchange heat between first fluid and subject heat exchanging fluid. The second heat exchanging arrangement is adapted to exchange heat between second fluid and the subject heat exchanging fluid. A temperature of the first fluid, which is supplied to the first heat exchanging arrangement is different from a temperature of the second fluid, which is supplied to the second heat exchanging arrangement. The first heat exchanging arrangement and the second heat exchanging arrangement are integrated together and are arranged to enable heat exchange of the subject heat exchanging fluid with both of the first fluid and the second fluid. The temperature of the subject heat exchanging fluid at the unified heat exchanger is adjustable by adjusting at least one of an amount of heat exchange between the first fluid and the subject heat exchanging fluid at the first heat exchanging arrangement and an amount of heat exchange between the second fluid and the subject heat exchanging fluid at the second heat exchanging arrangement.

According to the present disclosure, there is also provided a vehicle refrigeration cycle system that is adapted to adjust a temperature of first subject heat exchanging fluid, which is used to adjust a temperature of a first heat adjusting subject in a vehicle, and a temperature of a second subject heat exchanging fluid, which is used to adjust a temperature of a second heat adjusting subject in the vehicle. The vehicle refrigeration cycle system includes a compressor, a radiator, a depressurizing mechanism, an evaporator and a unified heat exchanger. The compressor is adapted to compress and discharge refrigerant. The radiator is adapted to release heat from the refrigerant outputted from the compressor. The depressurizing mechanism is adapted to depressurize the refrigerant outputted from the radiator. The evaporator is adapted to evaporate the refrigerant depressurized through the depressurizing mechanism. The unified heat exchanger includes a first heat exchanging arrangement, which is adapted to receive the refrigerant as high pressure refrigerant, and a second heat exchanging arrangement, which is adapted to receive the refrigerant as low pressure refrigerant. At least one of the radiator and the evaporator is used to adjust the temperature of the first subject heat exchanging fluid. The unified heat exchanger is used to adjust the temperature of the second subject heat exchanging fluid. The first heat exchanging arrangement is adapted to exchange heat between the high pressure refrigerant and the second subject heat exchanging fluid. The second heat exchanging arrangement is adapted to exchange heat between the low pressure refrigerant and the second subject heat exchanging fluid. The first heat exchanging arrangement and the second heat exchanging arrangement are integrated together and are arranged to enable heat exchange of the second subject heat exchanging fluid with both of the high pressure refrigerant and the low pressure refrigerant.

According to the present disclosure, there is also provided a vehicle refrigeration cycle system that is adapted to adjust a temperature of first subject heat exchanging fluid, which is used to adjust a temperature of a first heat adjusting subject in a vehicle, and a temperature of a second subject heat exchanging fluid, which is used to adjust a temperature of a second heat adjusting subject in the vehicle. The vehicle refrigeration cycle system includes a compressor, a first utilizing side heat exchanger, an outdoor heat exchanger, a depressurizing mechanism, a second utilizing side heat exchanger, a refrigerant flow path switching mechanism and a unified heat exchanger. The compressor is adapted to compress and discharge refrigerant. The first utilizing side heat exchanger is adapted to exchange heat between the refrigerant and the first subject heat exchanging fluid. The outdoor heat exchanger is adapted to exchange heat between the refrigerant and outside air. The depressurizing mechanism is adapted to depressurize the refrigerant. The second utilizing side heat exchanger is adapted to exchange heat between the refrigerant and the first subject heat exchanging fluid. The refrigerant flow path switching mechanism is adapted to switch between a refrigerant flow path that guides the refrigerant, which is outputted from the compressor as high pressure refrigerant, to the first utilizing side heat exchanger, and a refrigerant flow path that guide the refrigerant, which is outputted from the depressurizing mechanism, to the second utilizing side heat exchanger. The unified heat exchanger includes a first heat exchanging arrangement, which is adapted to receive the high pressure refrigerant, and a second heat exchanging arrangement, which is adapted to receive the low pressure refrigerant. The unified heat exchanger is used to adjust the temperature of the second subject heat exchanging fluid. The first heat exchanging arrangement is adapted to exchange heat between the high pressure refrigerant and the second subject heat exchanging fluid. The second heat exchanging arrangement is adapted to exchange heat between the low pressure refrigerant and the second subject heat exchanging fluid. The first heat exchanging arrangement and the second heat exchanging arrangement are integrated together and are arranged to enable heat exchange of the second subject heat exchanging fluid with both of the high pressure refrigerant and the low pressure refrigerant.

BRIEF DESCRIPTION OF THE DRAWINGS

The drawings described herein are for illustration purposes only and are not intended to limit the scope of the present disclosure in any way.

DETAILED DESCRIPTION

Figure 1:
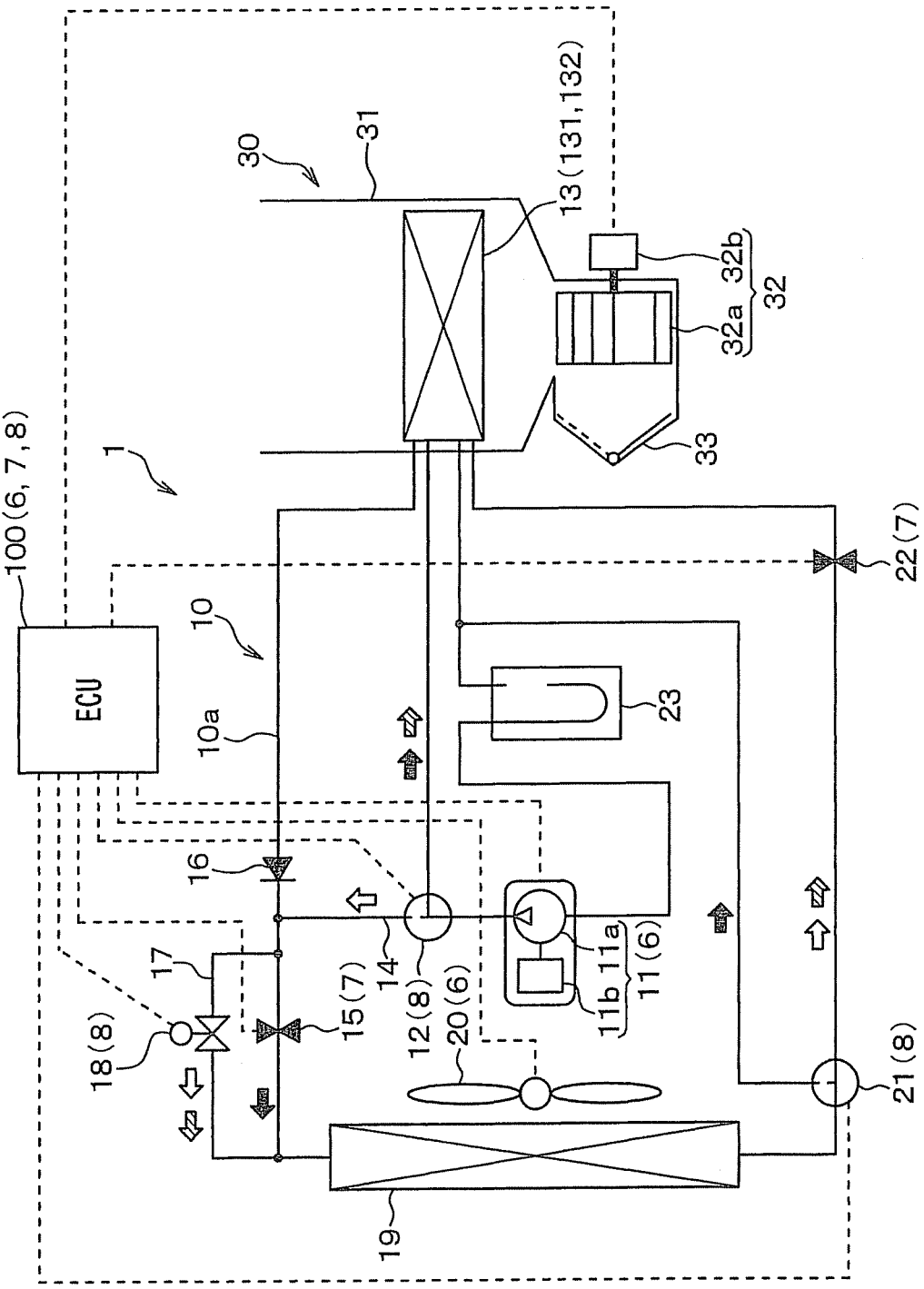
FIG. 1 is a schematic diagram showing a structure of a vehicle air conditioning system according to a first embodiment of the present disclosure.

Various embodiments of the present disclosure will be described with reference to the accompanying drawings. In each of the following embodiments, similar components are indicated by the same reference numerals.

First Embodiment

A first embodiment of the present disclosure will be described with reference to FIGS. 1 to 5. In the present embodiment, a heat exchange system of the present disclosure is applied to a vehicle air conditioning system 1 of an electric vehicle that uses a vehicle drive electric motor to generate its vehicle drive force. FIG. 1 is a schematic diagram showing a structure of the vehicle air conditioning system 1 of the present embodiment.

The heat exchange system of the present embodiment, which is applied to the vehicle air conditioning system 1, includes a unified heat exchanger 13 of a vehicle refrigeration cycle system (also referred to as a heat pump cycle) 10 of a vapor compression type.

In the vehicle air conditioning system of the present embodiment, the vehicle refrigeration cycle system 10 heats or cools the air to be blown into a vehicle cabin, which is an air conditioning subject space of the vehicle. Specifically, the vehicle refrigeration cycle system 10 can perform both of a heating operation and a cooling operation by switching a refrigerant flow path in a refrigerant circuit passage (also referred to as a fluid circuit passage) 10a, through which refrigerant is circulated. In the heating operation, the air (hereinafter referred to as cabin conditioning air) to be blown into the vehicle cabin is heated to heat the vehicle cabin. In the cooling operation, the cabin conditioning air is cooled to cool the vehicle cabin.

Furthermore, the vehicle refrigeration cycle system 10 can perform a dehumidifying and heating operation, which dehumidifies and adjusts the temperature of the cabin conditioning air. In FIG. 1, white open arrows (blank arrows) indicate a flow of refrigerant (serving as temperature-adjustable fluid) in the refrigerant circuit passage 10a during the cooling operation, and black arrows indicate a flow of the refrigerant in the refrigerant circuit passage 10a during the heating operation. Furthermore, hatched arrows indicate a flow of the refrigerant in the refrigerant circuit passage 10a during the dehumidifying and heating operation.

Furthermore, the vehicle refrigeration cycle system 10 of the present embodiment uses a typical chlorofluorocarbon refrigerant as the refrigerant thereof and forms a subcritical refrigeration cycle, in which the pressure of high pressure refrigerant does not exceed beyond a critical pressure of the refrigerant. In the present embodiment, lubricating oil is mixed into the refrigerant to circulate the refrigerant through a compressor 11, which will be described later, so that the lubricating oil is circulated through the vehicle refrigeration cycle system 10.

The compressor 11 is placed in an engine room (not shown) of the vehicle. The compressor 11 draws and discharges the refrigerant upon compressing the same in the vehicle refrigeration cycle system 10. The compressor 11 is an electric compressor and includes a fixed displacement compressor device 11a, which has a fixed discharge rate and is driven by an electric motor 11b. The fixed displacement compressor device 11a may be a scroll compressor device, a vane compressor device or any other suitable type of compressor device.

The operation (rotational speed) of the electric motor 11b is controlled by a control signal, which is outputted from an electronic control unit (ECU) 100, which is also referred to as a control device and will be described later. The electric motor 11b may be a direct current (DC) motor or an alternating current (AC) motor. The refrigerant discharge rate of the compressor 11 is changed through this rotational speed control operation of the electric motor 11b. Therefore, in the present embodiment, the electric motor 11b functions as a discharge rate changing device or mechanism (a discharge rate changing means) of the compressor 11.

An inlet of a first three-way valve 12 of an electric type is connected to an outlet of the compressor 11. The operation of the first three-way valve 12 is controlled by a control signal (control voltage), which is outputted from the control unit 100 described later.

More specifically, the first three-way valve 12 switches the refrigerant flow path to the one that connects between the outlet of the compressor 11 and an inlet of a first heat exchanging arrangement 131 of the unified heat exchanger 13 described later during the heating operation and the dehumidifying and heating operation. Furthermore, the first three-way valve 12 switches the refrigerant flow path to the other one that connects between the outlet of the compressor 11 and an inlet of a heat exchanger bypass passage 14, which conducts the refrigerant discharged from the compressor 11 while bypassing the unified heat exchanger 13, during the cooling operation. The heat exchanger bypass passage 14 is connected to an outlet of the first heat exchanging arrangement 131 of the unified heat exchanger 13. As discussed above, the first three-way valve 12 can switch the refrigerant flow path of the vehicle refrigeration cycle system 10. Therefore, the first three-way valve 12 functions as a refrigerant flow path switching device or mechanism (refrigerant flow path switching means).

The unified heat exchanger 13 of the present embodiment is a heat exchanger that is placed in a casing 31 of an indoor air conditioning unit 30 and exchanges heat between the refrigerant, which flows in the inside of the unified heat exchanger 13, and the cabin conditioning air.

The unified heat exchanger 13 includes the first heat exchanging arrangement 131 and a second heat exchanging arrangement 132. The first heat exchanging arrangement 131 exchanges the heat between the high pressure refrigerant of the vehicle refrigeration cycle system 10 and the cabin conditioning air. The second heat exchanging arrangement 132 exchanges the heat between low pressure refrigerant and the cabin conditioning air. In the present embodiment, the high pressure refrigerant corresponds to first fluid (temperature-adjustable fluid having a first temperature state), and the low pressure refrigerant corresponds to second fluid (temperature-adjustable fluid having a second temperature state, which is different from the first temperature state). The cabin conditioning air corresponds to subject heat exchanging fluid. Now, the structure of the unified heat exchanger 13 will be described in detail.

A first fixed choke 15 is connected to the outlet of the first heat exchanging arrangement 131 of the unified heat exchanger 13 and functions as a first depressurizing device (first depressurizing means) of a depressurizing mechanism 7, which depressurizes and expands the refrigerant that is outputted from the first heat exchanging arrangement 131 through the check valve 16 at the time of executing the heating operation. The first fixed choke 15 may be, for example, an orifice or a capillary tube. An inlet of an outdoor heat exchanger 19, which will be described later, is connected to an outlet of the first fixed choke 15.

The check valve 16 serves as a backflow limiting device or mechanism (backflow limiting means), which enables flow of the refrigerant from the outlet of the first heat exchanging arrangement 131 to an inlet of the first fixed choke 15 and disables flow of the refrigerant from the inlet of the first fixed choke 15 to the outlet of the first heat exchanging arrangement 131. The check valve 16 can limit the flow of the refrigerant from the heat exchanger bypass passage 14 to the outlet of the first heat exchanging arrangement 131 of the unified heat exchanger 13.

A fixed choke bypass passage 17 is connected to the outlet of the first heat exchanging arrangement 131 of the unified heat exchanger 13 through the check valve 16. The fixed choke bypass passage 17 conducts the refrigerant from the check valve 16 toward the outdoor heat exchanger 19 while bypassing the first fixed choke 15.

An opening and closing valve 18, which opens or closes (fully opens or fully closes) the fixed choke bypass passage 17, is installed in the fixed choke bypass passage 17. The opening and closing valve 18 is a solenoid valve, which is controlled to be opened or closed by a control signal (control voltage) outputted from the control unit 100.

Furthermore, the pressure loss of the refrigerant, which is generated at the time of passing through the opening and closing valve 18, is very low in comparison to the pressure loss of the refrigerant, which is generated at the time of passing through the first fixed choke 15. Therefore, each of the refrigerant, which is outputted from the first heat exchanging arrangement 131 of the unified heat exchanger 13, and the refrigerant, which is outputted from the heat exchanger bypass passage 14, is supplied to the inlet of the outdoor heat exchanger 19 through the fixed choke bypass passage 17 in the case where the opening and closing valve 18 is opened and is supplied to the inlet of the outdoor heat exchanger 19 through the first fixed choke 15 in the case where the opening and closing valve 18 is closed.

As discussed above, the opening and closing valve 18 can switch the refrigerant flow path of the vehicle refrigeration cycle system 10. Therefore, the opening and closing valve 18 of the present embodiment functions as a refrigerant flow path switching device (refrigerant flow path switching means), which cooperates with the first three-way valve 12 to form a refrigerant flow path switching mechanism 8. In place of the opening and closing valve 18, it is possible to provide an electric three-way valve that switches between the refrigerant flow path, which connects the outlet of the first heat exchanging arrangement 131 of the unified heat exchanger 13 and the outlet of the heat exchanger bypass passage 14 to the inlet of the first fixed choke 15, and the refrigerant flow path, which connects the outlet of the unified heat exchanger 13 and the outlet of the heat exchanger bypass passage 14 to the inlet of the fixed choke bypass passage 17.

The outdoor heat exchanger 19 exchanges the heat between the refrigerant, which flows in the inside of the outdoor heat exchanger 19, and the outside air, which is blown by the blower fan 20. The outdoor heat exchanger 19 is placed in the engine room. At the time of executing the heating operation, the outdoor heat exchanger 19 functions as an evaporator, at which the low pressure refrigerant is evaporated to absorb the heat. In contrast, at the time of executing the cooling operation and the dehumidifying and heating operation, the outdoor heat exchanger 19 functions as a radiator, at which the heat is radiated from the high pressure refrigerant.

The blower fan 20 is an electric blower, a rotational speed (air delivery rate of the outside air) of which is controlled by a control signal (control voltage) that is outputted from the control unit 100 described later. The blower fan 20 functions as an outside air blowing device or mechanism (outside air blowing means), which blows the outside air toward the outdoor heat exchanger 19.

A second three-way valve 21, which is an electric three-way valve, is connected to the outlet of the outdoor heat exchanger 19. The operation of the second three-way valve 21 is controlled by a control signal (control voltage), which is outputted from the control unit 100 described later.

More specifically, at the time of executing the cooling operation and the time of executing the dehumidifying and heating operation, the second three-way valve 21 switches to the refrigerant flow path, which connects between the outlet of the outdoor heat exchanger 19 and the inlet of the second fixed choke 22. At the time of executing the heating operation, the second three-way valve 21 switches to the refrigerant flow path, which connects between the outlet of the outdoor heat exchanger 19 and an accumulator 23 described later. The second three-way valve 21 functions as a refrigerant flow path switching device (refrigerant flow path switching means) and cooperates with the first three-way valve 12 and the opening and closing valve 18 to form the refrigerant flow path switching mechanism 8.

The second fixed choke 22 functions as a second depressurizing device (second depressurizing means) of the depressurizing mechanism 7 that depressurizes and expands the refrigerant, which is outputted from the outdoor heat exchanger 19, at the time of executing the cooling operation and the time of executing the dehumidifying and heating operation. A basic structure of the second fixed choke 22 is the same as that of the first fixed choke 15. The outlet of the second fixed choke 22 is connected to the inlet of the second heat exchanging arrangement 132 of the unified heat exchanger 13. Therefore, the low pressure refrigerant, which is depressurized and expanded at the second fixed choke 22, is supplied to the second heat exchanging arrangement 132 of the unified heat exchanger 13.

An inlet of the accumulator 23 is connected to the outlet of the second heat exchanging arrangement 132 of the unified heat exchanger 13. The accumulator 23 is a gas-liquid separator that separates the refrigerant supplied thereto into the gas-phase refrigerant and the liquid-phase refrigerant and accumulates the excessive refrigerant of the cycle. An inlet of the compressor 11 is connected to a gas-phase refrigerant outlet of the accumulator 23. Therefore, the accumulator 23 has the function of limiting supply of the liquid-phase refrigerant to the compressor 11 and thereby limiting the compression of the liquid phase refrigerant in the compressor 11.

Next, the indoor air conditioning unit 30 will be described. The indoor air conditioning unit 30 is placed in an inside of an instrument panel, which is placed at a front part of the vehicle cabin. The indoor air conditioning unit 30 includes a blower 32 and the unified heat exchanger 13 received in the casing 31, which forms an outer shell of the indoor air conditioning unit 30.

The casing 31 forms an air passage of the cabin conditioning air and is made of a resin material (e.g., polypropylene), which has resiliency and a relatively high strength. An inside-air and outside-air switching device 33 is placed at an upstream end portion of the casing 31 in the flow direction of the air. The inside-air and outside-air switching device 33 switches between the inside air (the air in the inside of the vehicle cabin) and the outside air (the air at the outside of the vehicle cabin).

An inside-air inlet, through which the inside air is guided into the casing 31, and an outside-air inlet, through which the outside air is guided into the casing 31, are formed in the inside-air and outside-air switching device 33. Furthermore, an inside-air and outside-air switching door is placed in the inside of the inside-air and outside-air switching device 33. The inside-air and outside-air switching door is adapted to linearly adjust an opening area of the inside-air inlet and an opening area of the outside-air inlet to change a ratio between the flow quantity of the inside air and the flow quantity of the outside air supplied to the inside of the casing 31.

The blower 32, which blows the air guided thereto through the inside-air and outside-air switching device 33 into the vehicle cabin, is placed on the downstream side of the inside-air and outside-air switching device 33. The blower 32 is an electric blower, which includes a centrifugal multi-blade fan (a sirocco fan) 32a and an electric motor 32b. The electric motor 32b drives the centrifugal multi-blade fan 32a. A rotational speed (air flow quantity) of the centrifugal multi-blade fan 32a and thereby of the electric motor 32b is controlled by a control signal (control voltage) that is outputted from the control unit 100.

The unified heat exchanger 13 is placed on the downstream side of the blower 32 in the flow direction of the air. Air outlets (not shown) are placed at a downstream end portion of the casing 31 to blow the cabin conditioning air, the temperature of which is adjusted through the unified heat exchanger 13, toward the vehicle cabin that is the air conditioning subject space. Specifically, the air outlets include a face-side air outlet(s), afoot-Side air outlet(s) and a defroster air outlet(s). The face-side air outlet is provided to blow the cabin conditioning air toward an upper half of a body of an occupant of the vehicle. The foot-side air outlet is provided to blow the cabin conditioning air toward feet of the occupant. The defroster air outlet is provided to blow the cabin conditioning air toward an inside surface of a vehicle front window glass (windshield).

A face-side door (not shown) is placed on an upstream side of the face-side air outlet to adjust an opening area of the face-side air outlet. A foot-side door (not shown) is placed on an upstream side of the foot-side air outlet to adjust an opening area of the foot-side air outlet. A defroster door (not shown) is placed on an upstream side of the defroster air outlet to adjust an opening area of the defroster air outlet.

The face-side door, the foot-side door and the defroster door function as air outlet mode changing devices (air outlet mode changing means) of an air outlet mode changing mechanism, which changes an air outlet mode and is driven by a servomotor (not shown) that is controlled by a control signal outputted from the control unit 100 described below thorough, for example, a link mechanism.

Figure 2:
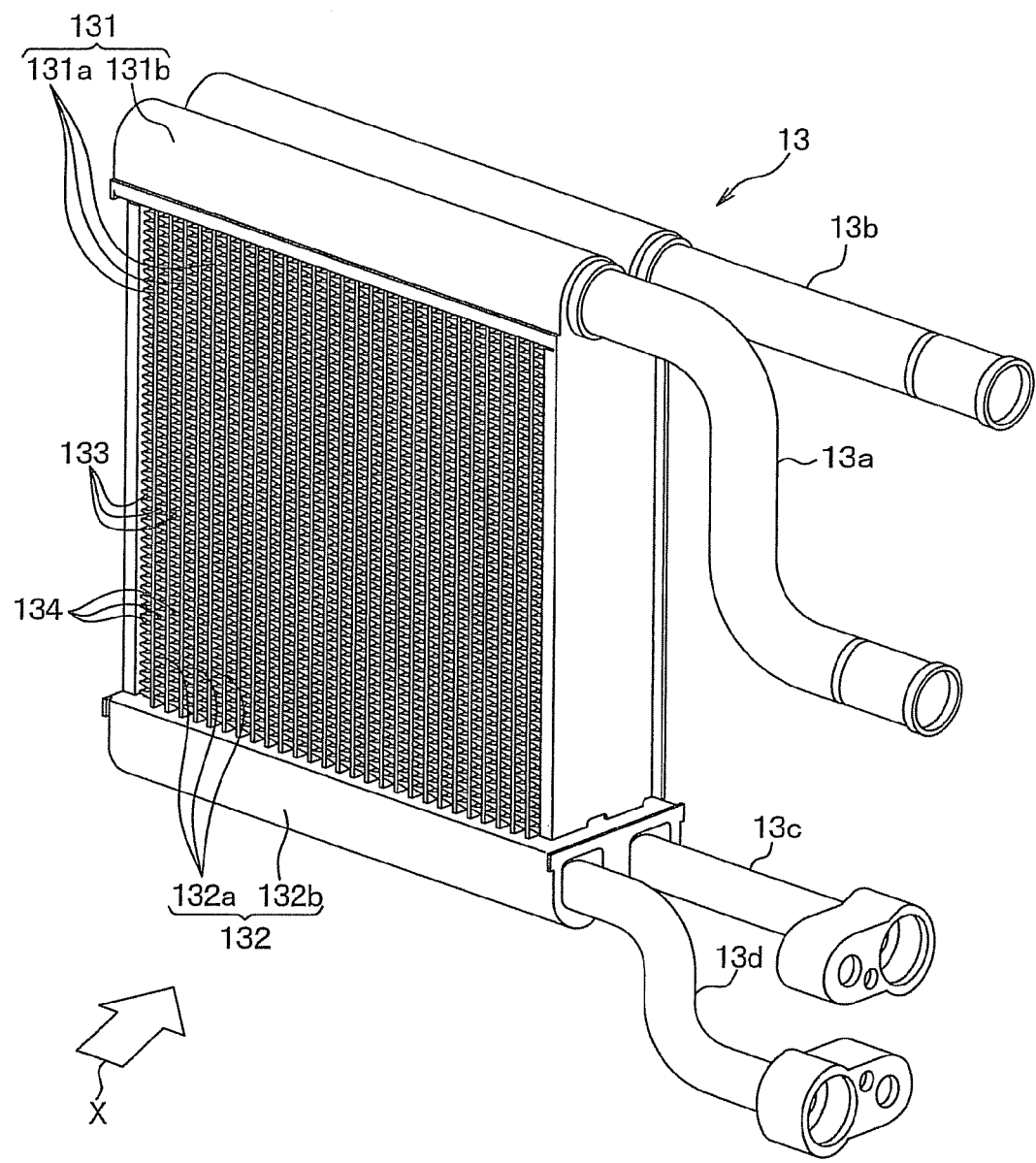
FIG. 2 is a perspective view of a unified heat exchanger of the first embodiment.
Figure 3:
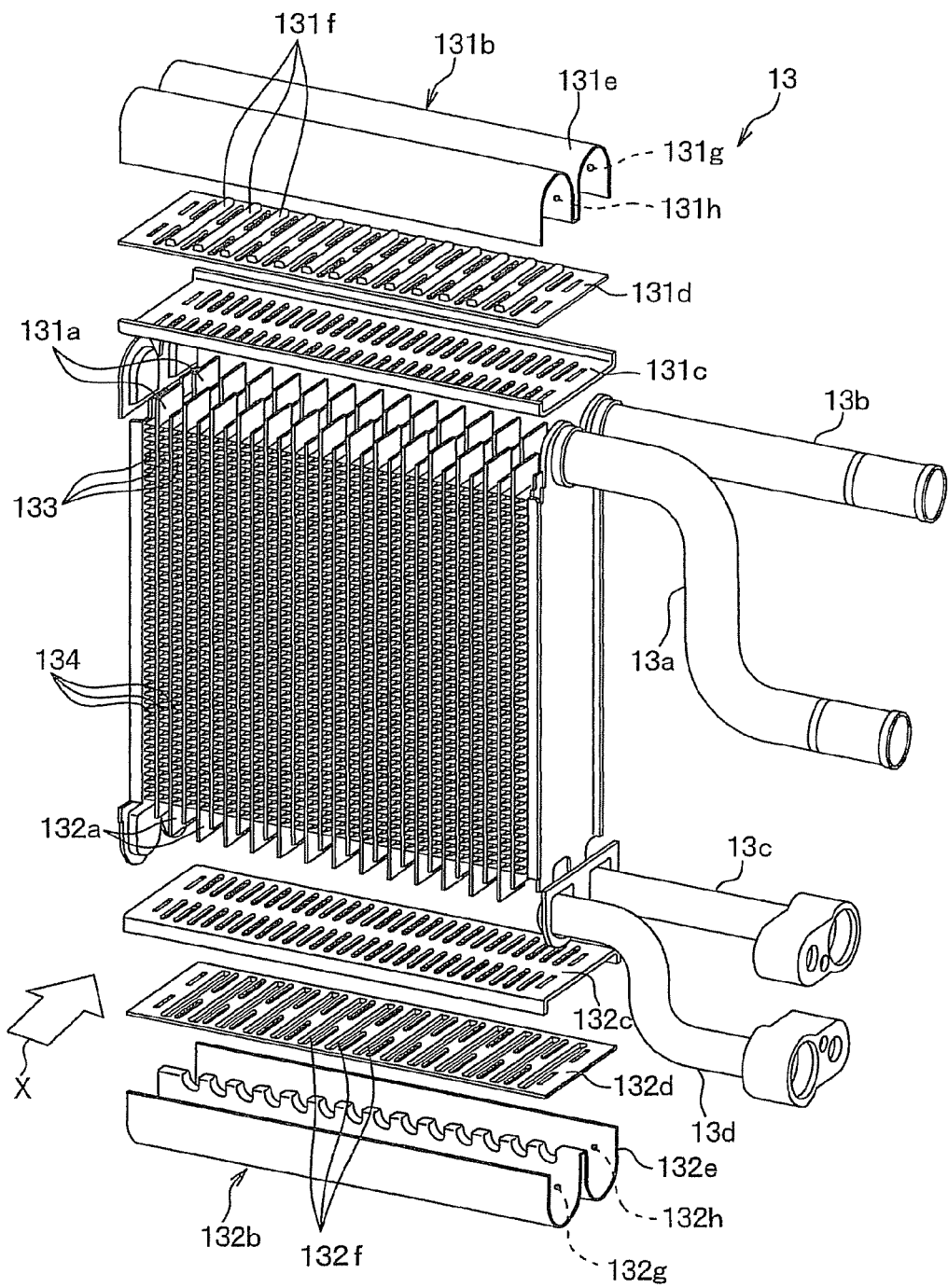
FIG. 3 is an exploded perspective view of the unified heat exchanger of the first embodiment.
Figure 4:
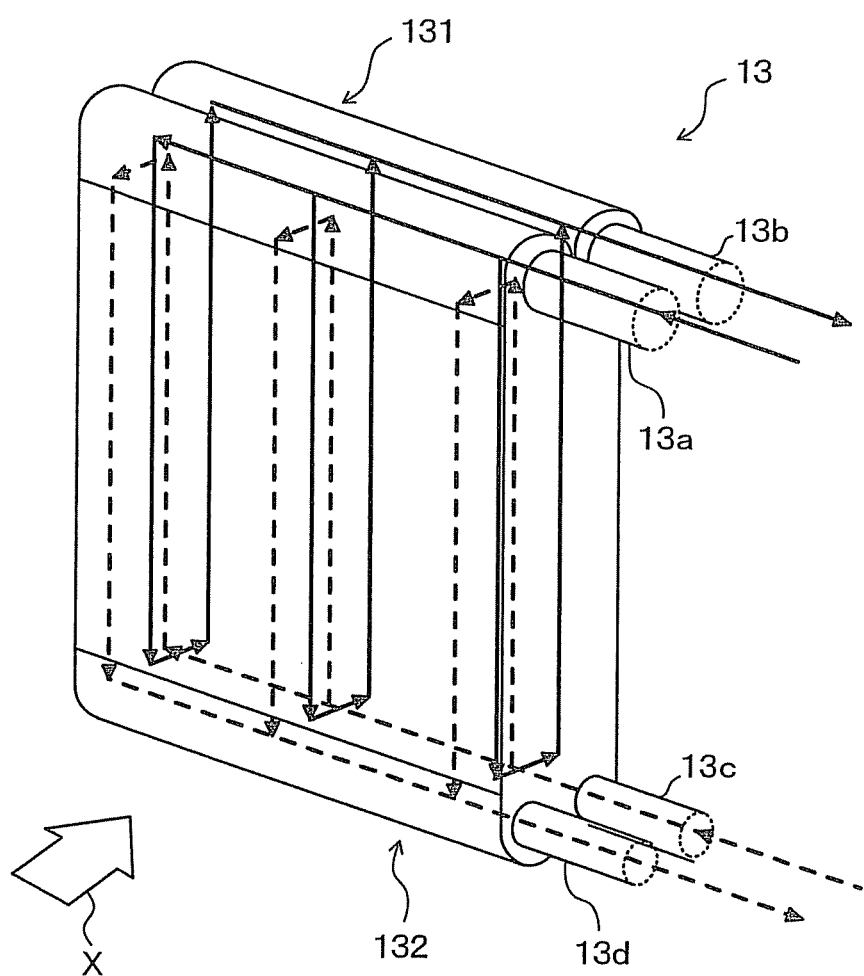
FIG. 4 is a schematic perspective view for describing flow of high pressure refrigerant and flow of low pressure refrigerant in the unified heat exchanger of the first embodiment.

Now, the structure of the unified heat exchanger 13 of the present embodiment will be described with reference to FIGS. 2 to 4. FIG. 2 is a perspective view of the unified heat exchanger 13 of the present embodiment, and FIG. 3 is an exploded perspective view of the unified heat exchanger 13 of the present embodiment. FIG. 4 is a schematic perspective view for describing the flow of the high pressure refrigerant and the flow of the low pressure refrigerant in the unified heat exchanger 13.

The unified heat exchanger 13 includes the first heat exchanging arrangement 131 and the second heat exchanging arrangement 132, which are integrated together and are arranged such that the cabin conditioning air, which is the subject heat exchanging fluid, can exchange the heat with both of the high pressure refrigerant (first fluid) and the low pressure refrigerant (second fluid).

The first heat exchanging arrangement 131 and the second heat exchanging arrangement 132 are formed as tank and tube type heat exchanging arrangements, respectively, and include a plurality of tubes 131a, 132a and two header tanks 131b, 132b. The tubes 131a, 132a are adapted to conduct the refrigerant therethrough, and the header tanks 131b, 132b are arranged at opposed end portions, respectively, of the tubes 131a, 132a to collect and distribute the refrigerant relative to the tubes 131a, 132a.

More specifically, the first heat exchanging arrangement 131 is a heating heat exchanging arrangement for heating the cabin conditioning air and includes the high-pressure side tubes (first fluid side tubes) 131a and the high-pressure side header tank 131b. Here, it should be noted that the term "high-pressure side" may also be referred to as "high-temperature side" throughout the specification, so that the high-pressure side tubes 131a and the high-pressure side header tank 131b may also be referred to as the high-temperature side tubes and the high-temperature side header tank, respectively. The high-pressure side tubes 131a conduct the high pressure refrigerant. The high-pressure side header tank 131b extends in a direction perpendicular to the longitudinal direction of the high-pressure side tubes 131a. Furthermore, the high-pressure side header tank 131b collects and distributes the high pressure refrigerant, which flows in the high-pressure side tubes 131a. The heat is exchanged between the high pressure refrigerant, which flows in the high-pressure side tubes 131a, and the cabin conditioning air, which flows around the high-pressure side tubes 131a, so that the cabin conditioning air is heated.

The second heat exchanging arrangement 132 is a cooling heat exchanging arrangement for cooling the cabin conditioning air and includes the low-pressure side tubes (second fluid side tubes) 132a and the low-pressure side header tank 132b. Here, it should be noted that the term "low-pressure side" may also be referred to as "low-temperature side" throughout the specification, so that the low-pressure side tubes 132a and the low-pressure side header tank 132b may also be referred to as the low-temperature side tubes and the low-temperature side header tank, respectively. The low-pressure side tubes 132a conduct the low pressure refrigerant. The low-pressure side header tank 132b extends in a direction perpendicular to the longitudinal direction of the low-pressure side tubes 132a. Furthermore, the low-pressure side header tank 132b collects and distributes the low pressure refrigerant, which flows in the low-pressure side tubes 132a. The heat is exchanged between the low pressure refrigerant, which flows in the low-pressure side tubes 132a, and the cabin conditioning air, which flows around the low-pressure side tubes 132a, so that the cabin conditioning air is cooled.

The high-pressure side tubes 131a and the low-pressure side tubes 132a are formed as flat tubes, each of which has a generally flat cross section in a direction perpendicular to the longitudinal direction of the tube 131a, 132a and is made of metal (e.g., aluminum alloy) that has the relatively high thermal conductivity.

The high-pressure side tubes 131a and the low-pressure side tubes 132a are arranged in two rows in a flow direction X of the air. Furthermore, the high-pressure side tubes 131a and the low-pressure side tubes 132a are alternately arranged one after another in a stacking direction thereof (left-to-right direction in FIG. 3) such that opposed adjacent planar outer surfaces of each adjacent two of the high-pressure side tubes 131a and the low-pressure side tubes 132a, which are adjacent to each other in the stacking direction, are spaced from each other by a predetermined distance. Specifically, each interposed high-pressure side tube 131a is interposed between corresponding adjacent two of the low-pressure side tubes 132a, and each interposed low-pressure side tube 132a is interposed between corresponding adjacent two of the high-pressure side tubes 131a.

Each space, which is formed between a corresponding one of the high-pressure side tubes 131a and its adjacent one of the low-pressure side tubes 132a, forms a conditioning air passage (heat exchanging subject fluid passage) 133, through which the cabin conditioning air flows. That is, the conditioning air passage 133, through which the cabin conditioning air flows, is formed around the corresponding high-pressure side tube 131a and around the corresponding low-pressure side tube 132a.

Furthermore, an outer fin 134 is placed in the conditioning air passage 133. The outer fin 134 serves as a heat conduction promoting member, device or mechanism (heat conduction promoting means), which promotes the heat exchange between the high pressure refrigerant and the cabin conditioning air in the first heat exchanging arrangement 131, and the heat exchange between the low pressure refrigerant and the cabin conditioning air in the second heat exchanging arrangement 132. The outer fin 134 is placed such that the outer fin 134 contacts the outer surface of the corresponding adjacent high-pressure side tube 131a and the outer surface of the corresponding adjacent low-pressure side tube 132a, which are opposed to each other in the stacking direction.

The unified heat exchanger 13 of the present embodiment is constructed such that a heat exchanging surface area between the high pressure refrigerant and the cabin conditioning air in the first heat exchanging arrangement 131 is generally equal to a heat exchanging surface area between the low pressure refrigerant and the cabin conditioning air in the second heat exchanging arrangement 132.

Furthermore, the high-pressure side tubes 131a and the low-pressure side tubes 132a are held between the high-pressure side header tank 131b and the low-pressure side header tank 132b. Specifically, the high-pressure side header tank 131b is placed at one longitudinal end portions of the high-pressure side tubes 131a and the low-pressure side tubes 132a, and the low-pressure side header tank 132b is placed at the other longitudinal end portions of the high-pressure side tubes 131a and the low-pressure side tubes 132a.

As shown in FIG. 3, the high-pressure side header tank 131b includes a high-pressure side connection plate 131c, a high-pressure side intermediate plate 131d and a high-pressure side tank forming member 131e. The high-pressure side connection plate 131c is connected to the respective tubes 131a, 132a, which are arranged into the two rows (the upstream side row and the downstream side row). The high-pressure side intermediate plate 131d is fixed to the high-pressure side connection plate 131c.

The high-pressure side intermediate plate 131d forms a plurality of recesses 131f, each of which forms a connection space (space of the recess 131f) between the high-pressure side intermediate plate 131d and the high-pressure side connection plate 131c to communicate between the corresponding end portions of the corresponding two low-pressure side tubes 132a, which are arranged into the two rows, respectively, when the high-pressure side connection plate 131c is fixed to the high-pressure side intermediate plate 131d.

Furthermore, through holes are formed to extend through corresponding portions, respectively, of the high-pressure side intermediate plate 131d, which correspond to the high-pressure side tubes 131a, respectively. The high-pressure side tubes 131a are inserted into these through holes, respectively, of the high-pressure side intermediate plate 131d. The one end portions of the high-pressure side tubes 131a and the one end portions of the low-pressure side tubes 132a, which are located at the high-pressure side header tank 131b, are arranged such that the one end portions of the high-pressure side tubes 131a project from the one end portions of the low-pressure side tubes 132a in the longitudinal direction thereof toward the high-pressure side tank forming member 131e.

The high-pressure side tank forming member 131e is fixed to the high-pressure side connection plate 131c and the high-pressure side intermediate plate 131d to form a collecting space 131g, into which the high pressure refrigerant is collected, and a distributing space 131h, from which the high pressure refrigerant is distributed. Specifically, the high-pressure side tank forming member 131e is formed through a press working operation of a metal plate, such that the high-pressure side tank forming member 131e is configured into a double-mountain form (a W-shaped form) having two semi-arcuate sections connected together at a center therebetween in its cross section, which is seen in a longitudinal direction of the high-pressure side tank forming member 131e.

A center portion between the two semi-arcuate sections of the high-pressure side tank forming member 131e is joined to the high-pressure side intermediate plate 131d, so that the collecting space 131g and the distributing space 131h are partitioned. In the present embodiment, the collecting space 131g is placed on the downstream side of the distributing space 131h in the flow direction X of the cabin conditioning air, and thereby the distributing space 131h is placed on the upstream side of the collecting space 131g in the flow direction X.

Furthermore, a high-pressure side inflow conduit 13a, through which the high pressure refrigerant is supplied to the distributing space 131h, and a high-pressure side outflow conduit 13b, through which the high pressure refrigerant is outputted from the collecting space 131g, are connected to one longitudinal end portion of the high-pressure side tank forming member 131e. Furthermore, the other longitudinal end portion of the high-pressure side tank forming member 131e is closed by a closing member.

The low-pressure side header tank 132b has a structure, which is basically the same as that of the high-pressure side header tank 131b. That is, the low-pressure side header tank 132b includes a low-pressure side connection plate 132c, a low-pressure side intermediate plate 132d and a low-pressure side tank forming member 132e. The low-pressure side connection plate 132c is connected to the respective tubes 131a, 132a. The low-pressure side intermediate plate 132d is fixed to the low-pressure side connection plate 132c.

The low-pressure side intermediate plate 132d forms a plurality of recesses 132f, each of which forms a connection space (space of the recess 132f) between the low-pressure side intermediate plate 132d and the low-pressure side connection plate 132c to communicate between the corresponding end portions of the corresponding two high-pressure side tubes 131a, which are arranged into the two rows, respectively, when the low-pressure side connection plate 132c is fixed to the low-pressure side intermediate plate 132d.

Furthermore, through holes are formed to extend through corresponding portions, respectively, of the low-pressure side intermediate plate 132d, which correspond to the low-pressure side tubes 132a, respectively. The low-pressure side tubes 132a are inserted into these through holes, respectively, of the low-pressure side intermediate plate 132d. The other end portions of the high-pressure side tubes 131a and the other end portions of the low-pressure side tubes 132a, which are located at the low-pressure side header tank 132b, are arranged such that the other end portions of the low-pressure side tubes 132a project from the other end portions of the high-pressure side tubes 131a in the longitudinal direction thereof toward the low-pressure side tank forming member 132e.

The low-pressure side tank forming member 132e is fixed to the low-pressure side connection plate 132c and the low-pressure side intermediate plate 132d to form a collecting space 132g, into which the low pressure refrigerant is collected, and a distributing space 132h, from which the low pressure refrigerant is distributed. Specifically, similar to the high-pressure side tank forming member 131e, the low-pressure side tank forming member 132e is configured into a double-mountain form (a W-shaped form) having two semi-arcuate sections connected together at a center therebetween in its cross section, which is seen in a longitudinal direction of the low-pressure side tank forming member 132e.

A center portion between the two semi-arcuate sections of the low-pressure side tank forming member 132e is joined to the low-pressure side intermediate plate 132d, so that the collecting space 132g and the distributing space 132h are partitioned. In the present embodiment, the collecting space 132g is placed on the upstream side of the distributing space 132h in the flow direction X of the cabin conditioning air, and thereby the distributing space 132h is placed on the downstream side of the collecting space 132g in the flow direction X.

Furthermore, a low-pressure side inflow conduit 13c, through which the low pressure refrigerant is supplied to the distributing space 132h, and a low-pressure side outflow conduit 13d, through which the low pressure refrigerant is outputted from the collecting space 132g, are connected to one longitudinal end portion of the low-pressure side tank forming member 132e. Furthermore, the other longitudinal end portion of the low-pressure side tank forming member 132e is closed by a closing member.

In the unified heat exchanger 13 of the present embodiment, which is constructed in the above described manner, as indicated by solid line arrows in FIG. 4, the high pressure refrigerant, which is supplied to the distributing space 131h of the high-pressure side header tank 131b through the high-pressure side inflow conduit 13a, is distributed into the high-pressure side tubes 131a, which are located in the upstream side row placed on the upstream side of the downstream side row in the flow direction X of the cabin conditioning air.

Then, the high pressure refrigerant, which is outputted from each high-pressure side tube 131a located in the upstream side row, is supplied to the corresponding high-pressure side tube 131a located in the downstream side row through the corresponding connection space (space of the recess 132f) formed between the low-pressure side connection plate 132c and the low-pressure side intermediate plate 132d of the low-pressure side header tank 132b.

Furthermore, the high pressure refrigerant, which is outputted from each high-pressure side tube 131a located in the downstream side row, is collected into the collecting space 131g of the high-pressure side header tank 131b and is outputted through the high-pressure side outflow conduit 13b. That is, in the unified heat exchanger 13 of the present embodiment, the high pressure refrigerant, which is supplied from the high-pressure side inflow conduit 13a, flows through each high-pressure side tube 131a in the upstream side row, the low-pressure side header tank 132b and the corresponding high-pressure side tube 131a in the downstream side row in this order by making a U-turn and is then outputted into the high-pressure side outflow conduit 13b.

Similarly, as indicated by the dotted line arrows in FIG. 4, the low pressure refrigerant, which is supplied from the low-pressure side inflow conduit 13c, flows through each low-pressure side tube 132a in the downstream side row, the high-pressure side header tank 131b and the corresponding low-pressure side tube 132a in the upstream side row in this order by making a U-turn and is then outputted into the low-pressure side outflow conduit 13d.

Next, an electric control arrangement of the present embodiment will be described. The control unit 100 of the present embodiment includes a known type of microcomputer, which includes a CPU, a ROM and a RAM, and its peripheral circuit. The control unit 100 executes various computations and processes based on a control program stored in the ROM and controls the various control subject devices 11, 12, 15, 18, 20, 21, 22, 32, which are connected to the output side of the control unit 100. Furthermore, the control unit 100 functions as a part of the heat exchange amount adjusting mechanism 6, a part of the depressurizing mechanism 7, a part of the refrigerant flow path switching mechanism 8 and a part of the refrigerant flow quantity adjusting mechanism 9 in corporation with the other devices discussed in the present embodiment.

An inside air temperature sensor, an outside air temperature sensor, a solar radiation sensor, a unified heat exchanger temperature sensor, a high-pressure side temperature sensor, a high-pressure side pressure sensor, a low-pressure side temperature sensor and a low-pressure side pressure sensor are connected to the input side of the control unit 100. The inside air temperature sensor senses the inside air temperature in the vehicle cabin. The outside air temperature sensor senses the outside air temperature at the outside of the vehicle cabin. The solar radiation sensor senses the amount of solar radiation in the vehicle cabin. The unified heat exchanger temperature sensor senses the temperature of the cabin conditioning air outputted from the unified heat exchanger 13 (the temperature of the cabin conditioning air at the air outlet side of the unified heat exchanger 13). The high-pressure side temperature sensor functions as a temperature sensing device or mechanism (temperature sensing means), which senses the temperature of the high pressure refrigerant (the discharged refrigerant of the compressor 11) supplied to the unified heat exchanger 13. The high-pressure side pressure sensor functions as a pressure sensing device mechanism (pressure sensing means), which senses the pressure of the high pressure refrigerant. The low-pressure side temperature sensor functions as a temperature sensing device or mechanism (temperature sensing means), which senses the temperature of the low pressure refrigerant supplied to the unified heat exchanger 13. The low-pressure side pressure sensor functions as a pressure sensing device or mechanism (pressure sensing means), which senses the pressure of the low pressure refrigerant.

Furthermore, the input side of the control unit 100 is connected to a manipulation panel (not shown), which is also referred to as a control panel and is placed adjacent to the instrument panel of the vehicle cabin located at the front side of the vehicle cabin. Signals of various manipulation switches, which are provided in the manipulation panel, are supplied to the input side of the control unit 100. The manipulation switches, which are provided in the manipulation panel, include an on-off switch (also referred to as an actuation switch) of the vehicle air conditioning system, a cabin temperature setting switch for setting the temperature of the vehicle cabin and an operation mode setting switch for setting an operational mode of the vehicle air conditioning system.

A controller (control means), which controls the control subject devices, such as the electric motor 11b of the compressor 11, is integrated in the control unit 100 to control the control subject devices. However, in the present embodiment, a structure (a hardware and a software), which controls each corresponding control subject device, may function as a controller (control means) of such a control subject device. For example, a structure, which controls the operation of the compressor 11, forms a discharge rate controller (discharge rate control means), which controls the operation of the compressor 11. Furthermore, a structure, which controls the flow quantity of the outside air blown by the blower fan 20, forms an outside air flow quantity controller (outside air flow quantity control means).

Next, the operations of the present embodiment will be described. The vehicle air conditioning system 1 of the present embodiment can execute the dehumidifying and heating operation in addition to the heating operation for heating the vehicle cabin and the cooling operation for cooling the vehicle cabin. One of the heating operation, the cooling operation and the dehumidifying and heating operation is set and executed according the signal (manipulation signal) of the operation mode setting switch of the manipulation panel.

(a) Heating Operation

The heating operation is started when the heating operation mode is selected through the operation mode setting switch of the manipulation panel in the state where the on-off switch of the manipulation panel is turned on.

In the heating operation, the control unit 100 closes the opening and closing valve 18 and switches the first three-way valve 12 to the refrigerant flow path, which connects between the outlet of the compressor 11 and the inlet of the first heat exchanging arrangement 131 of the unified heat exchanger 13. Furthermore, the control unit 100 switches the second three-way valve 21 to the refrigerant flow path, which connects between the outlet of the outdoor heat exchanger 19 and the inlet of the accumulator 23. In this way, in the vehicle refrigeration cycle system 10, the refrigerant (high pressure refrigerant), which is outputted from the compressor 11, flows in the direction of the black arrows in the refrigerant circuit passage 10a in FIG. 1.

After the switching of the first and second three-way valves 12, 21 and the opening and closing valve 18 to the refrigerant flow path that is set for the heating operation, the control unit 100 reads, i.e., receives the measurement signals of the above sensors and the manipulation signals of the manipulation panel. The control unit 100 computes a target outlet air temperature TAO, which is a target temperature of the cabin conditioning air to be blown into the vehicle cabin, based on the received measurement signals and the received manipulation signals. Then, the control unit 100 determines the operational state (e.g., a control signal) of each corresponding control subject device connected to the output side of the control unit 100 based on the computed target outlet air temperature TAO and the measurement signals of the sensors.

For example, the control unit 100 uses the feedback control method to determine the control signal, which is outputted to the electric motor 11b of the compressor 11, based on a deviation between the target outlet air temperature TAO and the actual outlet air temperature (the temperature of the cabin conditioning air) at the outlet of the unified heat exchanger 13, which is sensed with the unified heat exchanger temperature sensor. This determination of the control signal is made such that the air outlet temperature at the outlet of the unified heat exchanger 13 is adjusted to the target air outlet temperature TAO. Furthermore, the control unit 100 determines the control signal, which is outputted from the control unit 100 to the blower fan 20, such that the rotational speed of the blower fan 20 is adjusted to a preset target rotational speed.

Then, the control unit 100 outputs the control signals, which are determined based on, for example, the target outlet air temperature TAO, to each corresponding control subject device. Thereafter, the control unit 100 repeats the control routine of, for example, the reading of the measurement signals and the manipulation signals, the computing of the target outlet air temperature TAO, the determining of the operational state of each corresponding control subject device and the controlling of each corresponding control subject device discussed above at every predetermined control cycle. Basically, this control routine is executed in a manner similar to the one discussed above in a case where the other operational mode, which is other than the heating operation mode, is set.

In this way, in the vehicle refrigeration cycle system 10, the refrigerant (high pressure refrigerant), which is outputted from the compressor 11, is supplied to the first heat exchanging arrangement 131 of the unified heat exchanger 13. The high pressure refrigerant, which is supplied to the first heat exchanging arrangement 131 of the unified heat exchanger 13, releases the heat through the heat exchange with the cabin conditioning air, which is blown from the blower 32, so that the cabin conditioning air is heated.

The refrigerant, which is outputted from the first heat exchanging arrangement 131 of the unified heat exchanger 13, is supplied to the first fixed choke 15, at which the high pressure refrigerant is depressurized and expanded. Then, the refrigerant (low pressure refrigerant), which is depressurized and expanded at the first fixed choke 15, is supplied to the outdoor heat exchanger 19. The low pressure refrigerant, which is supplied to the outdoor heat exchanger 19, absorbs the heat from the outside air that is blown from the blower fan 20.

The low pressure refrigerant, which is outputted from the outdoor heat exchanger 19, is supplied to the accumulator 23 while bypassing the second heat exchanging arrangement 132 of the unified heat exchanger 13, so that the low pressure refrigerant is separated into the gas-phase refrigerant and the liquid-phase refrigerant at the accumulator 23. Then, the gas-phase refrigerant, which is separated at the accumulator 23, is drawn into the compressor 11 and is compressed once again by the compressor 11.

As discussed above, at the time of executing the heating operation, the cabin conditioning air, which is heated through the heat exchange with the high pressure refrigerant at the first heat exchanging arrangement 131 of the unified heat exchanger 13, can be blown into the vehicle cabin, so that the heating of the vehicle cabin can be achieved.

Here, at the time of executing the heating operation of the present embodiment, the amount of heat exchange between the high pressure refrigerant and the cabin conditioning air at the first heat exchanging arrangement 131 of the unified heat exchanger 13 can be adjusted by adjusting the temperature (pressure) of the high pressure refrigerant, which is supplied to the first heat exchanging arrangement 131, and this adjustment of the temperature (pressure) of the high pressure refrigerant can be achieved by changing the rotational speed of the compressor 11 (the control signal outputted to the electric motor 11b).

Therefore, the temperature of the cabin conditioning air can be adjusted to the desired temperature, which corresponds to the target outlet air temperature that is set for the heating operation, at the unified heat exchanger 13. In the heating operation of the present embodiment, the compressor 11 functions as a heat exchange amount adjusting device (heat exchange amount adjusting means) of the heat exchange amount adjusting mechanism 6, which adjusts the amount of heat exchange between the refrigerant and the cabin conditioning air at the first heat exchanging arrangement 131 of the unified heat exchanger 13.

At the time of executing the heating operation of the present embodiment, the high pressure refrigerant corresponds to the refrigerant, which flows in the refrigerant flow path that extends from the outlet of the compressor 11 to the inlet of the first fixed choke 15. Furthermore, the low pressure refrigerant corresponds to the refrigerant, which flows in the refrigerant flow path that is from the outlet of the first fixed choke 15 to the inlet of the compressor 11.

(b) Cooling Operation

Next, the cooling operation will be described. The cooling operation is started when a cooling operation mode is selected through the operation mode setting switch at the manipulation panel.

In the cooling operation, the control unit 100 opens the opening and closing valve 18 and switches the first three-way valve 12 to the refrigerant flow path, which connects between the outlet of the compressor 11 and the inlet of the heat exchanger bypass passage 14. Furthermore, the control unit 100 switches the second three-way valve 21 to the refrigerant flow path, which connects between the outlet of the outdoor heat exchanger 19 and the inlet of the second fixed choke 22. In this way, in the vehicle refrigeration cycle system 10, the refrigerant (high pressure refrigerant), which is outputted from the compressor 11, flows in the direction of the white open arrows in the refrigerant circuit passage 10a in FIG. 1.

Furthermore, the control signal, which is outputted from the control unit 100 to the electric motor 11b of the compressor 11, is determined such that the outlet air temperature at outlet of the unified heat exchanger 13 approaches the target outlet air temperature TAO. Furthermore, the control unit 100 determines the control signal, which is outputted from the control unit 100 to the blower fan 20, such that the rotational speed of the blower fan 20 is adjusted to a preset target rotational speed.

In this way, in the vehicle refrigeration cycle system 10, the refrigerant (high pressure refrigerant), which is outputted from the compressor 11, is supplied to the outdoor heat exchanger 19 while bypassing the first heat exchanging arrangement 131 of the unified heat exchanger 13 and the first fixed choke 15. The high pressure refrigerant, which is supplied to the outdoor heat exchanger 19, releases the heat to the outside air that is blown from the blower fan 20.

The high pressure refrigerant, which is outputted from the outdoor heat exchanger 19, is supplied to the second fixed choke 22, at which the high pressure refrigerant is depressurized and is expanded. Then, the refrigerant (low pressure refrigerant), which is depressurized and expanded at the second fixed choke 22, is supplied to the second heat exchanging arrangement 132 of the unified heat exchanger 13. The low pressure refrigerant, which is supplied to the second heat exchanging arrangement 132 of the unified heat exchanger 13, absorbs the heat from the cabin conditioning air that is blown from the blower 32, so that the refrigerant is evaporated to cool the cabin conditioning air.

The low pressure refrigerant, which is outputted from the second heat exchanging arrangement 132 of the unified heat exchanger 13, is supplied to the accumulator 23, so that the low pressure refrigerant is separated into the gas-phase refrigerant and the liquid-phase refrigerant at the accumulator 23. Then, the gas-phase refrigerant, which is separated at the accumulator 23, is drawn into the compressor 11 and is compressed once again by the compressor 11.

As discussed above, at the time of executing the cooling operation, the cabin conditioning air, which is cooled through the heat exchange with the low pressure refrigerant at the second heat exchanging arrangement 132 of the unified heat exchanger 13, can be blown into the vehicle cabin, so that the cooling of the vehicle cabin can be achieved.

Here, at the time of executing the cooling operation of the present embodiment, the amount of heat exchange between the low pressure refrigerant and the cabin conditioning air at the second heat exchanging arrangement 132 of the unified heat exchanger 13 can be adjusted by adjusting the temperature (pressure) of the low pressure refrigerant, which is supplied to the second heat exchanging arrangement 132, and this adjustment of the temperature (pressure) of the low pressure refrigerant can be achieved by changing the rotational speed of the compressor 11.

Therefore, the temperature of the cabin conditioning air can be adjusted to the desired temperature, which corresponds to the target outlet air temperature that is set for the cooling operation, at the unified heat exchanger 13. In the cooling operation of the present embodiment, the compressor 11 functions as the heat exchange amount adjusting device (heat exchange amount adjusting means) of the heat exchange amount adjusting mechanism 6, which adjusts the amount of heat exchange between the low pressure refrigerant and the cabin conditioning air at the second heat exchanging arrangement 132 of the unified heat exchanger 13.

At the time of executing the cooling operation of the present embodiment, the high pressure refrigerant corresponds to the refrigerant, which flows in the refrigerant flow path that extends from the outlet of the compressor 11 to the inlet of the second fixed choke 22. Furthermore, the low pressure refrigerant corresponds to the refrigerant, which flows in the refrigerant flow path that is from the outlet of the second fixed choke 22 to the inlet of the compressor 11. The high pressure refrigerant and the low pressure refrigerant in the cooling operation of the present embodiment are the same as those used in the dehumidifying and heating operation discussed below.

(c) Dehumidifying and Heating Operation

Next, the dehumidifying and heating operation will be described. The dehumidifying and heating operation is started when a dehumidifying and heating operation mode is selected through the operation mode setting switch at the manipulation panel. The starting of the dehumidifying and heating operation is not necessarily triggered by the selection of the dehumidifying and heating operation mode through the operation mode setting switch. Specifically, it may be determined whether dehumidification is required based on a relative humidity of the vehicle cabin during the heating operation. Then, the dehumidifying and heating operation may be automatically started based on a result of this determination.

In the dehumidifying and heating operation, the control unit 100 opens the opening and closing valve 18 and switches the first three-way valve 12 to the refrigerant flow path, which connects between the outlet of the compressor 11 and the inlet of the first heat exchanging arrangement 131 of the unified heat exchanger 13. Furthermore, the control unit 100 switches the second three-way valve 21 to the refrigerant flow path, which connects between the outlet of the outdoor heat exchanger 19 and the inlet of the second fixed choke 22. In this way, in the vehicle refrigeration cycle system 10, the refrigerant (high pressure refrigerant), which is outputted from the compressor 11, flows in the direction of the hatched arrows in the refrigerant circuit passage 10a in FIG. 1.

Furthermore, the control signal, which is outputted from the control unit 100 to the electric motor 11b of the compressor 11, is determined such that the air outlet temperature of the cabin conditioning air, which is outputted from the unified heat exchanger 13, approaches the target outlet air temperature TAO. Furthermore, the control signal, which is outputted from the control unit 100 to the blower fan 20, is determined such that the amount of heat release at the outdoor heat exchanger 19 is adjusted to a predetermined target amount of heat release based on the outside air temperature and the temperature of the high pressure refrigerant.

In the vehicle refrigeration cycle system 10, the refrigerant (high pressure refrigerant), which is outputted from the compressor 11, is supplied to the first heat exchanging arrangement 131 of the unified heat exchanger 13. The high pressure refrigerant, which is supplied to the first heat exchanging arrangement 131 of the unified heat exchanger 13, releases the heat through the heat exchange with the cabin conditioning air, which is blown from the blower 32, so that the cabin conditioning air is heated.

The high pressure refrigerant, which is outputted from the first heat exchanging arrangement 131 of the unified heat exchanger 13, is supplied to the outdoor heat exchanger 19 while bypassing the first fixed choke 15 since the opening and closing valve 18 is opened. The high pressure refrigerant, which is supplied to the outdoor heat exchanger 19, releases the heat to the outside air that is blown from the blower fan 20.

The high pressure refrigerant, which is outputted from the outdoor heat exchanger 19, is supplied to the second fixed choke 22, at which the high pressure refrigerant is depressurized and is expanded. Then, the refrigerant (low pressure refrigerant), which is depressurized and expanded at the second fixed choke 22, is supplied to the second heat exchanging arrangement 132 of the unified heat exchanger 13. The low pressure refrigerant, which is supplied to the second heat exchanging arrangement 132 of the unified heat exchanger 13, absorbs the heat from the cabin conditioning air that is blown from the blower 32, so that the refrigerant is evaporated to dehumidify and cool the cabin conditioning air.

The low pressure refrigerant, which is outputted from the second heat exchanging arrangement 132 of the unified heat exchanger 13, is supplied to the accumulator 23, so that the low pressure refrigerant is separated into the gas-phase refrigerant and the liquid-phase refrigerant at the accumulator 23. Then, the gas-phase refrigerant, which is separated at the accumulator 23, is drawn into the compressor 11 and is compressed once again by the compressor 11.

Figure 5:
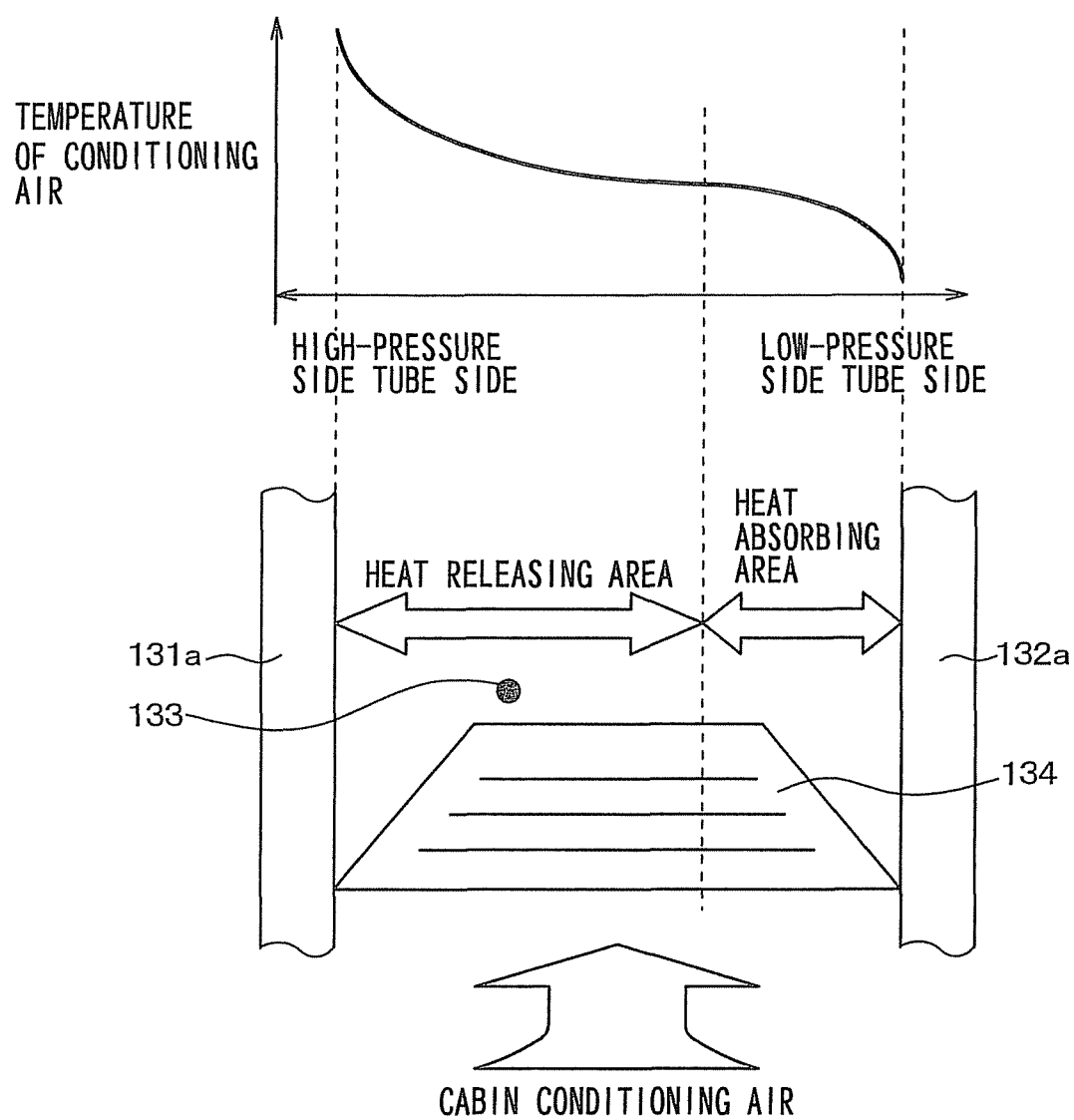
FIG. 5 is a temperature distribution diagram taken in a flow direction of cabin conditioning air at the time of supplying the high pressure refrigerant and the low pressure refrigerant to the unified heat exchanger of the first embodiment, showing a temperature distribution of the cabin conditioning air, which flows around an outer fin of the unified heat exchanger.

FIG. 5 is a temperature distribution diagram taken in the flow direction X of the cabin conditioning air at the time of supplying the high pressure refrigerant and the low pressure refrigerant to the unified heat exchanger 13, showing a temperature distribution of the cabin conditioning air, which flows around the outer fin 134.

As shown in FIG. 5, the cabin conditioning air, which flows thorough the conditioning air passage 133 of the unified heat exchanger 13, heated to raise its temperature at the outer surface (heat releasing area) of the high-pressure side tube 131a by the high pressure refrigerant that flows in the high-pressure side tube 131a and is cooled and dehumidified at the outer surface (heat absorbing area) of the low-pressure side tube 132a by the low pressure refrigerant that flows in the low-pressure side tube 132a. That is, the cabin conditioning air, which is heated by the high pressure refrigerant and is dehumidified by the low pressure refrigerant, is outputted from the unified heat exchanger 13.

As discussed above, at the time of executing the dehumidifying and heating operation, the heat exchange takes placed between the high pressure refrigerant and the cabin conditioning air at the first heat exchanging arrangement 131 of the unified heat exchanger 13, and the heat exchange takes place between the low pressure refrigerant and the cabin conditioning air at the second heat exchanging arrangement 132 of the unified heat exchanger 13. Thereby, the cabin conditioning air, which is temperature adjusted and is dehumidified, is outputted into the vehicle cabin, and thereby the dehumidifying and heating of the vehicle cabin is achieved.

Here, at the time of executing the dehumidifying and heating operation, the amount of heat exchange between the high pressure refrigerant and the cabin conditioning air at the first heat exchanging arrangement 131 can be adjusted by changing the rotational speed of the compressor 11 and by adjusting the rotational speed of the blower fan 20 to reduce the amount of heat release at the outdoor heat exchanger 19.

Therefore, it is possible to dehumidify the cabin conditioning air and to adjust the temperature of the cabin conditioning air to the desired temperature, which corresponds to the target outlet air temperature. In the dehumidifying and heating operation of the present embodiment, the compressor 11 and the blower fan 20 function as the heat exchange amount adjusting devices (heat exchange amount adjusting means) of the heat exchange amount adjusting mechanism 6, which adjusts the amount of heat exchange between the refrigerant and the cabin conditioning air at each heat exchanging arrangement 131, 132 of the unified heat exchanger 13.

As discussed above, in the heat exchange system, which is applied to the vehicle air conditioning system 1 of the present embodiment, the amount of heat exchange between the refrigerant and the cabin conditioning air at each of the first and second heat exchanging arrangements 131, 132 of the unified heat exchanger 13 can be adjusted by switching the refrigerant flow path of the vehicle refrigeration cycle system 10 and by adjusting the temperature of the high pressure refrigerant, which is supplied to the first heat exchanging arrangement 131 from the compressor 11, the temperature of the low pressure refrigerant, which is supplied to the second heat exchanging arrangement 132 from the compressor 11, and the air delivery rate of the blower fan 20.

In this way, the temperature of the cabin conditioning air can be adjusted in the wide range by the unified heat exchanger 13. Therefore, the temperature of the cabin conditioning air can be adjusted to the desired temperature, which corresponds to the target outlet air temperature that is set for the cooling operation, the heating operation or the dehumidifying and heating operation, so that the vehicle cabin can be appropriately air conditioned.

Furthermore, according to the present embodiment, the temperature of the cabin conditioning air can be adjusted to the desired temperature with the unified heat exchanger 13 without a need for providing a temperature adjusting device or mechanism (temperature adjusting means), such as an air, mix door, which adjusts the temperature of the cabin conditioning air, in the indoor air conditioning unit 30. Thereby, a size of the indoor air conditioning unit 30 can be reduced or minimized.

Furthermore, the dehumidifying and heating operation (the dehumidification and adjustment of the temperature) of the cabin conditioning air can be achieved with the single heat exchanger, such as the unified heat exchanger 13, and the size of the indoor air conditioning unit 30 can be reduced or minimized.

Furthermore, in the unified heat exchanger 13 of the present embodiment, the conditioning air passage 133, through which the cabin conditioning air flows, is formed between the high-pressure side tube 131a and the low-pressure side tube 132a. Therefore, the structure of exchanging the heat between the cabin conditioning air and both of the high pressure refrigerant and the low pressure refrigerant can be easily implemented.

Furthermore, in the unified heat exchanger 13 of the present embodiment, the outer fin 134, which promotes the heat exchange at each of the first and second heat exchanging arrangements 131, 132, is placed in the conditioning air passage 133 formed between the high-pressure side tube 131a and the low-pressure side tube 132a.

Therefore, it is possible to promote the heat exchange between the high pressure refrigerant and the cabin conditioning air at the first heat exchanging arrangement 131 and the heat exchange between the low pressure refrigerant and the cabin conditioning air at the second heat exchanging arrangement 132, so that the heat exchange efficiency can be improved at the unified heat exchanger 13.

Furthermore, in the unified heat exchanger 13 of the present embodiment, each corresponding low-pressure side tube 132a is placed between the corresponding adjacent two of the high-pressure side tubes 131a (i.e., each corresponding high-pressure side tube 131a being placed between the corresponding adjacent two of the low-pressure side tubes 132a). Therefore, the generally uniform temperature distribution of the cabin conditioning air can be achieved at the air outlet of the unified heat exchanger 13.

Second Embodiment

Figure 6:
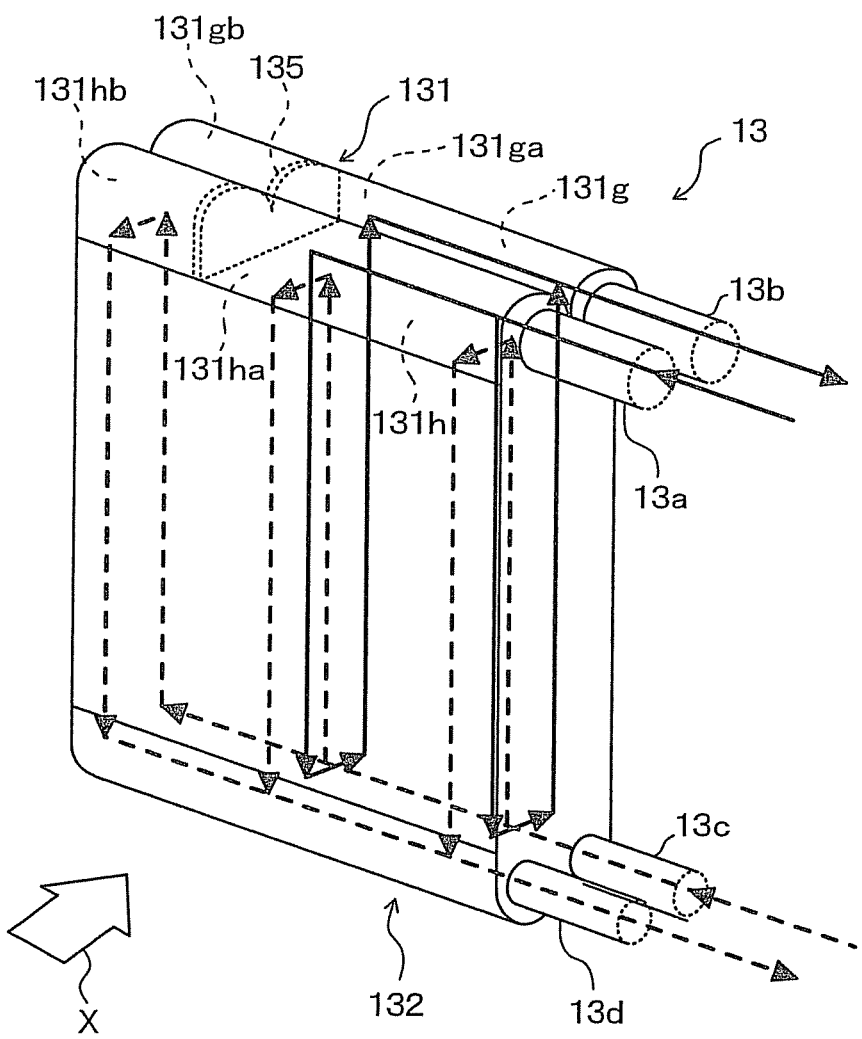
FIG. 6 is a schematic perspective view of a unified heat exchanger according to a second embodiment of the present disclosure.

Next, a second embodiment of the present disclosure will be described with reference to FIG. 6. FIG. 6 is a schematic perspective view of the unified heat exchanger 13 of the present embodiment. In the following embodiments, the components, which are similar to those of the first embodiment, will be indicated by the same reference numerals and will not be discussed further in detail. Furthermore, in the following embodiments, although the control unit 100, which is shown in FIG. 1 and discussed above in the first embodiment, is not depicted in the drawings for the sake of simplicity, the control unit 100, which is similar to that of FIG. 1, is also provided in the vehicle air conditioning system 1 of each of the following embodiments.

In comparison to the first embodiment, a size of the heat exchanging surface area for exchanging the heat between the low pressure refrigerant and the cabin conditioning air at the second heat exchanging arrangement 132 of the unified heat exchanger 13 and a size of the heat exchanging surface area for exchanging the heat between the high pressure refrigerant and the cabin conditioning air at the first heat exchanging arrangement 131 of the unified heat exchanger 13 are changed in the present embodiment.

As shown in FIG. 6, a partition plate 135 is placed in the collecting space 131g and the distributing space 131h of the high-pressure side header tank 131b to partition each of the collecting space 131g and the distributing space 131h into a communicating space 131ga, 131ha, which is directly communicated with the high-pressure side inflow conduit 13a and the high-pressure side outflow conduit 13b, and a non-communicating space 131gb, 131hb, which is not directly communicated with the high-pressure side inflow conduit 13a and the high-pressure side outflow conduit 13b. That is, the collecting space 131g and the distributing space 131h, which are formed in the inside of the high-pressure side header tank 131b, are partitioned by the partition plate 135, so that the portion, i.e., the non-communicating space 131gb, 131hb of each of the collecting space 131g and the distributing space 131h is not directly communicated with the high-pressure side inflow conduit 13a and the high-pressure side outflow conduit 13b.

Now, the flow of the high pressure refrigerant and the flow of the low pressure refrigerant in the unified heat exchanger 13 of the present embodiment will be described. As indicated by solid line arrows in FIG. 6, in the first heat exchanging arrangement 131, the high pressure refrigerant is supplied to the communicating space 131ha of the distributing space 131h of the high-pressure side header tank 131b through the high-pressure side inflow conduit 13a. The refrigerant, which is supplied to the communicating space 131ha of the distributing space 131h, is supplied to each corresponding high-pressure side tube 131a located in the upstream side row in the flow direction X of the cabin conditioning air. The flow of the refrigerant to the non-communicating space 131hb of the distributing space 131h is blocked by the partition plate 135, so that the refrigerant is not supplied to each corresponding high-pressure side tube 131a that is communicated with the non-communicating space 131hb of the distributing space 131h.

Then, the refrigerant, which is outputted from each corresponding high-pressure side tube 131a located in the upstream side row in the flow direction X of the cabin conditioning air, is supplied to the corresponding high-pressure side tube 131a located in the downstream side row in the flow direction X of the cabin conditioning air through the corresponding connection space (the space of the recess 132f) formed between the low-pressure side connection plate 132c and the low-pressure side intermediate plate 132d of the low-pressure side header tank 132b.

Furthermore, the refrigerant, which is outputted from each corresponding high-pressure side tube 131a located in the downstream side row in the flow direction X of the cabin conditioning air, is collected into the communicating space 131ga of the collecting space 131g of the high-pressure side header tank 131b and is outputted through the high-pressure side outflow conduit 13b.

In contrast, as indicated by dotted line arrows in FIG. 6, the refrigerant, which is supplied to the distributing space 132h of the low-pressure side header tank 132b through the low-pressure side inflow conduit 13c, flows through each low-pressure side tube 132a in the downstream side row, the corresponding low-pressure side tube 132a in the upstream side row and the collecting space 132g of the low-pressure side header tank 132b in this order and is then outputted into the low-pressure side outflow conduit 13d.

As discussed above, in the unified heat exchanger 13 of the present embodiment, the number of the low-pressure side tubes 132a, through which the low pressure refrigerant flows, in the second heat exchanging arrangement 132 is substantially increased in comparison to the number of the high-pressure side tubes 131a, through which the high pressure refrigerant flows, in the first heat exchanging arrangement 131. In this way, the size of the heat exchanging surface area for exchanging the heat between the low pressure refrigerant and the cabin conditioning air at the second heat exchanging arrangement 132 is increased in comparison to the size of the heat exchanging surface area for exchanging the heat between the high pressure refrigerant and the cabin conditioning air at the first heat exchanging arrangement 131.

In this way, at the time of executing the dehumidifying and heating operation, the evaporation of the low pressure refrigerant is promoted by absorbing the heat from the high pressure refrigerant in the area (high and low pressure area) where the high pressure refrigerant and the low pressure refrigerant flow in the first heat exchanging arrangement 131 and the second heat exchanging arrangement 132. Thereby, the pressure loss is increased in the low-pressure side tubes 132a at the high and low pressure area of the first and second heat exchanging arrangements 131, 132, and thereby the flow quantity of the low pressure refrigerant, which is supplied to the high and low pressure area of the first and second heat exchanging arrangements 131, 132, can be reduced. As a result, the amount of heat release to the cabin conditioning air at the high and low pressure area is increased, so that the heating performance can be improved.

Third Embodiment

Figure 7:
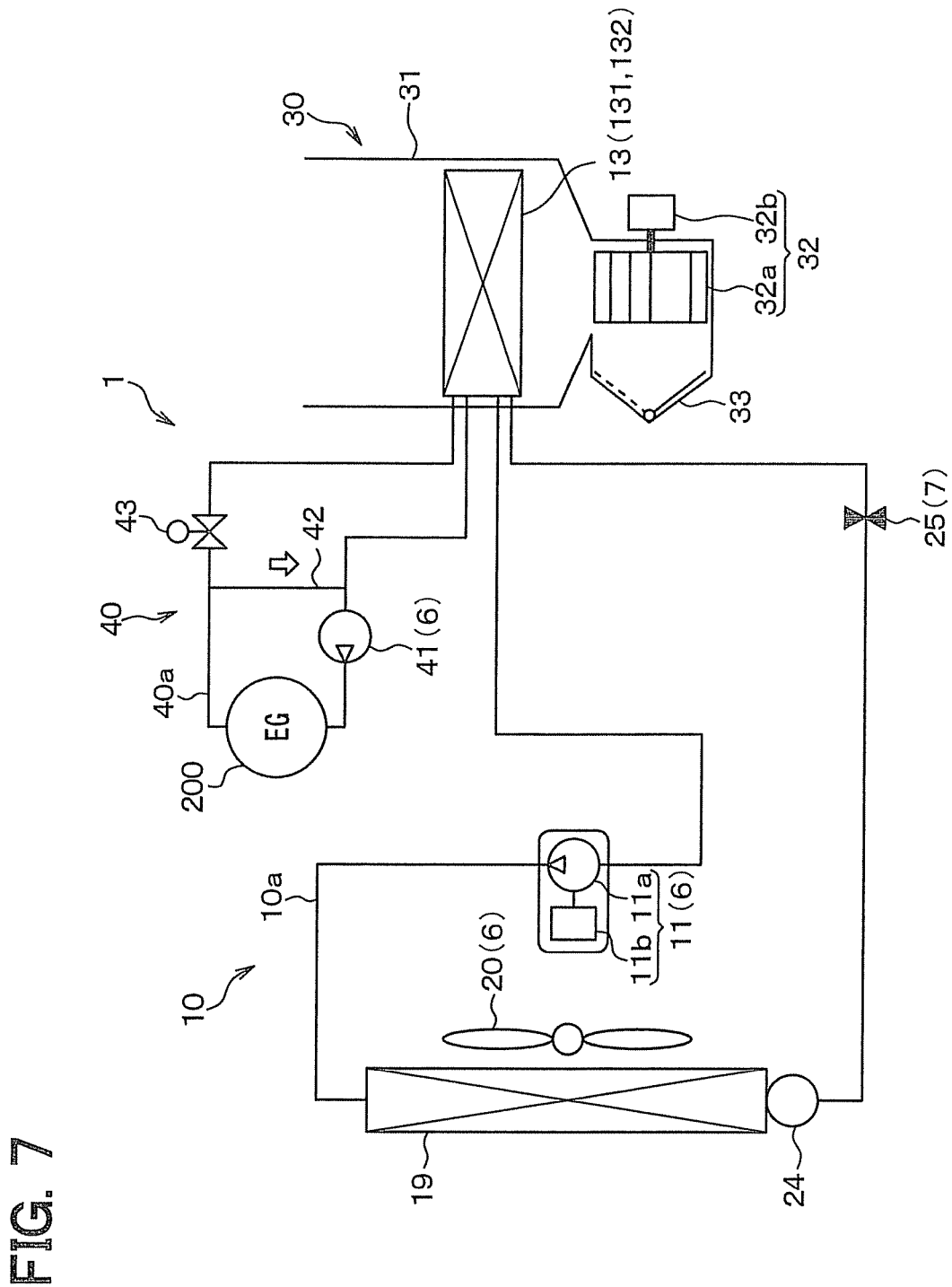
FIG. 7 is a schematic diagram showing a structure of a vehicle air conditioning system according to a third embodiment of the present disclosure.

Next, a third embodiment of the present disclosure will be described with reference to FIG. 7. FIG. 7 is a schematic diagram showing the structure of the vehicle air conditioning system 1 of the present embodiment.

In the present embodiment, the heat exchange system of the present disclosure is applied to a vehicle air conditioning system 1 of a hybrid vehicle that uses an internal combustion engine (hereinafter simply referred to as an engine) 200 and a vehicle drive electric motor (motor generator) to generate its vehicle drive force.

The hybrid vehicle can drive or stop the engine depending on a drive load of the vehicle to switch its driving state between, for example, a driving state, in which the drive force is obtained from both of the engine and the drive electric motor, and a driving state, in which the drive force is obtained only from the drive electric motor while stopping the engine. In this way, the hybrid vehicle can improve the fuel consumption of the vehicle in comparison to an ordinary vehicle, which obtains the drive force only from the engine.

The heat exchange system, which is applied to the vehicle air conditioning system 1 of the present embodiment, includes the vehicle refrigeration cycle system 10 and a coolant circulation circuit (serving as a fluid circuit) 40. The vehicle refrigeration cycle system 10 is a vapor compression refrigeration cycle. The coolant circulation circuit 40 circulates engine coolant (serving as heating medium or temperature-adjustable fluid) through a coolant circuit passage (also referred to as a fluid circuit passage) 40a to cool the engine 200 that is an external heat source.

The vehicle refrigeration cycle system 10 of the present embodiment has the function of cooling the cabin conditioning air. In the vehicle refrigeration cycle system 10 of the present embodiment, the outdoor heat exchanger 19 is connected to the outlet of the compressor 11, and the receiver 24 is placed at the outlet of the outdoor heat exchanger 19. The refrigerant, which is outputted from the outdoor heat exchanger 19, is separated into gas-phase refrigerant and liquid-phase refrigerant at the receiver 24, and excessive liquid phase refrigerant is accumulated in the receiver 24. A liquid phase refrigerant outlet of the receiver 24 is connected to an inlet of a thermostatic expansion valve 25, and an outlet of the thermostatic expansion valve 25 is connected to the inlet of the second heat exchanging arrangement 132 of the unified heat exchanger 13.

The thermostatic expansion valve 25 includes a temperature sensing device (not shown) that is placed at a portion of the refrigerant flow path, which is located at the outlet of the second heat exchanging arrangement 132 of the unified heat exchanger 13. The heat sensing device senses a degree of superheat of the refrigerant at the outlet of the second heat exchanging arrangement 132 based on the temperature and the pressure of the second heat exchanging arrangement 132. The thermostatic expansion valve 25 adjusts a degree of opening thereof through a mechanical mechanism such that the degree of superheat of the refrigerant at the outlet of the second heat exchanging arrangement 132 stays in a predetermined range, so that the thermostatic expansion valve 25 functions as a depressurizing device (depressurizing means) of the depressurizing mechanism 7.

The structure of the unified heat exchanger 13 of the present embodiment is basically the same as that of the first embodiment. In the second heat exchanging arrangement 132 of the unified heat exchanger 13 of the present embodiment, the low pressure refrigerant, which is depressurized and expanded through the thermostatic expansion valve 25, is evaporated through heat exchange between the low pressure refrigerant and the cabin conditioning air, so that the cabin conditioning air is cooled. Therefore, the second heat exchanging arrangement 132 of the unified heat exchanger 13 of the present embodiment is a cooling heat exchanging arrangement for cooling the cabin conditioning air. The outlet of the second heat exchanging arrangement 132 of the unified heat exchanger 13 is connected to the inlet of the compressor 11.

The high pressure refrigerant of the vehicle refrigeration cycle system 10 of the present embodiment corresponds to the refrigerant, which flows in the refrigerant flow path that extends from the outlet of the compressor 11 to the inlet of the thermostatic expansion valve 25. Furthermore, the low pressure refrigerant of the vehicle refrigeration cycle system 10 of the present embodiment corresponds to the refrigerant, which flows in the refrigerant flow path that extends from the outlet of the thermostatic expansion valve 25 to the inlet of the compressor 11.

Next, the coolant circulation circuit 40 of the present embodiment will be described. The coolant circulation circuit 40 is a heating medium circulation circuit, which cools the engine 200. Specifically, the engine coolant (e.g., aqueous ethylene glycol solution), which serves as heating medium, is guided thorough a coolant passage formed in the engine 200 that serves as the external heat source, so that the engine 200 is cooled.

A coolant pump 41 is placed in the coolant circuit passage 40a of the coolant circulation circuit 40 to pump the engine coolant to the coolant passage formed in the engine 200. The coolant pump 41 is an electric water pump, and a rotational speed (suction flow quantity) of the coolant pump 41 is controlled by a control signal outputted from the control unit 100 (see FIG. 1).

An outlet of the coolant pump 41 is connected to an inlet of the coolant passage, which is formed in the engine 200. The inlet of the first heat exchanging arrangement 131 of the unified heat exchanger 13 and an inlet of a bypass passage 42, which conducts the engine coolant while bypassing the first heat exchanging arrangement 131, are both connected to an outlet of the coolant passage, which is formed in the engine 200, through a branching portion, at which the bypass passage 42 is branched in the coolant circuit passage 40a.

The engine coolant, which is outputted from the coolant passage formed in the engine 200, exchanges the heat with the cabin conditioning air at the first heat exchanging arrangement 131 of the unified heat exchanger 13 of the present embodiment, so that the heat of the engine coolant is released to the cabin conditioning air to heat the cabin conditioning air. Thereby, the first heat exchanging arrangement 131 functions as a heating heat exchanging arrangement for heating the cabin conditioning air.

As discussed above, in the unified heat exchanger 13 of the present embodiment, the engine coolant flows through the first heat exchanging arrangement 131, and the low pressure refrigerant flows through the second heat exchanging arrangement 132. Therefore, in the unified heat exchanger 13, the heat exchange between the engine coolant and the cabin conditioning air takes place at the first heat exchanging arrangement 131, and the heat exchange between the low pressure refrigerant and the cabin conditioning air takes place at the second heat exchanging arrangement 132. In the present embodiment, the engine coolant corresponds to the first fluid, and the low pressure refrigerant corresponds to the second fluid. The cabin conditioning air corresponds to the subject heat exchanging fluid.

An opening and closing valve 43 is placed in the coolant passage, which extends from the outlet of the coolant pump 41 to the inlet of the first heat exchanging arrangement 131, such that the opening and closing valve 43 opens or closes this coolant passage. The opening and closing valve 43 is a solenoid valve, which is controlled to be opened or closed by a control signal (control voltage) outputted from the control unit 100.

In the coolant circulation circuit 40, when the control unit 100 drives the coolant pump 41, the engine coolant absorbs the waste heat of the engine 200 to cool the engine 200 at the time of passing through the engine 200. Furthermore, the coolant, which is heated by the waste heat of the engine 200 upon absorbing of the same, is supplied to the first heat exchanging arrangement 131 of the unified heat exchanger 13 where the coolant releases the heat to the cabin conditioning air. As discussed above, the engine 200 also functions as the external heat source, which heats the coolant.

Next, operations of the present embodiment will be described. The operation(s), which is similar to the one discussed in the above embodiment(s), will not be described redundantly or will be described briefly.

(a) Heating Operation

At the time of executing the heating operation, the control unit 100 opens the opening and closing valve 43 of the coolant circulation circuit 40, so that the flow passage is switched to the circulation flow passage, through which the engine coolant is supplied from the engine 200 to the first heat exchanging arrangement 131 of the unified heat exchanger 13. Then, the control unit 100 determines the operational states of the control subject devices, which are connected to the output-side of the control unit 100, based on the measurement signals of the sensors and the manipulation signals of the manipulation panel.

For instance, the control signal, which is outputted to the electric motor 11b of the compressor 11, is determined such that the operation of the compressor 11 is stopped. Furthermore, the control signal (suction flow quantity), which is outputted to the coolant pump 41, is determined such that the temperature of the cabin conditioning air, which is outputted from the unified heat exchanger 13, approaches the target outlet air temperature TAO.

In this way, at the coolant circulation circuit 40, the engine coolant, which is heated by the waste heat of the engine 200, is supplied to the first heat exchanging arrangement 131 of the unified heat exchanger 13. Then, the engine coolant, which is supplied to the first heat exchanging arrangement 131, exchanges the heat with the cabin conditioning air, so that the cabin conditioning air is heated. At the vehicle refrigeration cycle system 10, the refrigerant does not circulate, so that the heat exchange between the low pressure refrigerant and the cabin conditioning air does not take place at the second heat exchanging arrangement 132 of the unified heat exchanger 13.

As discussed above, at the time of executing the heating operation, the cabin conditioning air, which is heated through the heat exchange with the engine coolant at the first heat exchanging arrangement 131 of the unified heat exchanger 13, can be blown into the vehicle cabin, so that the heating of the vehicle cabin can be achieved.

Here, at the time of executing the heating operation of the present embodiment, the amount of heat exchange between the engine coolant and the cabin conditioning air at the first heat exchanging arrangement 131 can be adjusted by adjusting the flow quantity of the engine coolant, which is supplied to the first heat exchanging arrangement 131, and this adjustment of the flow quantity of the engine coolant can be achieved by changing the rotational speed of the coolant pump 41.

Therefore, the temperature of the cabin conditioning air can be adjusted to the desired temperature, which corresponds to the target outlet air temperature that is set for the heating operation, at the unified heat exchanger 13. In the heating operation of the present embodiment, the coolant pump 41 functions as a heat exchange amount adjusting device (heat exchange amount adjusting means) of the heat exchange amount adjusting mechanism 6.

(b) Cooling Operation

At the time of executing the cooling operation, the control unit 100 closes the opening and closing valve 43 of the coolant circulation circuit 40, so that the flow passage is switched to the coolant flow passage, through which the engine coolant flows while bypassing the first heat exchanging arrangement 131 of the unified heat exchanger 13. Furthermore, the control signal, which is outputted from the control unit 100 to the electric motor 11b of the compressor 11, is determined such that the outlet air temperature at the outlet of the unified heat exchanger 13 approaches the target outlet air temperature TAO.

In the vehicle refrigeration cycle system 10, the refrigerant, which is outputted from the compressor 11, is supplied to the outdoor heat exchanger 19 and releases the heat to the outside air that is blown from the blower fan 20. The high pressure refrigerant, which is outputted from the outdoor heat exchanger 19, is separated into the gas-phase refrigerant and the liquid-phase refrigerant at the receiver 24, and the separated liquid phase refrigerant is supplied from the receiver 24 to the thermostatic expansion valve 25, at which the separated liquid phase refrigerant is depressurized and expanded.

The low pressure refrigerant, which is depressurized and expanded by the thermostatic expansion valve 25, is supplied to the second heat exchanging arrangement 132 of the unified heat exchanger 13. The low pressure refrigerant, which is supplied to the second heat exchanging arrangement 132 of the unified heat exchanger 13, absorbs the heat from the cabin conditioning air that is blown from the blower 32, so that the refrigerant is evaporated to cool the cabin conditioning air. The engine coolant flows in the coolant circulation circuit 40 while bypassing the first heat exchanging arrangement 131 of the unified heat exchanger 13, so that the heat exchange between the engine coolant and the cabin conditioning air does not take place at the first heat exchanging arrangement 131.

As discussed above, at the time of executing the cooling operation, the cabin conditioning air, which is cooled through the heat exchange with the low pressure refrigerant at the second heat exchanging arrangement 132 of the unified heat exchanger 13, can be blown into the vehicle cabin, so that the cooling of the vehicle cabin can be achieved.

Here, at the time of executing the cooling operation of the present embodiment, the amount of heat exchange between the low pressure refrigerant and the cabin conditioning air at the second heat exchanging arrangement 132 of the unified heat exchanger 13 can be adjusted by adjusting the temperature (pressure) of the low pressure refrigerant, which is supplied to the second heat exchanging arrangement 132, and this adjustment of the temperature (pressure) of the low pressure refrigerant can be achieved by changing the rotational speed of the compressor 11.

Therefore, the temperature of the cabin conditioning air can be adjusted to the desired temperature, which corresponds to the target outlet air temperature that is set for the cooling operation, at the unified heat exchanger 13. In the cooling operation of the present embodiment, the compressor 11 functions as the heat exchange amount adjusting device (heat exchange amount adjusting means) of the heat exchange amount adjusting mechanism 6.

(c) Dehumidifying and Heating Operation

At the time of executing the dehumidifying and heating operation, the control unit 100 closes the opening and closing valve 43 of the coolant circulation circuit 40, so that the flow passage is switched to the coolant flow passage, through which the engine coolant flows while bypassing the first heat exchanging arrangement 131 of the unified heat exchanger 13. Then, the control unit 100 determines the operational states of the control subject devices, which are connected to the output-side of the control unit 100, based on the measurement signals of the sensors and the manipulation signals of the manipulation panel.

For example, the control signal, which is outputted to the electric motor 11b of the compressor 11, is determined such that the temperature of the cabin conditioning air becomes equal to or lower than a predetermined dew-point temperature. In contrast, the control signal, which is outputted to the coolant pump 41, is determined such that the outlet air temperature at the outlet of the unified heat exchanger 13 approaches the target outlet air temperature TAO.

In this way, in the vehicle refrigeration cycle system 10, the low pressure refrigerant, which is supplied to the second heat exchanging arrangement 132 of the unified heat exchanger 13, absorbs the heat from the cabin conditioning air that is blown from the blower 32, so that the refrigerant is evaporated to dehumidify and cool the cabin conditioning air.

Furthermore, in the coolant circulation circuit 40, the engine coolant, which is supplied to the first heat exchanging arrangement 131 of the unified heat exchanger 13, releases the heat to the cabin conditioning air, and thereby the cabin conditioning air is heated.

As discussed above, at the time of executing the dehumidifying and heating operation, the cabin conditioning air, which is heated through the heat exchange with the engine coolant at the first heat exchanging arrangement 131 of the unified heat exchanger 13, can be blown into the vehicle cabin, so that the dehumidifying and heating of the vehicle cabin can be achieved.

Here, at the time of executing the dehumidifying and heating operation of the present embodiment, the amount of heat exchange between the low pressure refrigerant and the cabin conditioning air at the second heat exchanging arrangement 132 of the unified heat exchanger 13 can be adjusted by adjusting the temperature (pressure) of the low pressure refrigerant, which is supplied to the second heat exchanging arrangement 132, and this adjustment of the temperature (pressure) of the low pressure refrigerant can be achieved by changing the rotational speed of the compressor 11. In addition, the amount of heat exchange between the engine coolant and the cabin conditioning air at the first heat exchanging arrangement 131 of the unified heat exchanger 13 can be adjusted by adjusting the flow quantity of the engine coolant supplied to the first heat exchanging arrangement 131, and this adjustment of the flow quantity of the engine coolant supplied to the first heat exchanging arrangement 131 can be achieved by changing the rotational speed of the coolant pump 41.

Therefore, it is possible to adjust the temperature of the cabin conditioning air to the desired temperature, which corresponds to the target outlet air temperature that is set for the dehumidifying and heating operation. In the dehumidifying and heating operation of the present embodiment, the compressor 11 and the coolant pump 41 function as the heat exchange amount adjusting devices (heat exchange amount adjusting means) of the heat exchange amount adjusting mechanism 6.

As discussed above, in the heat exchange system of the present embodiment, the flow quantity of the engine coolant, which is supplied to the first heat exchanging arrangement 131 of the unified heat exchanger 13, is adjusted by the coolant pump 41, and the temperature of the low pressure refrigerant, which is supplied to the second heat exchanging arrangement 132 of the unified heat exchanger 13, is adjusted by the compressor 11. Thereby, the amount of heat exchange between the engine coolant and the cabin conditioning air at the first heat exchanging arrangement 131 and the amount of heat exchange between the low pressure refrigerant and the cabin conditioning air at the second heat exchanging arrangement 132 can be adjusted.

In this way, the temperature of the cabin conditioning air can be adjusted in the wide range by the unified heat exchanger 13. Therefore, similar to the first embodiment, the temperature of the cabin conditioning air can be adjusted to the desired temperature, which corresponds to the target outlet air temperature that is set for the cooling operation, the heating operation or the dehumidifying and heating operation.

As discussed above, in the present embodiment, at the time of executing the dehumidifying and heating operation, the flow quantity of the engine coolant, which is supplied to the first heat exchanging arrangement 131, and the temperature of the low pressure refrigerant, which is supplied to the second heat exchanging arrangement 132, are both adjusted, so that the amount of heat exchange at each of the first and second heat exchanging arrangements 131, 132 is adjusted. Alternatively, the temperature of the cabin conditioning air may be adjusted by adjusting the amount of heat exchange only at one of the first and second heat exchanging arrangements 131, 132 through adjustment of only one of the flow quantity of the engine coolant, which is supplied to the first heat exchanging arrangement 131, and the temperature of the low pressure refrigerant, which is supplied to the second heat exchanging arrangement 132.

Fourth Embodiment

Figure 8:
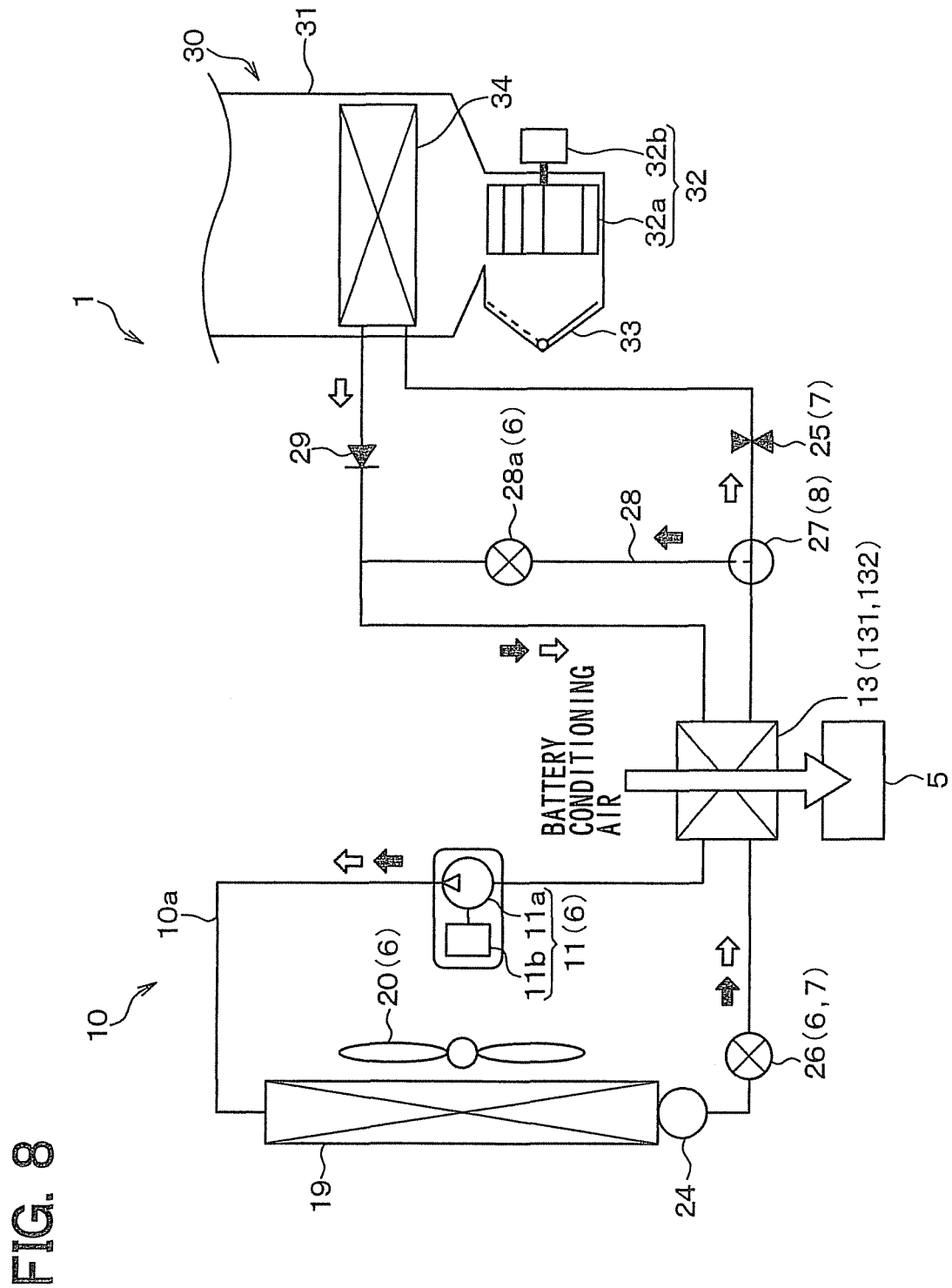
FIG. 8 is a schematic diagram showing a structure of a vehicle air conditioning system according to a fourth embodiment of the present disclosure.

Next, a fourth embodiment of the present disclosure will be described with reference to FIG. 8. FIG. 8 is a schematic diagram showing a vehicle air conditioning system of the present embodiment.

In the present embodiment, the heat exchange system of the present disclosure is applied to the vehicle air conditioning system 1, which is also functional as a temperature adjusting system that adjusts the temperature of a vehicle battery 5 installed in the hybrid vehicle. The heat exchange system, which is applied to the vehicle air conditioning system 1 of the present disclosure, is formed by the components of the vehicle refrigeration cycle system 10.

The vehicle battery 5 functions as an electric power storage device or mechanism (electric power storage means), which stores electric power to be supplied to various electric devices installed in the vehicle. The vehicle battery 5 is a subject operational device, which needs to be operated (charged or discharged) in a predetermined temperature range. For example, when the vehicle battery 5 is operated (discharging its electricity) in a state where the temperature (i.e., the battery temperature) of the vehicle battery 5 is equal to or lower than a predetermined lower limit temperature, the vehicle battery 5 may not be able to have its proper function. Furthermore, when the vehicle battery 5 is operated in a state where the temperature of the vehicle battery 5 is equal to or higher than a predetermined upper limit temperature, the vehicle battery 5 may be rapidly deteriorated. A battery temperature sensor, which senses the battery temperature, is provided to the vehicle battery 5, and a measurement signal of the battery temperature sensor is outputted to the control unit 100 (see FIG. 1).

The vehicle refrigeration cycle system 10 of the present embodiment has a function of heating or cooling the air (hereinafter referred to as battery conditioning air) to be blown to the vehicle battery 5 in addition to the function of cooling the cabin conditioning air. Specifically, the vehicle refrigeration cycle system 10 can execute a temperature-adjusting operation and a warming-up operation by switching the refrigerant flow path. In the temperature-adjusting operation, the temperature of the battery conditioning air is adjusted to adjust the temperature of the vehicle battery 5 into a predetermined temperature range. In the warming-up operation, the battery conditioning air is heated to rapidly raise the temperature of the vehicle battery 5.

In the vehicle refrigeration cycle system 10 of the present embodiment, the outdoor heat exchanger 19 is connected to the outlet of the compressor 11, and the receiver 24 is placed at the outlet of the outdoor heat exchanger 19. The outlet of the liquid phase refrigerant of the receiver 24 is connected to an inlet of a first solenoid valve 26, which has a full-opening function. An outlet of the first solenoid valve 26 is connected to the inlet of the first heat exchanging arrangement 131 of the unified heat exchanger 13.

The first solenoid valve 26 has an electrically variable throttle mechanism, which is controlled by a control signal (control voltage) outputted from the control unit 100 and can adjust an opening degree (a throttle opening degree) of the coolant passage that extends from the outlet of the receiver 24 to the inlet of the first heat exchanging arrangement 131 of the unified heat exchanger 13. The first solenoid valve 26 has the full-opening function, which fully opens the refrigerant passage, in addition to a function of a depressurizing device (depressurizing means) of the depressurizing mechanism 7, which depressurizes and expands the refrigerant that is outputted from the outdoor heat exchanger 19.

Here, the structure of the unified heat exchanger 13 of the present embodiment is basically the same as that of the first embodiment. The unified heat exchanger 13 of the present embodiment is placed on the upstream side of the vehicle battery 5 in the flow direction of the battery conditioning air blown from a battery blower fan (not shown) in the air passage. The unified heat exchanger 13 adjusts the temperature of the battery conditioning air to be blown toward the vehicle battery 5. The operation of the battery blower fan is controlled by a control signal outputted from the control unit 100.

The inlet of the thermostatic expansion valve 25 and an inlet of a bypass passage 28 are connected to the outlet of the first heat exchanging arrangement 131 of the unified heat exchanger 13 through an electric three-way valve 27.

The operation of the three-way valve 27 is controlled by a control signal (control voltage), which is outputted from the control unit 100. More specifically, the three-way valve 27 functions as a refrigerant flow path switching device (refrigerant flow path switching means) of the refrigerant flow path switching mechanism 8 that switches between the refrigerant flow path, which connects between the outlet of the first heat exchanging arrangement 131 of the unified heat exchanger 13 and the inlet of the thermostatic expansion valve 25, and the refrigerant flow path, which connects between the outlet of the first heat exchanging arrangement 131 of the unified heat exchanger 13 and the inlet of the bypass passage 28.

The bypass passage 28 is a refrigerant passage, which conducts the refrigerant outputted from the first heat exchanging arrangement 131 of the unified heat exchanger 13 while bypassing an indoor evaporator 34. An outlet of the bypass passage 28 is connected to the inlet of the second heat exchanging arrangement 132 of the unified heat exchanger 13.

A second solenoid valve 28a is placed in the bypass passage 28. The second solenoid valve 28a has an electrically variable throttle mechanism, which is controlled by a control signal (control voltage) outputted from the control unit 100 described below and can adjust an opening degree (a throttle opening degree) of the bypass passage 28. The second solenoid valve 28a has a function of a depressurizing device (depressurizing means) of the depressurizing mechanism 7, which depressurizes and expands the refrigerant that is supplied to the bypass passage 28.

An inlet of the indoor evaporator 34 is connected to an outlet of the thermostatic expansion valve 25. The indoor evaporator 34 is a cooling heat exchanger that is placed in the casing 31 of the indoor air conditioning unit 30 and exchanges heat between the refrigerant, which flows in the inside of the indoor evaporator 34, and the cabin conditioning air.

The inlet of the second heat exchanging arrangement 132 of the unified heat exchanger 13 is connected to the outlet of the indoor evaporator 34 in series through a check valve 29. The outlet of the second heat exchanging arrangement 132 is connected to the inlet of the outdoor heat exchanger 19 in series, and the outlet of the outdoor heat exchanger 19 is connected to the inlet of the first heat exchanging arrangement 131 in series. The inlet of the indoor evaporator 34 is connected to the outlet of the first heat exchanging arrangement 131 of the unified heat exchanger 13 in series. The series connections of the indoor evaporator 34 and the outdoor heat exchanger 19 to the first and second heat exchanging arrangements 131, 132 enable a reduction in the length of the refrigerant circuit passage 10a in comparison to the parallel connection. Therefore, the required installation space can be further reduced in comparison to the case of the parallel connections. The inlet of the compressor 11 is connected to the outlet of the second heat exchanging arrangement 132 of the unified heat exchanger 13.

As discussed above, in the unified heat exchanger 13 of the present embodiment, the high pressure refrigerant flows through the first heat exchanging arrangement 131, and the low pressure refrigerant flows through the second heat exchanging arrangement 132. Therefore, in the unified heat exchanger 13, the heat exchange between the high pressure refrigerant and the battery conditioning air takes place at the first heat exchanging arrangement 131, and the heat exchange between the low pressure refrigerant and the battery conditioning air takes place at the second heat exchanging arrangement 132. In the present embodiment, the high pressure refrigerant corresponds to the first fluid, and the low pressure refrigerant corresponds to the second fluid. The battery conditioning air serves as subject heat exchanging fluid (temperature adjusting medium).

Here, the check valve 29 enables the flow of the refrigerant from the outlet of the indoor evaporator 34 toward the inlet of the compressor 11 and disable the flow of the refrigerant from the inlet of the compressor 11 toward the outlet of the indoor evaporator 34. The check valve 29 can limit the refrigerant of the bypass passage 28 to flow toward the outlet of the indoor evaporator 34.

Next, the indoor air conditioning unit 30 of the present embodiment will be described. In the indoor air conditioning unit 30 of the present embodiment, a heater core is placed on the downstream side of the indoor evaporator 34 in the flow direction of the cabin conditioning air. The engine coolant, which is circulated through the engine, exchanges the heat with the cabin conditioning air at the heater core.

Next, the operation of the vehicle air conditioning system 1 of the present embodiment, which is now functioned as the temperature adjusting system, will be described. The vehicle air conditioning system 1 of the present embodiment can execute the temperature-adjusting operation, which adjusts the temperature of the vehicle battery 5 to the predetermined temperature range, and also the warming-up operation, which raises the temperature of the vehicle battery 5. The execution of one of the temperature-adjusting operation and the warming-up operation is determined based on the measurement signal of the battery temperature sensor.

(a) Temperature-Adjusting Operation

The temperature-adjusting operation is executed, for example, when the temperature of the vehicle battery 5 deviates from the predetermined temperature range. First of all, at the time of executing the temperature-adjusting operation, the control unit 100 closes the second solenoid valve 28a of the bypass passage 28 and switches the three-way valve 27 to the refrigerant flow path, which connects between the outlet of the first heat exchanging arrangement 131 of the unified heat exchanger 13 and the inlet of the indoor evaporator 34. In this way, the refrigerant, which is outputted from the compressor 11, flows in the vehicle refrigeration cycle system 10 in the direction of the white open arrows in the refrigerant circuit passage 10a in FIG. 8.

Then, the control unit 100 computes the target outlet air temperature of the battery conditioning air based on the measurement signals of the sensors and the manipulation signals of the manipulation panel. Thereafter, the control unit 100 determines the operational states of the control subject devices, which are connected to the output side of the control unit 100, based on the target outlet air temperature of the battery conditioning air and the measurement signals of the sensors.

For example the control signal, which is outputted from the control unit 100 to the first solenoid valve 26, is determined such that the opening degree of the first solenoid valve 26 becomes a predetermined opening degree (throttle opening degree). More specifically, the control signal outputted to the first solenoid valve 26 is determined as follows. That is, in the case where the vehicle battery 5 needs to be cooled (the case where the temperature of the vehicle battery 5 becomes higher than the predetermined temperature range), the control signal outputted to the first solenoid valve 26 is determined to reduce the throttle opening degree of the first solenoid valve 26 to increase the temperature of the refrigerant supplied to the first heat exchanging arrangement 131. In contrast, in the case where the vehicle battery 5 needs to be heated (the case where the temperature of the vehicle battery 5 is lower than the predetermined temperature range), the control signal outputted to the first solenoid valve 26 is determined to increase the throttle opening degree of the first solenoid valve 26 to reduce the temperature of refrigerant supplied to the first heat exchanging arrangement 131.

In the vehicle refrigeration cycle system 10, the refrigerant (high pressure refrigerant), which is outputted from the compressor 11, is supplied to the outdoor heat exchanger 19 and releases the heat to the outside air that is blown from the blower fan 20. The high pressure refrigerant, which is outputted from the outdoor heat exchanger 19, is separated into the gas-phase refrigerant and the liquid-phase refrigerant at the receiver 24, and the separated liquid phase refrigerant is supplied from the receiver 24 to the first solenoid valve 26, at which the separated liquid phase refrigerant is depressurized and expanded.

The refrigerant, which is depressurized and expanded by the first solenoid valve 26, is supplied to the first heat exchanging arrangement 131 of the unified heat exchanger 13. The refrigerant, which is supplied to the first heat exchanging arrangement 131 of the unified heat exchanger 13, exchanges the heat with the battery conditioning air, which is blown from the battery blower fan, so that the temperature of the battery conditioning air is adjusted.

The refrigerant, which is outputted from the first heat exchanging arrangement 131 of the unified heat exchanger 13 is depressurized and expanded at the thermostatic expansion valve 25 and is supplied to the indoor evaporator 34. The refrigerant, which is supplied to the indoor evaporator 34, is evaporated upon exchanging the heat with the cabin conditioning air, so that the cabin conditioning air is cooled.

The refrigerant, which is outputted from the indoor evaporator 34, is supplied to the second heat exchanging arrangement 132 of the unified heat exchanger 13. The refrigerant, which is supplied to the second heat exchanging arrangement 132 of the unified heat exchanger 13, exchanges the heat with the battery conditioning air, which is blown from the battery blower fan, so that the temperature of the battery conditioning air is adjusted.

As discussed above, at the time of executing the temperature-adjusting operation, the battery conditioning air, the temperature of which is adjusted through the heat exchange with the refrigerant of the first heat exchanging arrangement 131 of the unified heat exchanger 13, is blown toward the vehicle battery 5, so that the temperature adjustment of the vehicle battery 5 is achieved.

Here, at the time of executing the temperature-adjusting operation of the present embodiment, the amount of heat exchange between the refrigerant and the battery conditioning air at the first heat exchanging arrangement 131 of the unified heat exchanger 13 can be adjusted by adjusting the temperature (pressure) of the high pressure refrigerant, which is supplied to the first heat exchanging arrangement 131, and this adjustment of the temperature (pressure) of the high pressure refrigerant can be achieved by changing the throttle opening degree of the first solenoid valve 26. Therefore, it is possible to adjust the temperature of the battery conditioning air to the desired temperature, which corresponds to the target outlet air temperature. In the temperature-adjusting operation of the present embodiment, the first solenoid valve 26 functions as a heat exchange amount adjusting device (heat exchange amount adjusting means) of the heat exchange amount adjusting mechanism 6.

In the temperature-adjusting operation of the present embodiment, the high pressure refrigerant corresponds to the refrigerant, which flows in the refrigerant flow path that extends from the outlet of the compressor 11 to the inlet of the thermostatic expansion valve 25. Furthermore, the low pressure refrigerant corresponds to the refrigerant, which flows in the refrigerant flow path that extends from the outlet of the thermostatic expansion valve 25 to the inlet of the compressor 11.

(b) Warming-Up Operation

The warming-up operation is executed, for example, when the temperature of the vehicle battery 5 is lower than the predetermined lower limit temperature at the time of, for example, starting the vehicle operation. First of all, at the time of executing the warming-up operation, the control unit 100 opens the second solenoid valve 28a of the bypass passage 28 and switches the three-way valve 27 to the refrigerant flow path, which connects between the outlet of the first heat exchanging arrangement 131 of the unified heat exchanger 13 and the bypass passage 28. In this way, the refrigerant, which is outputted from the compressor 11, flows in the vehicle refrigeration cycle system 10 in the direction of the black arrows in the refrigerant circuit passage 10a in FIG. 8.

Then, the control signal, which is outputted from the control unit 100 to the first solenoid valve 26, is determined such that the first solenoid valve 26 fully opens the refrigerant passage, which extends from the outlet of the receiver 24 to the inlet of the first heat exchanging arrangement 131 of the unified heat exchanger 13. The signal, which is outputted from the control unit 100 to the second solenoid valve 28a, is determined such that the second solenoid valve 28a has a predetermined throttle opening degree that results in the temperature of the vehicle battery 5 being equal to or higher than the lower limit temperature. Furthermore, the control signal, which is outputted to the blower fan 20, is determined such that the operation of the blower fan 20 is stopped.

In the vehicle refrigeration cycle system 10, the refrigerant, which is outputted from the compressor 11, is supplied to the outdoor heat exchanger 19 and is outputted from the outdoor heat exchanger 19 without releasing the heat to the outside air. Then, the refrigerant, which is outputted from the outdoor heat exchanger 19, is supplied to the first solenoid valve 26 through the receiver 24 and is outputted from the first solenoid valve 26 without being depressurized and expanded.

The refrigerant, which is outputted from the first solenoid valve 26, is supplied to the first heat exchanging arrangement 131 of the unified heat exchanger 13. The refrigerant, which is supplied to the first heat exchanging arrangement 131 of the unified heat exchanger 13, releases the heat to the battery conditioning air that is blown from the battery blower fan, so that the battery conditioning air is heated. Then, the refrigerant, which is outputted from the first heat exchanging arrangement 131 of the unified heat exchanger 13, is supplied to the bypass passage 28, and the refrigerant is depressurized and expanded by the second solenoid valve 28a in the bypass passage 28.

The refrigerant, which is depressurized and expanded by the second solenoid valve 28a, is supplied to the second heat exchanging arrangement 132 of the unified heat exchanger 13. The refrigerant, which is supplied to the second heat exchanging arrangement 131 of the unified heat exchanger 13, absorbs the heat from the battery conditioning air that is blown from the battery blower fan, so that the battery conditioning air is cooled.

As discussed above, at the time of executing the warming-up operation, the heat of the refrigerant, which is outputted from the compressor 11, is not released at the outdoor heat exchanger 19 and is released at the first heat exchanging arrangement 131 of the unified heat exchanger 13. Therefore, the temperature of the battery conditioning air can be increased more rapidly in comparison to the time of executing the temperature-adjusting operation. In this way, the battery conditioning air, which is temperature adjusted at the unified heat exchanger 13, can be blown toward the vehicle battery 5, so that the warming-up of the vehicle battery 5 can be achieved earlier.

Here, at the time of executing the temperature-adjusting operation of the present embodiment, the amount of heat exchange between the refrigerant and the battery conditioning air at the second heat exchanging arrangement 132 of the unified heat exchanger 13 can be adjusted by adjusting the temperature (pressure) of the low pressure refrigerant at the second heat exchanging arrangement 132, and this adjustment of the temperature (pressure) of the low pressure refrigerant can be achieved by changing the throttle opening degree of the second solenoid valve 28a. Therefore, it is possible to adjust the temperature of the battery conditioning air to the desired temperature, which corresponds to the target outlet air temperature that is set for the warming-up operation. In the warming-up operation of the present embodiment, the second solenoid valve 28a functions as a heat exchange amount adjusting device (heat exchange amount adjusting means) of the heat exchange amount adjusting mechanism 6.

At the time of executing the warming-up operation of the present embodiment, the high pressure refrigerant corresponds to the refrigerant, which flows in the refrigerant flow path that extends from the outlet of the compressor 11 to the inlet of the second solenoid valve 28a. Furthermore, the low pressure refrigerant corresponds to the refrigerant, which flows in the refrigerant flow path that extends from the outlet of the second solenoid valve 28a to the inlet of the compressor 11.

In the heat exchange system, in which the temperature adjusting system of the present embodiment is applied, the temperature of the high pressure refrigerant, which is supplied to the first heat exchanging arrangement 131 of the unified heat exchanger 13, and the temperature of the low pressure refrigerant, which is supplied to the second heat exchanging arrangement 132, are adjusted through the first and second solenoid valves 26, 28a, respectively. Thereby, the amount of heat exchange between the refrigerant and the battery conditioning air at each heat exchanging arrangement 131, 132 of the unified heat exchanger 13 can be adjusted.

In this way, the temperature of the battery conditioning air can be adjusted in the wide range by the unified heat exchanger 13. Therefore, the temperature of the battery conditioning air can be adjusted to the desired temperature, which corresponds to the target outlet air temperature that is set for the temperature-adjusting operation or the warming-up operation. As a result, the vehicle battery 5 can be appropriately operated.

Furthermore, in the present embodiment, in the case where the temperature adjustment of the vehicle battery 5 is not required (e.g., the case where the temperature of the vehicle battery 5 is in the predetermined temperature range), the unified heat exchanger 13 can be functioned as an inside heat exchanger that exchanges the heat between the refrigerant (high pressure refrigerant), which is outputted from the outdoor heat exchanger 19 of the vehicle refrigeration cycle system 10, and the low pressure refrigerant, which is outputted from the indoor evaporator 34.

Fifth Embodiment

Figure 9:
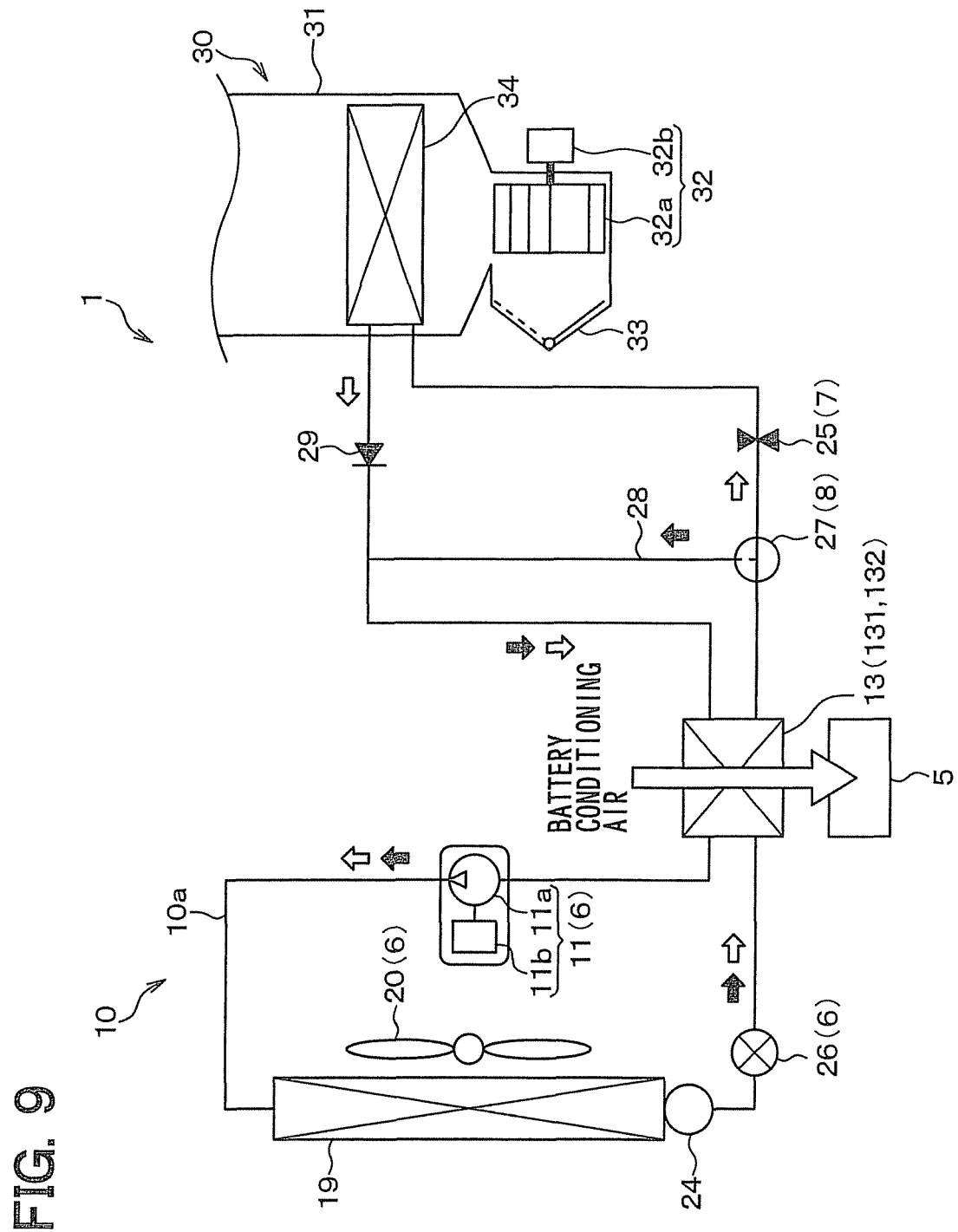
FIG. 9 is a schematic diagram showing a structure of a vehicle air conditioning system according to a fifth embodiment of the present disclosure.

Next, a fifth embodiment of the present disclosure will be described with reference to FIG. 9. FIG. 9 is a schematic diagram showing the structure of the vehicle air conditioning system 1 of the present embodiment. In the present embodiment, the second solenoid valve 28a of the fourth embodiment, which is placed in the bypass passage 28 of the vehicle refrigeration cycle system 10, is eliminated. The structure of the vehicle refrigeration cycle system 10 at the time of executing the temperature-adjusting operation of the present embodiment is the same as that of the fourth embodiment and thereby will not be described in detail.

In the present embodiment, the three-way valve 27 is switched to the refrigerant flow path, which connects between the first heat exchanging arrangement 131 of the unified heat exchanger 13 and the bypass passage 28. The control signal, which is outputted from the control unit 100 (see FIG. 1) to the first solenoid valve 26, is determined such that the throttle opening degree of the first solenoid valve 26 becomes the predetermined throttle opening degree. Furthermore, the control signal, which is outputted to the blower fan 20, is determined such that the operation of the blower fan 20 is stopped.

In the vehicle refrigeration cycle system 10, the refrigerant, which is outputted from the compressor 11, is supplied to the outdoor heat exchanger 19 and is outputted from the outdoor heat exchanger 19 without releasing the heat to the outside air. Then, the refrigerant, which is outputted from the outdoor heat exchanger 19, is supplied to the first solenoid valve 26 through the receiver 24 and is outputted from the first solenoid valve 26 without being depressurized and expanded.

The refrigerant (first fluid), which is outputted from the first solenoid valve 26, is supplied to the first heat exchanging arrangement 131 of the unified heat exchanger 13 and releases the heat to the battery conditioning air blown from the battery blower fan, so that the battery conditioning air is heated.

The refrigerant (second fluid), which is outputted from the first heat exchanging arrangement 131 of the unified heat exchanger 13, is supplied to the second heat exchanging arrangement 132 of the unified heat exchanger 13 through the bypass passage 28 and absorbs the heat from the battery conditioning air that is blown from the battery fan, so that the battery conditioning air is cooled.

As discussed above, at the time of executing the warming-up operation of the present embodiment, similar to the fourth embodiment, the heat of the refrigerant, which is outputted from the compressor 11, is not released at the outdoor heat exchanger 19, so that the temperature of the battery conditioning air can be increased more rapidly in comparison to the time of executing the temperature-adjusting operation.

Here, at the time of executing the warming-up operation of the present embodiment, the amount of heat exchange between the refrigerant and the battery conditioning air at the first heat exchanging arrangement 131 of the unified heat exchanger 13 can be adjusted by adjusting the temperature (pressure) of the refrigerant (first fluid) at the first heat exchanging arrangement 131 of the unified heat exchanger 13, and this adjustment of the temperature (pressure) of the refrigerant (first fluid) at the first heat exchanging arrangement 132 can be achieved by changing the throttle opening degree of the first solenoid valve 26. Therefore, it is possible to adjust the temperature of the battery conditioning air to the desired temperature, which corresponds to the target outlet air temperature that is set for the warming-up operation. In the warming-up operation of the present embodiment, the first solenoid valve 26 functions as the heat exchange amount adjusting device (heat exchange amount adjusting means) of the heat exchange amount adjusting mechanism 6.

Sixth Embodiment

Figure 10:
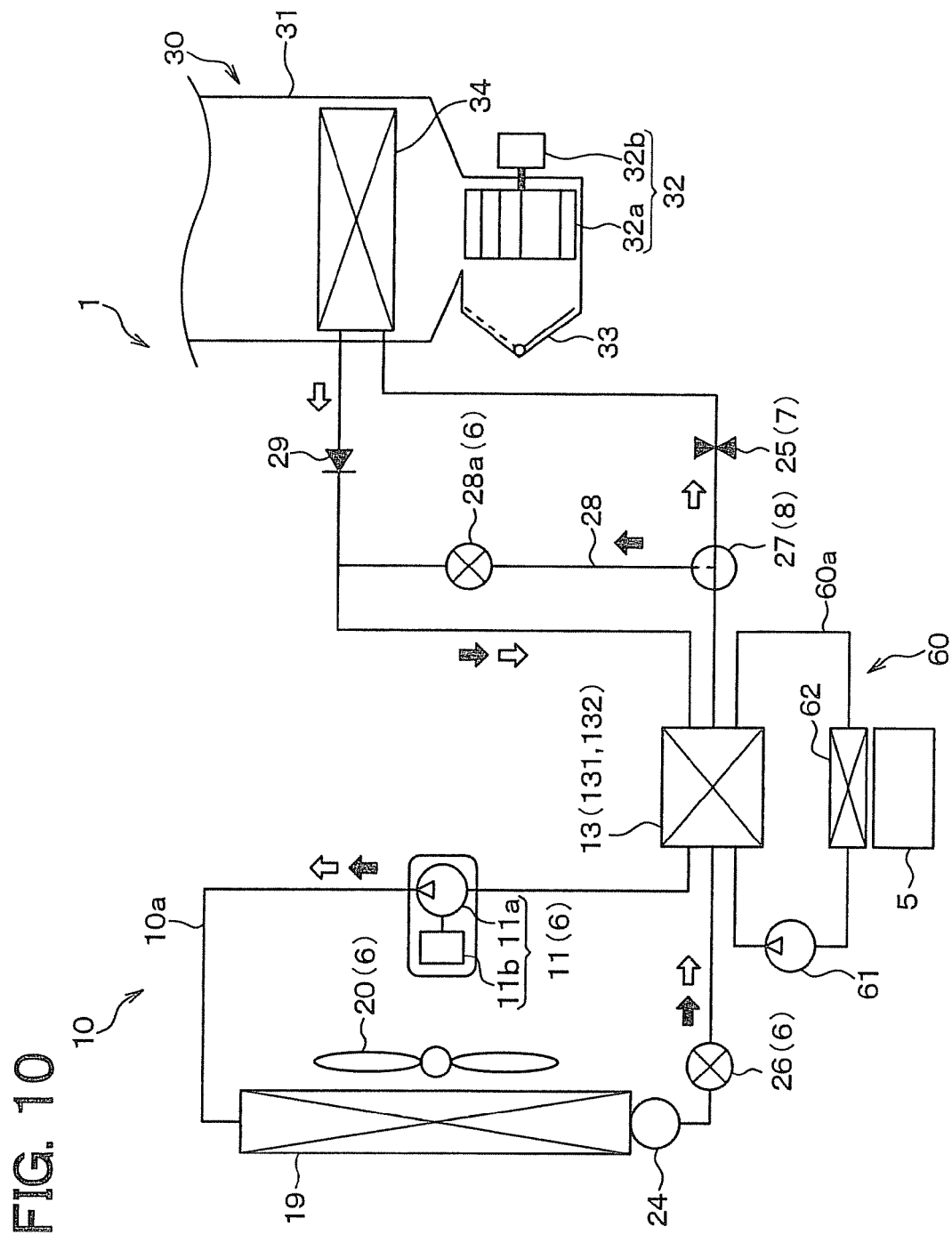
FIG. 10 is a schematic diagram showing a structure of a vehicle air conditioning system according to a sixth embodiment of the present disclosure.

Next, a sixth embodiment of the present disclosure will be described with reference to FIG. 10. FIG. 10 is a schematic diagram showing a vehicle air conditioning system of the present embodiment.

In the present embodiment, a brine circuit 60, which circulates brine (serving as temperature-adjustable fluid) in a brine circuit passage (also referred to as a fluid circuit passage) 60a, is provided. The temperature of the brine is adjusted at the unified heat exchanger 13, and the temperature adjusted brine is used as temperature adjusting medium to adjust the temperature of the vehicle battery 5. Similar to the engine coolant, for example, aqueous ethylene glycol solution may be used as the brine.

The unified heat exchanger 13 of the present embodiment may be constructed as follows. A brine passage, which conducts the brine, is provided between the adjacent high-pressure side tube 131a of the first heat exchanging arrangement 131 and the adjacent low-pressure side tube 132a of the second heat exchanging arrangement 132. The brine is conducted through the brine passage to exchange the heat with both of the refrigerant, which flows in the high-pressure side tube 131a, and the refrigerant, which flows in the low-pressure side tube 132a.

As discussed above, in the unified heat exchanger 13 of the present embodiment, the high pressure refrigerant flows through the first heat exchanging arrangement 131, and the low pressure refrigerant flows through the second heat exchanging arrangement 132. Therefore, in the unified heat exchanger 13, the heat exchange between the high pressure refrigerant and the battery conditioning air takes place at the first heat exchanging arrangement 131, and the heat exchange between the low pressure refrigerant and the battery conditioning air takes place at the second heat exchanging arrangement 132. In the present embodiment, the high pressure refrigerant corresponds to the first fluid, and the low pressure refrigerant corresponds to the second fluid. The battery conditioning air corresponds to subject heat exchanging fluid (subject heat exchanging fluid).

As shown in FIG. 10, in the brine circuit 60, an outlet of a brine pump 61 is connected to an inlet of the brine passage of the unified heat exchanger 13, and the outlet of the brine passage is connected to an inlet of a heat exchanger 62, which is placed adjacent to the vehicle battery 5 in such a manner that heat transfer (thermal connection) is possible between the vehicle battery 5 and the heat exchanger 62. Furthermore, an outlet of the heat exchanger 62 is connected to an inlet of the brine pump 61.

Even with the above structure, similar to the temperature adjusting system of the fourth embodiment, the temperature of the brine can be adjusted to a desired temperature by adjusting the amount of heat exchange between the refrigerant and the brine at each heat exchanging arrangement 131, 132 of the unified heat exchanger 13. In this way, the vehicle battery 5 can be appropriately operated.

Seventh Embodiment

Figure 11:
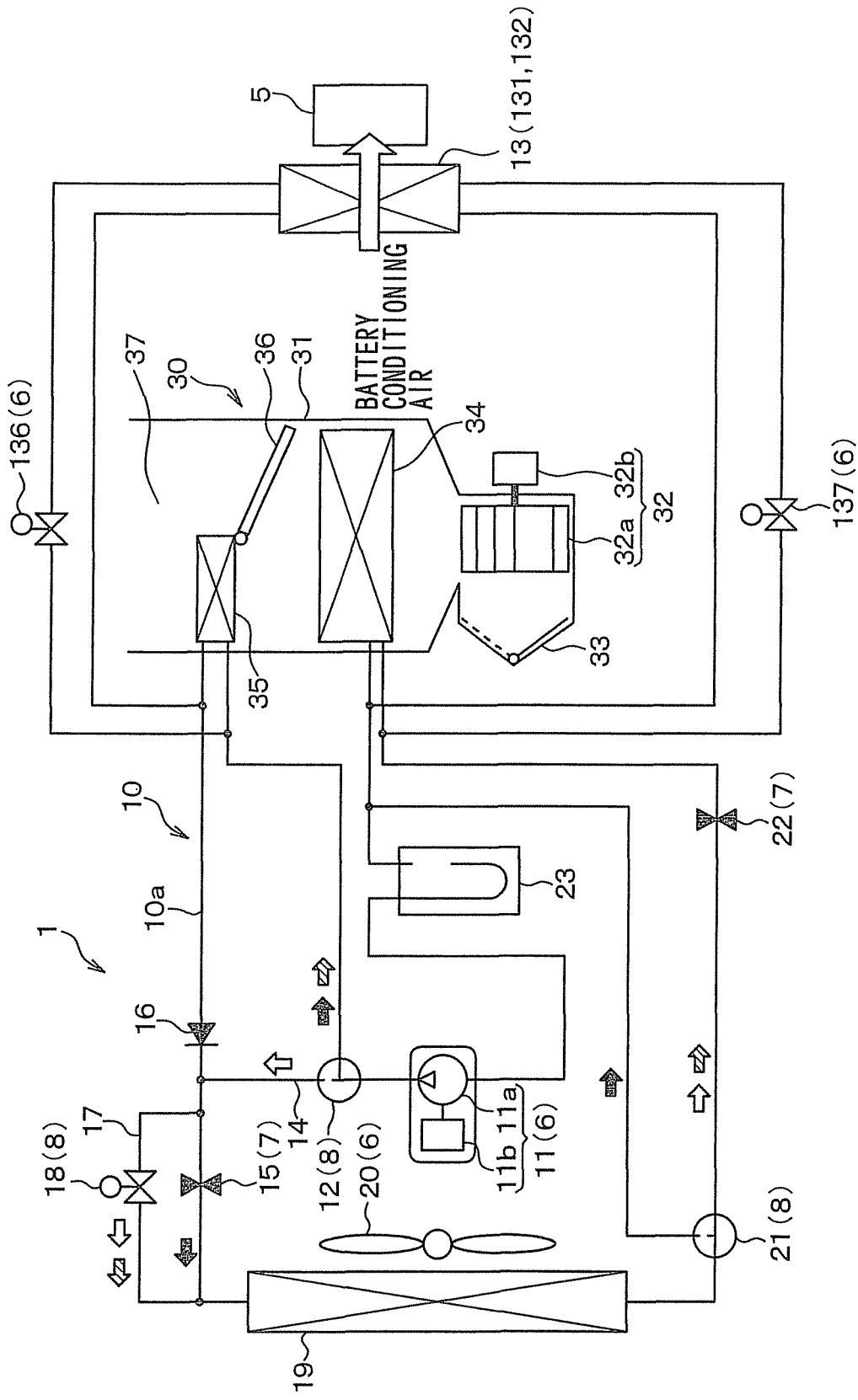
FIG. 11 is a schematic diagram showing a structure of a vehicle air conditioning system according to a seventh embodiment of the present disclosure.

Next, a seventh embodiment of the present disclosure will be described with reference to FIG. 11. FIG. 11 is a schematic diagram showing the structure of the vehicle air conditioning system 1 of the present embodiment.

In the present embodiment, the heat exchange system of the present disclosure is applied to the vehicle air conditioning system 1, which also functions as the temperature adjusting system that adjusts the temperature of the vehicle battery 5. The heat exchange system, which is applied to the temperature adjusting system of the present embodiment, includes the components of the vehicle refrigeration cycle system 10.

In the vehicle refrigeration cycle system 10 of the present embodiment, the unified heat exchanger 13, which is installed in the indoor air conditioning unit 30 in the first embodiment, is used as a heat exchanger for adjusting the temperature of the vehicle battery 5, and the indoor evaporator 34 and an indoor condenser 35 are placed in the indoor air conditioning unit 30.

Specifically, an inlet of the indoor condenser 35 is connected to the outlet of the compressor 11 through the first three-way valve 12, and an outlet of the indoor condenser 35 is connected to the check valve 16. The indoor condenser 35 is placed in the casing 31 of the indoor air conditioning unit 30 and functions as a heating heat exchanger that heats the cabin conditioning air (also referred to as first subject heat exchanging fluid) through heat exchange between the high temperature and high pressure refrigerant, which flows through the indoor condenser 35, and the cabin conditioning air, which has passed the indoor evaporator 34.

Furthermore, the inlet of the indoor evaporator 34 is connected to the outlet of the second fixed choke 22, and the outlet of the indoor evaporator 34 is connected to the inlet of the accumulator 23. The indoor evaporator 34 is placed in the casing 31 of the indoor air conditioning unit 30 and functions as a cooling heat exchanger that cools the cabin conditioning air through heat exchange between the low pressure refrigerant, which flows through the indoor evaporator 34, and the cabin conditioning air, which is blown from the blower 32. In the casing 31, the indoor evaporator 34 is placed on the upstream side of the indoor condenser 35 in the flow direction of the cabin conditioning air.

Furthermore, an air mix door 36 is placed at a location, which is on the downstream side of the indoor evaporator 34 in the flow direction of the air and is on the upstream side of the indoor condenser 35 in the flow direction of the air. The air mix door 36 adjusts a flow ratio of the air, which passes through the indoor condenser 35, relative to the total amount of the air that has passed through the indoor evaporator 34. Furthermore, a mixing space 37 is provided on the downstream side of the indoor condenser 35. The heated cabin conditioning air, which is heated by the high pressure refrigerant at the indoor condenser 35, and the unheated cabin conditioning air, which bypasses the indoor condenser 35 and is thereby not heated, are mixed in the mixing space 37.

Therefore, the temperature of the mixed conditioning air, which is mixed in the mixing space 37, is adjusted with the air mix door 36 by adjusting the flow ratio of the air that passes the indoor condenser 35. Specifically, the air mix door 36 functions as a temperature adjusting device or mechanism (temperature adjusting means), which adjusts the temperature of the cabin conditioning air that is blown into the vehicle cabin. The air mix door 36 is driven by a servomotor (not shown), which is controlled by a control signal outputted from the control unit 100 (see FIG. 1).

The basic structure of the unified heat exchanger 13 of the present embodiment is basically the same as that of the first embodiment. The unified heat exchanger 13 of the present embodiment is placed on the upstream side of the vehicle battery 5 in the flow direction of the battery conditioning air (also referred to as second subject heat exchanging fluid) blown from the battery blower fan in the air passage. The unified heat exchanger 13 adjusts the temperature of the battery conditioning air blown toward the vehicle battery 5.

Specifically, the inlet of the first heat exchanging arrangement 131 of the unified heat exchanger 13 of the present embodiment is connected to the refrigerant passage, which connects between the outlet of the first three-way valve 12 and the inlet of the indoor condenser 35, and the outlet of the first heat exchanging arrangement 131 is connected to the refrigerant passage, which connects between the outlet of the indoor condenser 35 and the inlet of the check valve 16. Therefore, the first heat exchanging arrangement 131 of the unified heat exchanger 13 is connected to the indoor condenser 35 in parallel in the refrigeration cycle system 10. Furthermore, the inlet of the second heat exchanging arrangement 132 of the unified heat exchanger 13 is connected to the refrigerant passage, which connects between the outlet of the second fixed choke 22 and the inlet of the indoor evaporator 34, and the outlet of the second heat exchanging arrangement 132 is connected to the refrigerant passage, which connects between the outlet of the indoor evaporator 34 and the inlet of the accumulator 23. Therefore, the second heat exchanging arrangement 132 of the unified heat exchanger 13 is connected to the indoor evaporator 34 in parallel in the refrigeration cycle system 10. With the parallel connection of the first heat exchanging arrangement 131 to the indoor condenser 35 and the parallel connection of the second heat exchanging arrangement 132 to the indoor evaporator 34, the flow quantities of the high and low pressure refrigerants of the unified heat exchanger 13 can be independently controlled from the indoor condenser 35 and the indoor evaporator 34.

A first flow quantity adjusting valve 136, which adjusts the flow quantity of the high pressure refrigerant that is supplied to the first heat exchanging arrangement 131, is placed at the inlet of the first heat exchanging arrangement 131 of the unified heat exchanger 13. A second flow quantity adjusting valve 137, which adjusts the flow quantity of the low pressure refrigerant that is supplied to the second heat exchanging arrangement 132, is placed at the inlet of the second heat exchanging arrangement 132 of the unified heat exchanger 13. The first and second flow quantity adjusting valves 136, 137 function as an electric flow quantity adjusting device or mechanism (electric flow quantity adjusting means) that is controlled by a corresponding control signal outputted from the control unit 100.

In the present embodiment, the amount of heat exchange between the high pressure refrigerant and the battery conditioning air at the first heat exchanging arrangement 131 can be adjusted with the first flow quantity adjusting valve 136 by changing the flow quantity of the high pressure refrigerant, which is supplied to the first heat exchanging arrangement 131 of the unified heat exchanger 13, at the time of executing each corresponding operation of the vehicle refrigeration cycle system 10.

Furthermore, the amount of heat exchange between the low pressure refrigerant and the battery conditioning air at the second heat exchanging arrangement 132 can be adjusted with the second flow quantity adjusting valve 137 by changing the flow quantity of the low pressure refrigerant, which is supplied to the second heat exchanging arrangement 132 of the unified heat exchanger 13, at the time of executing each corresponding operation of the vehicle refrigeration cycle system 10.

Therefore, the temperature of the battery conditioning air can be adjusted to the desired temperature, which corresponds to the operational state, by adjusting the amount of heat exchange between the refrigerant and the battery conditioning air at the unified heat exchanger 13, and this adjustment of the amount of heat exchange between the refrigerant and the battery conditioning air can be accomplished by controlling at least one of the first and second flow quantity adjusting valves 136, 137. In the present embodiment, the first and second flow quantity adjusting valves 136, 137 function as heat exchange amount adjusting devices (heat exchange amount adjusting means) of the heat exchange amount adjusting mechanism 6.

Even with the present embodiment, the temperature of the battery conditioning air can be adjusted in the wide range by the unified heat exchanger 13. Therefore, the temperature of the battery conditioning air can be adjusted to the desired temperature, and thereby the vehicle battery 5 can be appropriately operated.

Eighth Embodiment

Figure 12:
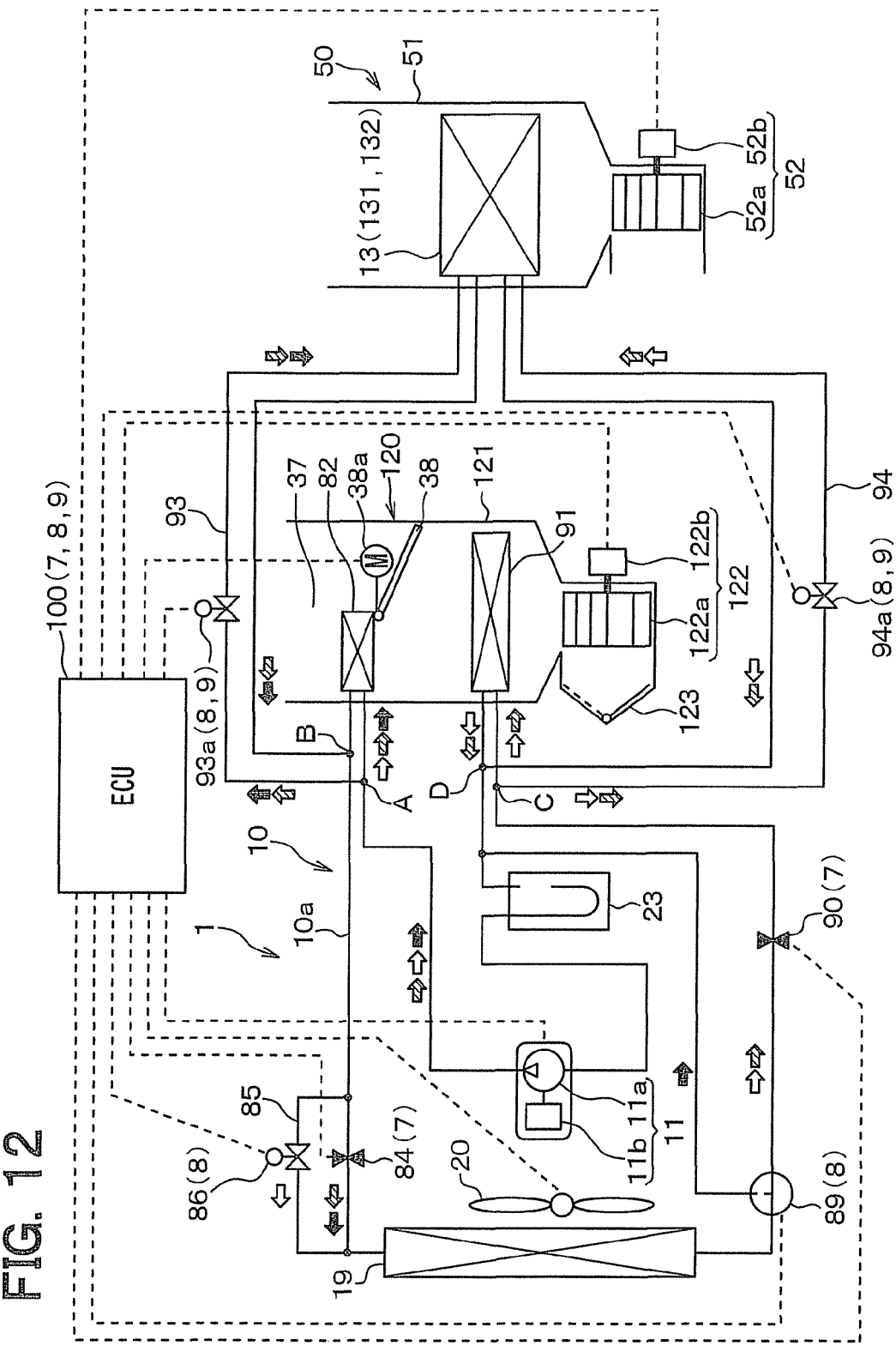
FIG. 12 is a schematic diagram showing a structure of a vehicle air conditioning system according to an eighth embodiment of the present disclosure.

An eighth embodiment of the present disclosure will be described with reference to FIGS. 12 to 13B in view of FIGS. 2 to 4 of the first embodiment. In the present embodiment, a vehicle refrigeration cycle system 10 of the present disclosure is applied to a vehicle air conditioning system (heat exchange system) 1 that includes a front seat side air conditioning unit 120 and a rear seat side air conditioning unit 50, each of which serves as an indoor air conditioning unit (also referred to as a cabin air conditioning unit) that blows temperature adjusted conditioning air (cabin conditioning air) toward a vehicle cabin. More specifically, the front seat side air conditioning unit 120 blows the conditioning air toward a front seat side space (a first temperature adjusting subject) of the vehicle cabin, and the rear seat side air conditioning unit 50 blows the conditioning air toward a rear seat side space (a second temperature adjusting subject) of the vehicle cabin. FIG. 12 is a schematic diagram showing a structure of the vehicle air conditioning system 1 of the present embodiment.

The vehicle refrigeration cycle system of the present embodiment, which is applied to the vehicle air conditioning system 1, is formed as a vapor compression refrigeration cycle.

The vehicle refrigeration cycle system 10 of the present embodiment has a function of cooling and heating the air to be blown toward the front seat side space and the rear seat side space of the vehicle cabin. Specifically, the vehicle refrigeration cycle system 10 can perform both of a heating operation and a cooling operation by switching a refrigerant flow path in the refrigerant circuit passage (also referred to as the fluid circuit passage) 10a, through which refrigerant is circulated. In the heating operation, the conditioning air (front seat side conditioning air and rear seat side conditioning air) to be blown toward the front seat side space and the rear seat side space is heated to heat the vehicle cabin. In the cooling operation, the conditioning air is cooled to cool the vehicle cabin.

Furthermore, the vehicle refrigeration cycle system 10 can perform a dehumidifying and heating operation, which dehumidifies and adjusts the temperature of the conditioning air.

Furthermore, the vehicle refrigeration cycle system 10 can execute a single operation (single mode), in which only the front seat side space is air conditioned, and a dual operation (dual mode), in which both of the front seat side space and the rear seat side space are air conditioned. In FIG. 12, white open arrows (blank arrows) indicate a flow of the refrigerant in the refrigerant circuit passage 10a during the cooling operation in the dual operation, and black arrows indicate a flow of the refrigerant in the refrigerant circuit passage 10a during the heating operation in the dual operation. Furthermore, hatched arrows indicate a flow of the refrigerant in the refrigerant circuit passage 10a during the dehumidifying and heating operation in the dual operation.

Furthermore, the vehicle refrigeration cycle system 10 of the present embodiment uses a typical chlorofluorocarbon refrigerant as the refrigerant thereof and forms a subcritical refrigeration cycle, in which the pressure of the high pressure refrigerant does not exceed beyond a critical pressure of the refrigerant. In the present embodiment, lubricating oil is mixed into the refrigerant to circulate the refrigerant through the compressor 11, so that the lubricating oil is circulated through the vehicle refrigeration cycle system 10.

The compressor 11 is placed in an engine room (not shown) of the vehicle. The compressor 11 draws and discharges the refrigerant upon compressing the same in the vehicle refrigeration cycle system 10. The compressor 11 is an electric compressor and includes a fixed displacement compressor device 11a, which has a fixed discharge rate and is driven by an electric motor 11b. The fixed displacement compressor device 11a may be a scroll compressor device, a vane compressor device or any other suitable type of compressor device.

The operation (rotational speed) of the electric motor 11b is controlled by a control signal, which is outputted from an electronic control unit (ECU) 100 described later. The electric motor 11b may be a direct current (DC) motor or an alternating current (AC) motor. The refrigerant discharge rate of the compressor 11 is changed through this rotational speed control operation of the electric motor 11b. Therefore, in the present embodiment, the electric motor 11b functions a discharge rate changing device or mechanism (a discharge rate changing means) of the compressor 11.

An outlet of the compressor 11 is connected to an inlet of an indoor condenser 82 and the inlet of the first heat exchanging arrangement 131 of the unified heat exchanger 13 through a branching portion A. The first heat exchanging arrangement 131 of the unified heat exchanger 13 is connected to the indoor condenser 82 in parallel in the refrigeration cycle system 10. Therefore, the refrigerant, which is discharged from the compressor 11, is supplied to the indoor condenser 82 and the first heat exchanging arrangement 131 of the unified heat exchanger 13.

The indoor condenser 82 is placed in a casing 121 of the front seat side air conditioning unit 120. At the indoor condenser 82, heat exchange takes place between the refrigerant (high pressure refrigerant), which is outputted from the compressor 11 and flows in the indoor condenser 82, and the front seat side conditioning air, so that the front seat side conditioning air is heated. Thereby, the indoor condenser 82 serves as a heating heat exchanger (a radiator, a first utilizing side heat exchanger). In the present embodiment, the front seat side conditioning air corresponds to first subject heat exchanging fluid.

The unified heat exchanger 13 is placed in a casing 51 of the rear seat side air conditioning unit 50. At the unified heat exchanger 13, heat exchange takes place between the refrigerant, which flows in the unified heat exchanger 13, and the rear seat side conditioning air. The unified heat exchanger 13 includes the first heat exchanging arrangement 131 and the second heat exchanging arrangement 132 (see FIGS. 2 and 4 and the corresponding discussion of the first embodiment). The first heat exchanging arrangement 131 exchanges heat between the high pressure refrigerant of the vehicle refrigeration cycle system 10 and the rear seat side conditioning air. The second heat exchanging arrangement 132 exchanges heat between low pressure refrigerant and the rear seat conditioning air. In the present embodiment, the rear seat side conditioning air corresponds to second subject heat exchanging fluid.

An outlet of the indoor condenser 82 and an outlet of the first heat exchanging arrangement 131 of the unified heat exchanger 13 are connected to a heating expansion valve (heating time expansion valve) 84 through a merging portion B. The heating expansion valve 84 functions as a first depressurizing device (first depressurizing means) of a depressurizing mechanism 7, which depressurizes and expands the refrigerant that is outputted from the first heat exchanging arrangement 131 of the unified heat exchanger 13 at the time of executing the heating operation and the time of executing the dehumidifying and heating operation. Furthermore, an outlet of the heating expansion valve 84 is connected to the inlet of the outdoor heat exchanger 19.

The heating expansion valve 84 is an electric variable throttling mechanism and includes a valve body, which is adapted to change a throttle opening degree thereof, and an electric actuator, which is a stepping motor that changes the throttle opening degree of the valve body. The operation of the heating expansion valve 84 is controlled by a control signal outputted from the control unit 100.

The outlet of the indoor condenser 82 and the outlet of the unified heat exchanger 13 are also connected to an expansion valve bypass passage 85 that guides the refrigerant, which is supplied through the merging portion B, toward the outdoor heat exchanger 19 while bypassing the heating expansion valve 84.

An opening and closing valve 86 is placed in the expansion valve bypass passage 85 to open or close (fully open or fully close) the expansion valve bypass passage 85. The opening and closing valve 86 is a solenoid valve, which is controlled to be opened or closed by a control signal (control voltage) outputted from the control unit 100.

Furthermore, the pressure loss of the refrigerant, which is generated at the time of passing through the opening and closing valve 86, is very low in comparison to the pressure loss of the refrigerant, which is generated at the time of passing through the heating expansion valve 84. Therefore, the refrigerant, which is outputted from the indoor condenser 82 and the first heat exchanging arrangement 131 of the unified heat exchanger 13, is supplied to an inlet of the outdoor heat exchanger 19 through the expansion valve bypass passage 85 in a case where the opening and closing valve 86 is opened. In contrast, the refrigerant, which is outputted from the indoor condenser 82 and the first heat exchanging arrangement 131 of the unified heat exchanger 13, is supplied to the inlet of the outdoor heat exchanger 19 through the heating expansion valve 84 in a case where the opening and closing valve 86 is closed.

As discussed above, the opening and closing valve 86 can switch the refrigerant flow path of the vehicle refrigeration cycle system 10. Therefore, the opening and closing valve 86 of the present embodiment functions as a refrigerant flow path switching device (refrigerant flow path switching means) of a refrigerant flow path switching mechanism 8. Here, it should be noted that in place of the opening and closing valve 86, it is possible to provide an electric three-way valve that switches between the refrigerant flow path, which connects the outlet of the indoor condenser 82 and the outlet of the first heat exchanging arrangement 131 of the unified heat exchanger 13 to the inlet of the heating expansion valve 84, and the refrigerant flow path, which connects the outlet of the indoor condenser 82 and the outlet of the first heat exchanging arrangement 131 of the unified heat exchanger 13 to the inlet of the expansion valve bypass passage 85.

The outdoor heat exchanger 19 exchanges the heat between the refrigerant, which flows in the inside of the outdoor heat exchanger 19, and the outside air, which is blown from the blower fan 20. The outdoor heat exchanger 19 is placed in the engine room. At the time of executing the heating operation, the outdoor heat exchanger 19 functions as an evaporator, at which the low pressure refrigerant is evaporated to absorb the heat. In contrast, at the time of executing the cooling operation, the outdoor heat exchanger 19 functions as a radiator, at which the heat is radiated from the high pressure refrigerant. At the time of executing the dehumidifying and heating operation, the outdoor heat exchanger 19 functions as the evaporator or the radiator depending on the throttle opening degree of the heating expansion valve 84.

The blower fan 20 is an electric blower, a rotational speed (air delivery rate of the outside air) of which is controlled by a control signal (control voltage) that is outputted from the control unit 100 described later. The blower fan 20 functions as an outside air blowing device or mechanism (outside air blowing means), which blows the outside air toward the outdoor heat exchanger 19.

An electric three-way valve 89 is connected to an outlet of the outdoor heat exchanger 19. The operation of the three-way valve 89 is controlled by a control signal (control voltage), which is outputted from the control unit 100 described later.

More specifically, at the time of executing the cooling operation and the time of executing the dehumidifying and heating operation, the three-way valve 89 switches to the refrigerant flow path, which connects between the outlet of the outdoor heat exchanger 19 and the inlet of a cooling expansion valve (cooling time expansion valve) 90. At the time of executing the heating operation, the three-way valve 89 switches to the refrigerant flow path, which connects between the outlet of the outdoor heat exchanger 19 and the accumulator 23. The three-way valve 89 functions as a refrigerant flow path switching device (refrigerant flow path switching means) and cooperate with the opening and closing valve 86 to form the refrigerant flow path switching mechanism 8.

The cooling expansion valve 90 functions as a second depressurizing device (second depressurizing means) of the depressurizing mechanism 7, which depressurizes and expands the refrigerant outputted from the outdoor heat exchanger 19 at the time of executing the cooling operation and the time of executing the dehumidifying and heating operation. A basic structure of the cooling expansion valve 90 is the same as that of the heating expansion valve 84.

An outlet of the cooling expansion valve 90 is connected to an inlet of the indoor evaporator 91 and an inlet of the second heat exchanging arrangement 132 of the unified heat exchanger 13 through a branching portion C. The second heat exchanging arrangement 132 of the unified heat exchanger 13 is connected to the indoor evaporator 91 in parallel in the refrigeration cycle system 10. Therefore, the low pressure refrigerant, which is depressurized and expanded at the cooling expansion valve 90, is supplied to the indoor evaporator 91 and the second heat exchanging arrangement 132 of the unified heat exchanger 13. With the parallel connection of the first heat exchanging arrangement 131 to the indoor condenser 82 and the parallel connection of the second heat exchanging arrangement 132 to the indoor evaporator 91, the flow quantities of the high and low pressure refrigerants of the unified heat exchanger 13 can be independently controlled from the indoor condenser 82 and the indoor evaporator 91.

The indoor evaporator 91 is placed in the casing 121 of the front seat side air conditioning unit 120 and functions as a cooling heat exchanger (an evaporator or a second utilizing side heat exchanger) that cools the conditioning air through heat exchange between the low pressure refrigerant, which flows through the indoor evaporator 91, and the conditioning air, which is blown from a blower 122. In the casing 121, the indoor evaporator 91 is placed on an upstream side of the indoor condenser 82 in the flow direction of the conditioning air.

An outlet of the indoor evaporator 91 and an outlet of the second heat exchanging arrangement 132 of the unified heat exchanger 13 are connected to an inlet of the accumulator 23 through a merging portion D. The accumulator 23 is a gas-liquid separator that separates the refrigerant supplied thereto into the gas-phase refrigerant and the liquid-phase refrigerant and accumulates the excessive refrigerant of the cycle. An inlet of the compressor 11 is connected to a gas-phase refrigerant outlet of the accumulator 23. Therefore, the accumulator 23 has the function of limiting supply of the liquid-phase refrigerant to the compressor 11 and thereby limiting the compression of the liquid phase refrigerant in the compressor 11.

A first flow quantity adjusting valve 93*a*, which adjusts the flow quantity of the high pressure refrigerant that is supplied to the first heat exchanging arrangement 131, is placed in a refrigerant passage 93, which extends from the branching portion A to the inlet of the first heat exchanging arrangement 131 of the unified heat exchanger 13 in the vehicle refrigeration cycle system 10. The first flow quantity adjusting valve 93*a* functions as a refrigerant flow quantity adjusting device (refrigerant flow quantity adjusting means) of a refrigerant flow quantity adjusting mechanism 9, which adjusts the flow quantity of the high pressure refrigerant that is supplied to the first heat exchanging arrangement 131. The operation of the first flow quantity adjusting valve 93*a* is controlled by a control signal (control voltage) outputted from the control unit 100 described below.

The first flow quantity adjusting valve 93*a* has a full-closing function that fully closes the refrigerant passage 93, which extends from the branching portion A to the inlet of the first heat exchanging arrangement 131 of the unified heat exchanger 13. Therefore, in the case where the first flow quantity adjusting valve 93*a* opens the refrigerant passage 93, the refrigerant, which flows through the branching portion A, is supplied to the first heat exchanging arrangement 131 of the unified heat exchanger 13. In contrast, in the case where the first flow quantity adjusting valve 93*a* closes the refrigerant passage 93, the refrigerant, which flows through the branching portion A, bypasses the first heat exchanging arrangement 131.

As discussed above, the first flow quantity adjusting valve 93*a* can switch the refrigerant flow path of the vehicle refrigeration cycle system 10. Therefore, the first flow quantity adjusting valve 93*a* of the present embodiment also functions as a refrigerant flow path switching device (refrigerant flow path switching means) of the refrigerant flow path switching mechanism 8.

A second flow quantity adjusting valve 94*a*, which adjusts the flow quantity of the low pressure refrigerant that is supplied to the second heat exchanging arrangement 132, is placed in a refrigerant passage 94, which extends from the branching portion C to the inlet of the second heat exchanging arrangement 132 of the unified heat exchanger 13 in the vehicle refrigeration cycle system 10.

The second flow quantity adjusting valve 94*a* functions as a refrigerant flow quantity adjusting device (refrigerant flow quantity adjusting means) of the refrigerant flow quantity adjusting mechanism 9, which adjusts the flow quantity of the low pressure refrigerant that is supplied to the second heat exchanging arrangement 132. The operation of the second flow quantity adjusting valve 94*a* is controlled by a control signal (control voltage) outputted from the control unit 100 described below.

The second flow quantity adjusting valve 94*a* of the present embodiment has a full-closing function that fully closes the refrigerant passage 94, which extends from the branching portion C to the inlet of the second heat exchanging arrangement 132 of the unified heat exchanger 13. Therefore, in the case where the second flow quantity adjusting valve 94*a* opens the refrigerant passage 94, the refrigerant, which flows through the branching portion C, is supplied to the second heat exchanging arrangement 132 of the unified heat exchanger 13. In contrast, in the case where the second flow quantity adjusting valve 94*a* closes the refrigerant passage 94, the refrigerant, which flows through the branching portion C, bypasses the second heat exchanging arrangement 132.

As discussed above, the second flow quantity adjusting valve 94*a* can switch the refrigerant flow path of the vehicle refrigeration cycle system 10. Therefore, the second flow quantity adjusting valve 94*a* of the present embodiment also functions as a refrigerant flow path switching device (refrigerant flow path switching means) of the refrigerant flow path switching mechanism 8.

Next, the front seat side air conditioning unit 120 and the rear seat side air conditioning unit 50 will be described in greater detail. The front seat side air conditioning unit 120 is placed in an inside of an instrument panel, which is placed at a front part of the vehicle cabin to perform the air conditioning of the front seat side of the vehicle cabin. The front seat side air conditioning unit 120 includes the blower 122, the indoor evaporator 91 and the indoor condenser 82, which are placed in the casing 121 that forms an outer shell of the front seat side air conditioning unit 120.

The casing 121 forms an air passage of the front seat side conditioning air and is made of a resin material (e.g., polypropylene), which has resiliency and a relatively high strength. An inside-air and outside-air switching device 123 is placed at an upstream end portion of the casing 121 in the flow direction of the air. The inside-air and outside-air switching device 123 switches between the inside air (the air in the inside of the vehicle cabin) and the outside air (the air at the outside of the vehicle cabin).

An inside-air inlet, through which the inside air is guided into the casing 121, and an outside-air inlet, through which the outside air is guided into the casing 121, are formed in the inside-air and outside-air switching device 123. Furthermore, an inside-air and outside-air switching door is placed in the inside of the inside-air and outside-air switching device 123. The inside-air and outside-air switching door is adapted to linearly adjust an opening area of the inside-air inlet and an opening area of the outside-air inlet to change a ratio between the flow quantity of the inside air and the flow quantity of the outside air supplied to the inside of the casing 121.

The blower 122, which blows the air guided thereto through the inside-air and outside-air switching device 123 into the vehicle cabin, is placed on the downstream side of the inside-air and outside-air switching device 123. The blower 122 is an electric blower, which includes a centrifugal multi-blade fan (a sirocco fan) 122*a* and an electric motor 122*b*. The electric motor 122*b* drives the centrifugal multi-blade fan 122*a*. A rotational speed (air flow quantity) of the centrifugal multi-blade fan 122*a* and thereby of the electric motor 122*b* is controlled by a control signal (control voltage) that is outputted from the control unit 100.

The indoor evaporator 91, which cools the conditioning air, is placed on the downstream side of the blower 122 in the flow direction of the conditioning air. The indoor condenser 82, which heats the conditioning air, is placed on the downstream side of the indoor evaporator 91 in the flow direction of the conditioning air.

Furthermore, an air mix door 38 is placed at a location, which is on the downstream side of the indoor evaporator 91 in the flow direction of the air and is on the upstream side of the indoor condenser 82 in the flow direction of the air. The air mix door 38 adjusts a flow ratio of the air, which passes through the indoor condenser 82, relative to the total amount of the air that has passed through the indoor evaporator 91. Furthermore, a mixing space 37 is provided on the downstream side of the indoor condenser 82 in the flow direction of the air. The heated conditioning air, which is heated by the high pressure refrigerant at the indoor condenser 82, and the unheated conditioning air, which bypasses the indoor condenser 82 and is thereby not heated, are mixed in the mixing space 37.

Therefore, the temperature of the mixed conditioning air, which is mixed in the mixing space 37, is adjusted with the air mix door 38 by adjusting the flow ratio of the air that passes the indoor condenser 82. Specifically, the air mix door 38 functions as a temperature adjusting device or mechanism (temperature adjusting means), which adjusts the temperature of the conditioning air that is blown into the vehicle cabin. The air mix door 38 is driven by a servomotor 38a, which is controlled by a control signal outputted from the control unit 100.

Air outlets (not shown) are placed at a downstream end portion of the casing 121 to blow the conditioning air, the temperature of which is adjusted through the air mix door 38, toward the front seat side space that is the first air conditioning subject space. Specifically, the air outlets include a face-side air outlet(s), a foot-side air outlet(s) and a defroster air outlet(s). The face-side air outlet is provided to blow the cabin conditioning air toward an upper half of a body of an occupant who is present on the front seat. The foot-side air outlet is provided to blow the cabin conditioning air toward feet of the occupant who is present on the front seat. The defroster air outlet is provided to blow the cabin conditioning air toward an inside surface of a vehicle front window glass (windshield).

A face-side door (not shown) is placed on an upstream side of the face-side air outlet to adjust an opening area of the face-side air outlet. A foot-side door (not shown) is placed on an upstream side of the foot-side air outlet to adjust an opening area of the foot-side air outlet. A defroster door (not shown) is placed on an upstream side of the defroster air outlet to adjust an opening area of the defroster air outlet.

The face-side door, the foot-side door and the defroster door function as air outlet mode changing devices (air outlet mode changing means) of an air outlet mode changing mechanism, which changes an air outlet mode and is driven by a servomotor (not shown) that is controlled by a control signal outputted from a control unit 100 described below thorough, for example, a link mechanism.

Next, the rear seat side air conditioning unit 50 will be described. The rear seat side air conditioning unit 50 is placed at the rear side of the vehicle cabin to air-condition the rear seat side of the vehicle cabin. The rear seat side air conditioning unit 50 receives the unified heat exchanger 13 in the casing 51, which forms an outer shell of the rear seat side air conditioning unit 50.

The casing 51 forms a conditioning air passage of the rear seat side conditioning air, and the basic structure of the casing 51 is similar to that of the casing 121 of the front seat side air conditioning unit 120.

A blower 52, which draws and blows the cabin inside air (internal air), is placed at an upstream end portion of the casing 51. The blower 52 is an electric blower, which includes a centrifugal multi-blade fan (a sirocco fan) 52a and an electric motor 52b. The electric motor 52b drives the centrifugal multi-blade fan 52a. A rotational speed (air flow quantity) of the centrifugal multi-blade fan 52a and thereby of the electric motor 52b is controlled by a control signal (control voltage) that is outputted from the control unit 100.

The unified heat exchanger 13 is placed on the downstream side of the blower 52 in the flow direction of the air. Air outlets (not shown) are placed at a downstream end portion of the casing 51 to blow the conditioning air, the temperature of which is adjusted through the unified heat exchanger 13, toward the rear seat side space that is the second air conditioning subject. Specifically, the air outlets include a face-side air outlet(s) and a foot-side air outlet(s). The face-side air outlet is provided to blow the conditioning air toward an upper half of a body of an occupant who is present on the rear seat. The foot-side air outlet is provided to blow the conditioning air toward feet of the occupant who is present on the rear seat.

A face-side door (not shown) is placed on an upstream side of the face-side air outlet to adjust an opening area of the face-side air outlet. A foot-side door (not shown) is placed on an upstream side of the foot-side air outlet to adjust an opening area of the foot-side air outlet. The face-side door and the foot-side door function as air outlet mode changing devices (air outlet mode changing means) of the air outlet mode changing mechanism, which changes an air outlet mode and is driven by a servomotor (not shown) that is controlled by a control signal outputted from the control unit 100 described below thorough, for example, a link mechanism.

The structure of the unified heat exchanger 13 is substantially the same as the one discussed in the first embodiment with reference to FIGS. 2 to 4 and thereby will not be discussed in detail. However, it should be noted that in the present embodiment, the first heat exchanging arrangement 131 and the second heat exchanging arrangement 132 are integrated together and are arranged such that the rear seat side conditioning air, which is the second subject heat exchanging fluid, can exchange the heat with both of the high pressure refrigerant and the low pressure refrigerant.

Next, an electric control arrangement of the present embodiment will be described. Similar to the first embodiment, the control unit 100 of the present embodiment includes a known type of microcomputer, which includes a CPU, a ROM and a RAM, and its peripheral circuit. The control unit 100 executes various computations and processes based on a control program stored in the ROM and controls the various control subject devices, such as the compressor 11, which are connected to the output side of the control unit 100. The control unit 100 functions as a part of the depressurizing mechanism 7, a part of the refrigerant flow path switching mechanism 8 and a part of the refrigerant flow quantity adjusting mechanism 9 in corporation with the other devices discussed in the present embodiment.

An inside air temperature sensor, an outside air temperature sensor, a solar radiation sensor, an evaporator temperature sensor, a high-pressure side temperature sensor, a high-pressure side pressure sensor, a low-pressure side temperature sensor and a low-pressure side pressure sensor are connected to the input side of the control unit 100. The inside air temperature sensor senses the inside air temperature in the vehicle cabin. The outside air temperature sensor senses the outside air temperature at the outside of the vehicle cabin. The solar radiation sensor senses the amount of solar radiation in the vehicle cabin. The evaporator temperature sensor senses the temperature of the conditioning air outputted from the indoor evaporator 91. The high-pressure side temperature sensor senses the temperature of the high pressure refrigerant, which is supplied to the indoor condenser 82. The high-pressure side pressure sensor senses the pressure of the high pressure refrigerant. The low-pressure side temperature sensor senses the temperature of the low pressure refrigerant, which is supplied to the indoor evaporator 91. The low-pressure side pressure sensor senses the pressure of the low pressure refrigerant.

Furthermore, the input side of the control unit 100 is connected to the manipulation panel (not shown), which is also referred to as the control panel and is placed adjacent to the instrument panel of the vehicle cabin located at the front side of the vehicle cabin. Signals of various manipulation switches, which are provided in the manipulation panel, are supplied to the input side of the control unit 100. The manipulation switches, which are provided in the manipulation panel, include an on-off switch (also referred to as an actuation switch) of the vehicle air conditioning system, a cabin temperature setting switch for setting the target temperature of the front seat side space of the vehicle cabin, an operation mode setting switch for selecting one of the cooling operation, the heating operation and the dehumidifying and heating operation, and an air conditioning space setting switch for selecting one of the single mode, in which only the air conditioning of the front seat side space is executed, and the dual mode, in which the air conditioning of the front seat side space and the air conditioning of the rear seat side space are both executed.

A controller (control means), which controls the control subject devices, such as the electric motor 11*b* of the compressor 11, is integrated in the control unit 100 to control the control subject devices. However, in the present embodiment, a structure (a hardware and a software), which controls each corresponding control subject device, may function as a controller (control means) of such a control subject device.

For example, a structure, which controls the operations of the opening and closing valve 86, the three-way valve 89 and the first and second flow quantity adjusting valves 93*a*, 94*a*, which function as the refrigerant flow path switching devices (refrigerant flow path switching means) of the refrigerant flow path switching mechanism 8, also function as a switching controller (switching control means). Furthermore, the structure, which controls the first and second flow quantity adjusting valves 93*a*, 94*a*, which function as the refrigerant flow quantity adjusting devices (the refrigerant flow quantity adjusting means) of the refrigerant flow quantity adjusting mechanism 9, forms a refrigerant flow quantity controller (refrigerant flow quantity control means).

Next, operations of the present embodiment will be described. The vehicle air conditioning system 1 of the present embodiment can execute the dehumidifying and heating operation in addition to the heating operation and the cooling operation. One of the heating operation, the cooling operation and the dehumidifying and heating operation is set and executed according the signal (manipulation signal) of the operation mode setting switch of the manipulation panel. Furthermore, the vehicle air conditioning system 1 of the present embodiment can execute one of the single operation (single mode) and the dual operation (dual mode) according the signal (manipulation signal) of the operation mode setting switch of the manipulation panel.

(a) Cooling Operation (First Operation Mode)

The cooling operation is started when the cooling operation mode is selected through the operation mode setting switch of the manipulation panel in the state where the on-off switch of the manipulation panel is turned on.

In the cooling operation, the control unit 100 opens the opening and closing valve 86 and switches the three-way valve 89 to the refrigerant flow path, which connects between the outlet of the outdoor heat exchanger 19 and the inlet of the cooling expansion valve 90. Furthermore, the control unit 100 operates the first flow quantity adjusting valve 93*a* to close the refrigerant passage 93 (full closing of the refrigerant passage 93). Furthermore, at the time of the single mode, the control unit 100 operates the second flow quantity adjusting valve 94*a* to close the refrigerant passage 94 (full closing of the refrigerant passage 94). In contrast, at the time of the dual mode, the control unit 100 operates the second flow quantity adjusting valve 94*a* to open the refrigerant passage 94 (throttling state). In this way, in the vehicle refrigeration cycle system 10, the refrigerant (high pressure refrigerant), which is outputted from the compressor 11, flows in the direction of the white open arrows in the refrigerant circuit passage 10*a* in FIG. 12 (dual mode).

After the switching to the refrigerant flow path that is set for the cooling operation, the control unit 100 reads, i.e., receives the measurement signals of the above sensors and the manipulation signals of the manipulation panel. The control unit 100 computes a target outlet air temperature TAO, which is a target temperature of the conditioning air to be blown into the vehicle cabin, based on the received measurement signals and the received manipulation signals. Then, the control unit 100 determines the operational state (e.g., a control signal) of each corresponding control subject device connected to the output side of the control unit 100 based on the computed target outlet air temperature TAO and the measurement signals of the sensors and the manipulation signals of the manipulation panel.

For example, the control signal, which is outputted to the electric motor 11*b* of the compressor 11, is determined as follows. First of all, a target evaporator outlet air temperature TEO of the indoor evaporator 91 is determined based on the target outlet air temperature TAO with reference to a control map prestored in the control unit 100. Then, the control signal, which is outputted to the electric motor 11*b* of the compressor 11, is determined based on a difference between the target evaporator outlet air temperature TEO and the outlet air temperature of the indoor evaporator 91, which is sensed with the evaporator temperature sensor, such that the outlet air temperature of the indoor evaporator 91 approaches the target evaporator outlet air temperature TEO through a feedback control operation.

Furthermore, a control signal, which is outputted from the control unit 100 to the cooling expansion valve 90, is determined such that a degree of supercooling of the refrigerant, which is supplied to the cooling expansion valve 90, approaches a target degree of supercooling that is set to adjust a coefficient of performance (COP) of the cycle toward or around its maximum value.

Furthermore, a control signal, which is outputted to the servomotor 38*a* of the air mix door 38 of the front seat side air conditioning unit 120, is determined such that the air mix door 38 closes an air passage of the indoor condenser 82.

Furthermore, a control signal, which is outputted to the blower 52 of the rear seat side air conditioning unit 50, is determined such that the air delivery rate of the blower 52 becomes zero (stopping of the operation of the blower 52) in the case of setting the single mode through the air conditioning space setting switch and becomes a corresponding air delivery rate, which corresponds to the target outlet air temperature TAO in the case of setting the dual mode through the air conditioning space setting switch. The control signal, which is outputted to the blower 52 of the rear seat side air conditioning unit 50, is also determined in the above-described manner for the other operation (i.e., the heating operation or the dehumidifying and heating operation).

A control signal, which is outputted to the second flow quantity adjusting valve 94a of the rear seat side air conditioning unit 50 at the time of the dual mode, is determined such that the temperature of the conditioning air (outlet air), which is outputted from the unified heat exchanger 13, becomes the desired temperature, which is desired by and is set by the occupant, based on the target outlet air temperature TAO with reference to a control map prestored in the control unit 100.

Then, the control unit 100 outputs the control signals, which are determined based on, for example, the target outlet air temperature TAO, to the control subject devices. Thereafter, the control unit 100 repeats the control routine of, for example, the reading of the measurement signals and the manipulation signals, the computing of the target outlet air temperature TAO, the determining of the operational state of each corresponding control subject device and the controlling of each corresponding control subject device discussed above at every predetermined control cycle. Basically, this control routine is also executed in a similar manner in a case where the other operational mode (the heating operation mode or the dehumidifying and heating operation mode) is set.

In this way, in the vehicle refrigeration cycle system 10, the refrigerant (high pressure refrigerant), which is outputted from the compressor 11, is supplied to the indoor condenser 82 and the first heat exchanging arrangement 131 of the unified heat exchanger 13. At this time, the air passage of the indoor condenser 82 is closed by the air mix door 38, so that the high pressure refrigerant, which is supplied to the indoor condenser 82, flows through the indoor condenser 82 without releasing the heat to the front seat side conditioning air that is blown from the blower 122.

The high pressure refrigerant, which is outputted from the indoor condenser 82, is supplied to the expansion valve bypass passage 85 while bypassing the heating expansion valve 84 and is then supplied to the outdoor heat exchanger 19 through the expansion valve bypass passage 85. The high pressure refrigerant, which is supplied to the outdoor heat exchanger 19, releases the heat to the outside air that is blown from the blower fan 20.

The high pressure refrigerant, which is outputted from the outdoor heat exchanger 19, is supplied to the cooling expansion valve 90 through the three-way valve 89, and this high pressure refrigerant is depressurized and expanded at the cooling expansion valve 90 until it becomes the low pressure refrigerant. The low pressure refrigerant, which is depressurized through the cooling expansion valve 90, is supplied to the indoor evaporator 91 at the time of the single mode and is supplied to both of the indoor evaporator 91 and the second heat exchanging arrangement 132 of the unified heat exchanger 13 through the branching portion C at the time of the dual mode. At the time of the single mode, the refrigerant passage 94 is closed by the second flow quantity adjusting valve 94a, so that the low pressure refrigerant, which is depressurized through the cooling expansion valve 90, is supplied only to the indoor evaporator 91 without flowing into the second heat exchanging arrangement 132 of the unified heat exchanger 13.

The low pressure refrigerant, which is supplied to the indoor evaporator 91, absorbs the heat from the front seat side conditioning air blown from the blower 122 and is thereby evaporated. In this way, the front seat side conditioning air is cooled.

Furthermore, at the time of the dual mode, the low pressure refrigerant, which is supplied to the second heat exchanging arrangement 132 of the unified heat exchanger 13, absorbs the heat from the rear seat side conditioning air blown from the blower 52 and is thereby evaporated. In this way, at the time of the dual mode, the rear seat side conditioning air is cooled.

The refrigerant, which is outputted from the indoor evaporator 91, and the refrigerant, which is outputted from the second heat exchanging arrangement 132 of the unified heat exchanger 13, are merged at the merging portion D, and this merged refrigerant is supplied to the accumulator 23 where the merged refrigerant is separated into the gas phase refrigerant and the liquid phase refrigerant. Then, the gas phase refrigerant, which is separated at the accumulator 23, is drawn into the compressor 11 and is compressed once again at the compressor 11.

As discussed above, at the time of executing the cooling operation, the front seat side conditioning air, which is cooled to the desired temperature at the indoor evaporator 91, is blown into the front seat side space, so that the cooling of the front seat side space of the vehicle cabin is achieved. Furthermore, at the time of the dual mode, the rear seat side conditioning air, which is cooled to the desired temperature by the second heat exchanging arrangement 132 of the unified heat exchanger 13, is blown into the rear seat side space, so that the cooling of the rear seat side space of the vehicle cabin is achieved.

At the time of executing the cooling operation of the present embodiment, the high pressure refrigerant corresponds to the refrigerant, which flows in the refrigerant flow path that extends from the outlet of the compressor 11 to the inlet of the cooling expansion valve 90. Furthermore, the low pressure refrigerant corresponds to the refrigerant, which flows in the refrigerant flow path that extends from the outlet of the cooling expansion valve 90 to the inlet of the compressor 11.

(b) Heating Operation (Second Operation Mode)

The heating operation is started when a heating operation mode is selected through the operation mode setting switch at the manipulation panel.

In the heating operation, the control unit 100 closes the opening and closing valve 86 and switches the three-way valve 89 to the refrigerant flow path, which connects between the outlet of the outdoor heat exchanger 19 and the inlet of the accumulator 23. Furthermore, the control unit 100 operates the second flow quantity adjusting valve 94a to close the refrigerant passage 94 (full closing of the refrigerant passage 94). Furthermore, at the time of the single mode, the control unit 100 operates the first flow quantity adjusting valve 93a to close the refrigerant passage 93 (full closing of the refrigerant passage 93). In contrast, at the time of the dual mode, the control unit 100 operates the first flow quantity adjusting valve 93a to open the refrigerant passage 93 (throttling state). In this way, in the vehicle refrigeration cycle system 10, the refrigerant (high pressure refrigerant), which is outputted from the compressor 11, flows in the direction of the black arrows in the refrigerant circuit passage 10a in FIG. 12 (dual mode).

After the switching to the refrigerant flow path that is set for the heating operation, the control unit 100 determines the operational state (e.g., the control signal) of each corresponding control subject device, which is connected to the output side of the control unit 100, and the control unit 100 outputs, for example, the determined control signal to each corresponding control subject device.

For example, the control signal, which is outputted to the electric motor 11*b* of the compressor 11, is determined as follows. First of all, a target condenser outlet air temperature TCO of the indoor condenser 82 is determined based on the target outlet air temperature TAO with reference to a control map prestored in the control unit 100. Then, the control signal, which is outputted to the electric motor 11*b* of the compressor 11, is determined based on a difference between the target condenser outlet air temperature TCO and the temperature of the high pressure refrigerant supplied to the indoor condenser 82, which is measured with the high-pressure side temperature sensor, such that the outlet air temperature of the indoor condenser 82 approaches the target condenser outlet air temperature TCO through a feedback control operation.

Furthermore, a control signal, which is outputted to the heating expansion valve 84, is determined such that a degree of supercooling of the refrigerant, which is supplied to the heating expansion valve 84, approaches a target degree of supercooling that is set to adjust the coefficient of performance (COP) of the cycle toward or around its maximum value.

Furthermore, a control signal, which is outputted to the servomotor 38*a* of the air mix door 38 of the front seat side air conditioning unit 120, is determined such that the air mix door 38 fully opens the air passage of the indoor condenser 82.

A control signal, which is outputted to the first flow quantity adjusting valve 93*a* of the rear seat side air conditioning unit 50 at the time of the dual mode, is determined such that the temperature of the conditioning air (outlet air), which is outputted from the unified heat exchanger 13, becomes the desired temperature, which is desired by and is set by the occupant, based on the target outlet air temperature TAO with reference to a control map prestored in the control unit 100.

In this way, in the vehicle refrigeration cycle system 10, the refrigerant (high pressure refrigerant), which is outputted from the compressor 11, is supplied to the indoor condenser 82 at the time of the single mode and is supplied to both of the indoor condenser 82 and the first heat exchanging arrangement 131 of the unified heat exchanger 13 through the branching portion A at the time of the dual mode. At this time, the air passage of the indoor condenser 82 is opened by the air mix door 38, so that the high pressure refrigerant, which is supplied to the indoor condenser 82, releases the heat to the front seat side conditioning air that is blown from the blower 122 through the heat exchange therebetween. In this way, the front seat side conditioning air is heated.

Furthermore, at the time of the dual mode, the high pressure refrigerant, which is supplied to the first heat exchanging arrangement 131 of the unified heat exchanger 13, releases the heat to the rear seat side conditioning air blown from the blower 52 through the heat exchange therebetween. In this way, at the time of the dual mode, the rear seat side conditioning air is heated.

The high pressure refrigerant, which is outputted from the indoor condenser 82, and the high pressure refrigerant, which is outputted from the first heat exchanging arrangement 131 of the unified heat exchanger 13, are merged at the merging portion B, and this merged high pressure refrigerant is supplied to the heating expansion valve 84 where the merged high pressure refrigerant is depressurized and expanded until it becomes the low pressure refrigerant. Then, the low pressure refrigerant, which is depressurized through the heating expansion valve 84, is supplied to the outdoor heat exchanger 19. The low pressure refrigerant, which is supplied to the outdoor heat exchanger 19, absorbs the heat from the outside air that is blown from the blower fan 20.

The low pressure refrigerant, which is outputted from the outdoor heat exchanger 19, is supplied to the accumulator 23 through the three-way valve 89, and this low pressure refrigerant is separated into the gas phase refrigerant and the liquid phase refrigerant at the accumulator 23. Then, the gas phase refrigerant, which is separated at the accumulator 23, is drawn into the compressor 11 and is compressed once again at the compressor 11.

As discussed above, at the time of executing the heating operation, the front seat side conditioning air, which is heated to the desired temperature at the indoor condenser 82, is blown into the front seat side space, so that the heating of the front seat side space of the vehicle cabin is achieved. Furthermore, at the time of the dual mode, the rear seat side conditioning air, which is heated to the desired temperature by the first heat exchanging arrangement 131 of the unified heat exchanger 13, is blown into the rear seat side space, so that the heating of the rear seat side space of the vehicle cabin is achieved.

At the time of executing the heating operation of the present embodiment, the high pressure refrigerant corresponds to the refrigerant, which flows in the refrigerant flow path that extends from the outlet of the compressor 11 to the inlet of the heating expansion valve 84. Furthermore, the low pressure refrigerant corresponds to the refrigerant, which flows in the refrigerant flow path that extends from the outlet of the heating expansion valve 84 to the inlet of the compressor 11.

(b) Dehumidifying and Heating Operation (Third Operation Mode)

The dehumidifying and heating operation is started when a dehumidifying and heating operation mode is selected through the operation mode setting switch at the manipulation panel. The starting of the dehumidifying and heating operation is not necessarily triggered by the selection of the dehumidifying and heating operation mode through the operation mode setting switch. Specifically, it may be determined whether dehumidification is required based on a relative humidity of the vehicle cabin during the heating operation. Then, the dehumidifying and heating operation may be automatically started based on a result of this determination.

At the time of executing the dehumidifying and heating operation, the control unit 100 closes the opening and closing valve 86 and switches the three-way valve 89 to the refrigerant flow path, which connects between the outlet of the outdoor heat exchanger 19 and the inlet of the cooling expansion valve 90. Furthermore, at the time of the single mode, the control unit 100 operates the first and second flow quantity adjusting valves 93*a*, 94*a* to close the refrigerant passages 93, 94, respectively (full closing of the refrigerant passages 93, 94). In contrast, at the time of the dual mode, the control unit 100 operates the first and second flow quantity adjusting valves 93*a*, 94*a* to open the refrigerant passages 93, 94, respectively (throttling state). In this way, in the vehicle refrigeration cycle system 10, the refrigerant (high pressure refrigerant), which is outputted from the compressor 11, flows in the direction of the white open arrows in the refrigerant circuit passage 10*a* in FIG. 12 (dual mode).

After the switching to the refrigerant flow path that is set for the dehumidifying and heating operation, the control unit 100 determines the operational state (e.g., the control signal) of each corresponding control subject device, which is connected to the output side of the control unit 100, and the control unit 100 outputs, for example, the determined control signal to each corresponding control subject device.

For example, a control signal, which is outputted to the servomotor 38a of the air mix door 38 of the front seat side air conditioning unit 120, is determined such that the air mix door 38 fully opens the air passage of the indoor condenser 82.

Control signals, which are outputted to the first and second flow quantity adjusting valves 93a, 94a, respectively, of the rear seat side air conditioning unit 50 at the time of the dual mode, are determined such that the temperature of the conditioning air (outlet air), which is outputted from the unified heat exchanger 13, becomes the desired temperature, which is desired by and is set by the occupant, based on the target outlet air temperature TAO with reference to a control map prestored in the control unit 100.

Furthermore, the control signals, which are outputted to the heating expansion valve 84 and the cooling expansion valve 90, respectively, are determined based on a difference between a preset cabin inside air temperature and the outside air temperature at the outside of the vehicle cabin, so that the throttle opening degrees of the heating expansion valve 84 and the cooling expansion valve 90 are determined. For example, the controls signals, which are outputted to the heating expansion valve 84 and the cooling expansion valve 90, are determined to implement a corresponding one of four states of the operational mode, i.e., first to four dehumidifying and heating operations described below, which are executed in this order in response to increasing of the target outlet air temperature.

(c-1) First Dehumidifying and Heating Operation

In the first dehumidifying and heating operation, the heating expansion valve 84 is placed into the full open state, and the cooling expansion valve 90 is placed into the throttling state. Therefore, although the cycle structure is the same as that of the cooling operation discussed above, the air mix door 38 fully opens the air passage of the indoor condenser 82, so that the refrigerant, which is outputted from the compressor 11, is circulated in the cycle in the following manner.

That is, the high pressure refrigerant, which is outputted from the compressor 11, is supplied to the indoor condenser 82 at the time of the single mode and is supplied to both of the indoor condenser 82 and the first heat exchanging arrangement 131 of the unified heat exchanger 13 at the time of the dual mode. At the time of the single mode, the refrigerant passage 93 is closed by the first flow quantity adjusting valve 93a, so that the high pressure refrigerant, which is outputted from the compressor 11, is supplied only to the indoor condenser 82 without flowing into the first heat exchanging arrangement 131 of the unified heat exchanger 13.

The high pressure refrigerant, which is supplied to the indoor condenser 82, releases the heat to the front seat side conditioning air, which is cooled and dehumidified by the indoor evaporator 91. In this way, the front seat side conditioning air is heated.

Furthermore, at the time of the dual mode, the high pressure refrigerant, which is supplied to the first heat exchanging arrangement 131 of the unified heat exchanger 13, releases the heat to the rear seat side conditioning air blown from the blower 52 through the heat exchange therebetween. In this way, at the time of the dual mode, the rear seat side conditioning air is heated.

The high pressure refrigerant, which is outputted from the indoor condenser 82, and the high pressure refrigerant, which is outputted from the first heat exchanging arrangement 131 of the unified heat exchanger 13, are supplied to the outdoor heat exchanger 19 without being depressurized through the heating expansion valve 84. Then, the refrigerant, which is outputted from the outdoor heat exchanger 19, is depressurized and expanded through the cooling expansion valve 90.

The low pressure refrigerant, which is depressurized through the cooling expansion valve 90, is supplied to the indoor evaporator 91 at the time of the single mode and is supplied to both of the indoor evaporator 91 and the second heat exchanging arrangement 132 of the unified heat exchanger 13 through the branching portion C at the time of the dual mode. At the time of the single mode, the refrigerant passage 94 is closed by the second flow quantity adjusting valve 94a, so that the low pressure refrigerant, which is depressurized through the cooling expansion valve 90, is supplied only to the indoor evaporator 91 without flowing into the second heat exchanging arrangement 132 of the unified heat exchanger 13.

The low pressure refrigerant, which is supplied to the indoor evaporator 91, absorbs the heat from the front seat side conditioning air blown from the blower 122 and is thereby evaporated. In this way, the front seat side conditioning air is cooled.

Furthermore, at the time of the dual mode, the low pressure refrigerant, which is supplied to the second heat exchanging arrangement 132 of the unified heat exchanger 13, absorbs the heat from the rear seat side conditioning air blown from the blower 52 and is thereby evaporated. In this way, at the time of the dual mode, the rear seat side conditioning air is cooled.

As discussed above, at the time of the first dehumidifying and heating operation, the front seat side conditioning air, which is cooled and dehumidified by the indoor evaporator 91 of the front seat side air conditioning unit 120, is heated by the indoor condenser 82 and is blown into the front seat side space of the vehicle cabin. In this way, the dehumidifying and heating of the front seat side space of the vehicle cabin is achieved.

Furthermore, in the unified heat exchanger 13, at the time of the dual mode, the rear seat side conditioning air is heated through the heat exchange between the rear seat side conditioning air and the high pressure refrigerant at the first heat exchanging arrangement 131 and is cooled and dehumidified through the heat exchange between the rear seat side conditioning air and the low pressure refrigerant at the second heat exchanging arrangement 132.

Figure 13A:
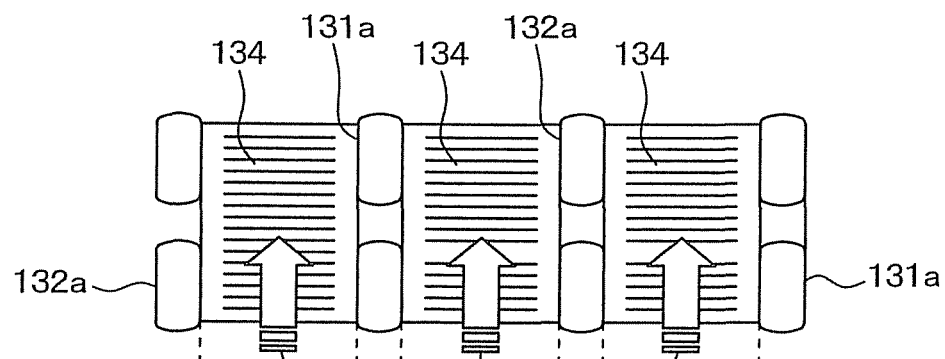
FIGS. 13A and 13B are diagrams for describing a temperature distribution of conditioning air, which flows around the outer fins of the unified heat exchanger according to the eighth embodiment.
Figure 13B:
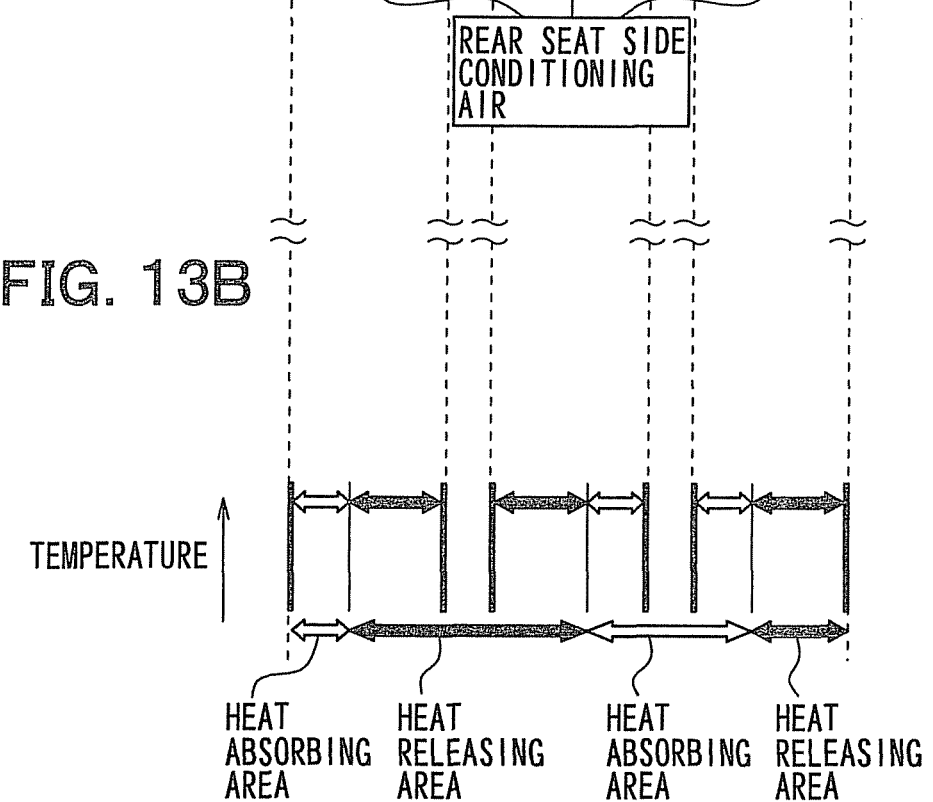

FIGS. 13A and 13B are diagrams for describing a temperature distribution of the conditioning air, which flows around the outer fins 134. FIG. 13A is a cross-sectional view showing the tubes 131a, 132a of the unified heat exchanger 13, and FIG. 13B is a temperature distribution diagram showing the temperature distribution of the conditioning air, which flows around the outer fins 134.

As shown in FIGS. 13A and 13B, the conditioning air, which flows thorough the conditioning air passage (serving as a heat exchanging subject fluid passage) 133 of the unified heat exchanger 13 (see FIGS. 2 and 3 of the first embodiment), is heated to raise its temperature at the outer surface (heat releasing area) of the high-pressure side tube 131a by the high pressure refrigerant that flows in the high-pressure side tube 131a and is cooled and dehumidified at the outer surface (heat releasing area) of the low-pressure side tube 132a by the low pressure refrigerant that flows in the low-pressure side tube 132a. That is, the conditioning air, which is heated by the high pressure refrigerant (high temperature refrigerant) and is dehumidified by the low pressure refrigerant (low temperature refrigerant), is outputted from the unified heat exchanger 13.

As discussed above, at the time of the dual mode, when the dehumidifying and heating operation is executed, the rear seat side conditioning air is heated and dehumidified by the unified heat exchanger 13 of the rear seat side air conditioning unit 50 and is blown into the rear seat side space of the vehicle cabin. In this way, the dehumidifying and heating of the rear seat side space of the vehicle cabin is achieved.

(c-2) Second Dehumidifying and Heating Operation

Next, during the execution of the first dehumidifying and heating operation, when the target outlet air temperature TAO becomes higher than a first reference temperature, which is preset, the second dehumidifying and heating operation is executed.

In the second dehumidifying and heating operation, the heating expansion valve 84 is placed into the throttling state, and the throttle opening degree of the cooling expansion valve 90 is increased from that of the first dehumidifying and heating operation. Thereby, the refrigerant, which is outputted from the compressor 11, is circulated in the cycle in the following manner.

That is, the high pressure refrigerant, which is outputted from the compressor 11, is supplied to the indoor condenser 82 at the time of the single mode and is supplied to both of the indoor condenser 82 and the first heat exchanging arrangement 131 of the unified heat exchanger 13 at the time of the dual mode. The high pressure refrigerant, which is supplied to the indoor condenser 82, releases the heat to the front seat side conditioning air, which is cooled and dehumidified by the indoor evaporator 91. Furthermore, at the time of the dual mode, the high pressure refrigerant, which is supplied to the first heat exchanging arrangement 131 of the unified heat exchanger 13, releases the heat to the rear seat side conditioning air blown from the blower 52 through the heat exchange therebetween.

The high pressure refrigerant, which is outputted from the indoor condenser 82, and the high pressure refrigerant, which is outputted from the first heat exchanging arrangement 131 of the unified heat exchanger 13, are depressurized and expanded through the heating expansion valve 84, which is in the throttling state, until the high pressure refrigerant is depressurized to an intermediate pressure and thereby becomes intermediate-pressure refrigerant. The intermediate-pressure refrigerant, which is depressurized through the heating expansion valve 84, is supplied to the outdoor heat exchanger 19 and releases the heat to the outside air blown from the blower fan 20 through the heat exchange therebetween. The rest of the flow of the refrigerant is the same as that of the first dehumidifying and heating operation.

As discussed above, similar to the first dehumidifying and heating operation, at the time of the second dehumidifying and heating operation, the conditioning air, which is cooled and dehumidified by the indoor evaporator 91, is heated by the indoor condenser 82 and is blown into the front seat side space of the vehicle cabin. In this way, the dehumidifying and heating of the front seat side space of the vehicle cabin is achieved.

Furthermore, at the time of the dual mode, similar to the first dehumidifying and heating operation, the rear seat side conditioning air is heated and dehumidified by the unified heat exchanger 13 of the rear seat side air conditioning unit 50 and is blown into the rear seat side space of the vehicle cabin. In this way, the dehumidifying and heating of the rear seat side space of the vehicle cabin is achieved.

At this time, in the second dehumidifying and heating operation, the heating expansion valve 84 is in the throttling state, so that the temperature of the refrigerant, which is supplied to the outdoor heat exchanger 19, can be reduced in comparison to the first dehumidifying and heating operation. Therefore, the amount of heat release at the outdoor heat exchanger 19 can be reduced by reducing the temperature difference between the refrigerant and the outside air temperature at the outdoor heat exchanger 19. Thereby, it is possible to increase the amount of heat release of the refrigerant at each of the indoor condenser 82 and the first heat exchanging arrangement 131 of the unified heat exchanger 13, so that the temperature of the conditioning air, which is blown from the indoor condenser 82, and the temperature of the conditioning air, which is blown from the unified heat exchanger 13 can be increased in comparison to those of the first dehumidifying and heating operation.

(c-3) Third Dehumidifying and Heating Operation

Next, during the execution of the second dehumidifying and heating operation, when the target outlet air temperature TAO becomes higher than a second reference temperature, which is preset, the third dehumidifying and heating operation is executed.

In the third dehumidifying and heating operation, the throttle opening degree of the heating expansion valve 84 is reduced in comparison to the throttle opening degree of the heating expansion valve 84 in the second dehumidifying and heating operation, and the throttle opening degree of the cooling expansion valve 90 is increased in comparison to the throttle opening degree of the cooling expansion valve 90 in the second dehumidifying and heating operation. In this way, the refrigerant, which is outputted from the compressor 11, is circulated in the cycle in the following manner.

That is, similar to the first and second dehumidifying and heating operations, in the third dehumidifying and heating operation, the high pressure refrigerant, which is outputted from the compressor 11, is supplied to the indoor condenser 82 at the time of the single mode and is supplied to both of the indoor condenser 82 and the first heat exchanging arrangement 131 of the unified heat exchanger 13 at the time of the dual mode. The high pressure refrigerant, which is supplied to the indoor condenser 82, releases the heat to the front seat side conditioning air, which is cooled and dehumidified by the indoor evaporator 91. Furthermore, at the time of the dual mode, the high pressure refrigerant, which is supplied to the first heat exchanging arrangement 131 of the unified heat exchanger 13, releases the heat to the rear seat side conditioning air blown from the blower 52 through the heat exchange therebetween.

The high pressure refrigerant, which is outputted from the indoor condenser 82, and the high pressure refrigerant, which is outputted from the first heat exchanging arrangement 131 of the unified heat exchanger 13, are depressurized and expanded through the heating expansion valve 84, which is in the throttling state, until the high pressure refrigerant is depressurized to an intermediate pressure and thereby becomes intermediate-pressure refrigerant having the temperature lower than the outside air temperature. The intermediate-pressure refrigerant, which is depressurized through the heating expansion valve 84, is supplied to the outdoor heat exchanger 19 and absorbs the heat from the outside air blown from the blower fan 20 through the heat exchange therebetween. Furthermore, the refrigerant, which is outputted from the outdoor heat exchanger 19, is depressurized through the cooling expansion valve 90. The rest of the flow of the refrigerant is the same as that of the first dehumidifying and heating operation.

As discussed above, similar to the first and second dehumidifying and heating operations, at the time of the third dehumidifying and heating operation, the conditioning air, which is cooled and dehumidified by the indoor evaporator 91, is heated by the indoor condenser 82 and is blown into the front seat side space of the vehicle cabin. In this way, the dehumidifying and heating of the front seat side space of the vehicle cabin is achieved.

Furthermore, at the time of the dual mode, similar to the first and second dehumidifying and heating operations, the rear seat side conditioning air is heated and dehumidified by the unified heat exchanger 13 of the rear seat side air conditioning unit 50 and is blown into the rear seat side space of the vehicle cabin. In this way, the dehumidifying and heating of the rear seat side space of the vehicle cabin is achieved.

At this time, in the third dehumidifying and heating operation mode, the throttle opening degree of the heating expansion valve 84 is reduced, and thereby the outdoor heat exchanger 19 is used as the evaporator. Therefore, in comparison to the second dehumidifying and heating operation mode, the amount of heat release of the refrigerant at each of the indoor condenser 82 and the first heat exchanging arrangement 131 of the unified heat exchanger 13 can be increased in the third dehumidifying and heating operation mode. Therefore, the temperature of the conditioning air, which is outputted from the indoor condenser 82, and the temperature of the conditioning air, which is outputted from the unified heat exchanger 13, can be increased in comparison to the second dehumidifying and heating operation mode.

(c-4) Fourth Dehumidifying and Heating Operation

Next, during the execution of the third dehumidifying and heating operation, when the target outlet air temperature TAO becomes higher than a third reference temperature, which is preset, the fourth dehumidifying and heating operation is executed. In the fourth dehumidifying and heating operation, the throttle opening degree of the heating expansion valve 84 is reduced in comparison to the throttle opening degree of the heating expansion valve 84 in the third dehumidifying and heating operation, and the cooling expansion valve 90 is placed in the full open state. In this way, the refrigerant, which is outputted from the compressor 11, is circulated in the cycle in the following manner.

That is, similar to the first to third dehumidifying and heating operations, the high pressure refrigerant, which is outputted from the compressor 11, is supplied to the indoor condenser 82 at the time of the single mode and is supplied to both of the indoor condenser 82 and the first heat exchanging arrangement 131 of the unified heat exchanger 13 at the time of the dual mode. The high pressure refrigerant, which is supplied to the indoor condenser 82, releases the heat to the front seat side conditioning air, which is cooled and dehumidified by the indoor evaporator 91. Furthermore, at the time of the dual mode, the high pressure refrigerant, which is supplied to the first heat exchanging arrangement 131 of the unified heat exchanger 13, releases the heat to the rear seat side conditioning air blown from the blower 52 through the heat exchange therebetween.

The high pressure refrigerant, which is outputted from the indoor condenser 82, and the high pressure refrigerant, which is outputted from the first heat exchanging arrangement 131 of the unified heat exchanger 13, are depressurized and expanded through the heating expansion valve 84, which is in the throttling state, until the high pressure refrigerant is depressurized to the low pressure and thereby becomes low-pressure refrigerant having the temperature lower than the outside air temperature. The low-pressure refrigerant, which is depressurized through the heating expansion valve 84, is supplied to the outdoor heat exchanger 19 and absorbs the heat from the outside air blown from the blower fan 20 through the heat exchange therebetween.

Since the cooling expansion valve 90 is in the full open state, the low pressure refrigerant, which is outputted from the outdoor heat exchanger 19, is supplied to the indoor evaporator 91 at the time of the single mode without being depressurized and is supplied to both of the indoor evaporator 91 and the second heat exchanging arrangement 132 of the unified heat exchanger 13 through the branching portion C at the time of the dual mode without being depressurized. The rest of the flow of the refrigerant is the same as that of the first dehumidifying and heating operation.

As discussed above, similar to the first to third dehumidifying and heating operations, at the time of the fourth dehumidifying and heating operation, the conditioning air, which is cooled and dehumidified by the indoor evaporator 91, is heated by the indoor condenser 82 and is blown into the front seat side space of the vehicle cabin. In this way, the dehumidifying and heating of the front seat side space of the vehicle cabin is achieved.

Furthermore, at the time of the dual mode, similar to the first to third dehumidifying and heating operations, the rear seat side conditioning air is heated and dehumidified by the unified heat exchanger 13 of the rear seat side air conditioning unit 50 and is blown into the rear seat side space of the vehicle cabin. In this way, the dehumidifying and heating of the rear seat side space of the vehicle cabin is achieved.

At this time, in the fourth dehumidifying and heating operation, similar to the third dehumidifying and heating operation, the outdoor heat exchanger 19 is used as the evaporator, and the throttle opening degree of the heating expansion valve 84 is reduced in comparison to that of the third dehumidifying and heating operation, so that the refrigerant evaporation temperature at the outdoor heat exchanger 19 is reduced. Therefore, the temperature difference between the temperature of the refrigerant and the temperature of the outside air at the outdoor heat exchanger 19 is increased in comparison to the third dehumidifying and heating operation mode, so that the amount of heat release of the refrigerant at each of the indoor condenser 82 and the first heat exchanging arrangement 131 of the unified heat exchanger 13 is increased. Therefore, the temperature of the conditioning air, which is outputted from the indoor condenser 82, and the temperature of the conditioning air, which is outputted from the unified heat exchanger 13, can be increased in comparison to the third dehumidifying and heating operation.

At the time of executing the dehumidifying and heating operation, the high pressure refrigerant corresponds to the refrigerant, which flows in the refrigerant flow path that extends from the outlet of the compressor 11 to the inlet of the heating expansion valve 84. Furthermore, the low pressure refrigerant corresponds to the refrigerant, which flows in the refrigerant flow path that extends from the outlet of the cooling expansion valve 90 to the inlet of the compressor 11.

In the vehicle air conditioning system 1 of the present embodiment, as discussed above, the various cycle structures are implemented by switching the refrigerant flow paths in the vehicle refrigeration cycle system 10, so that the appropriate cooling, the appropriate heating and the appropriate dehumidifying and heating of the front seat side space and the rear seat side space of the vehicle cabin can be achieved.

Particularly, in the rear seat side air conditioning unit 50 of the present embodiment, the temperature adjustment of the rear seat side conditioning air (the second subject heat exchanging fluid), which is blown in to the rear seat side space (the second heat adjusting subject), can be achieved with the single heat exchanger, i.e., the unified heat exchanger 13. Therefore, the installability of the unified heat exchanger 13 and thereby of the rear seat side air conditioning unit 50 in the vehicle can be improved.

In addition, the temperature of the rear seat side conditioning air can be adjusted at the unified heat exchanger 13 without a need for providing, for example, the air mix door, so that the installability of the unified heat exchanger 13 and thereby of the rear seat side air conditioning unit 50 in the vehicle can be further improved.

Furthermore, in the unified heat exchanger 13 of the present embodiment, the first heat exchanging arrangement 131 is connected to the indoor condenser 82 in parallel, and the second heat exchanging arrangement 132 is connected to the indoor evaporator 91 in parallel. Therefore, the unified heat exchanger 13 can be implemented in the simple manner.

Furthermore, in the unified heat exchanger 13 of the present embodiment, each outer fin 134, which is a heat conduction promoting member, is placed in the conditioning air passage 133 between the corresponding high-pressure side tube 131a of the first heat exchanging arrangement 131 and the corresponding low-pressure side tube 132a of the second heat exchanging arrangement 132, so that the outer fin 134 is commonly used at each of the first and second heat exchanging arrangements 131, 132.

Therefore, a heat exchange efficiency of the heat exchange between the high pressure refrigerant (high temperature refrigerant also referred to as high temperature fluid) and the rear seat side conditioning air, and a heat exchange efficiency of the heat exchange between the low pressure refrigerant (low temperature refrigerant also referred to as low temperature fluid) and the rear seat side conditioning air at the unified heat exchanger 13 can be improved.

In the case where the heat exchange takes place between the high pressure refrigerant and the rear seat side conditioning air at the first heat exchanging arrangement 131 of the unified heat exchanger 13 at the time of, for example, the heating operation, the entire area of each outer fin 134 can be used to release the heat of the high pressure refrigerant to the rear seat side conditioning air. Therefore, a heat releasable surface area of the first heat exchanging arrangement 131 can be substantially increased.

Furthermore, in the case where the heat exchange takes place between the low pressure refrigerant and the rear seat side conditioning air at the second heat exchanging arrangement 132 of the unified heat exchanger 13 at the time of, for example, the cooling operation, the entire area of each outer fin 134 can be used to absorb the heat from the rear seat side conditioning air into the low pressure refrigerant. Therefore, a heat absorbable surface area (heat absorbing area) of the second heat exchanging arrangement 132 can be substantially increased.

As discussed above, the heat conducting surface area (heat absorbable surface area or heat releasable surface area) of the unified heat exchanger 13 of the present embodiment at the time of the cooling operation or the heating operation can be substantially increased. Therefore, in comparison to a heat exchanger having the comparative heat exchange performance, the size of the unified heat exchanger 13 can be reduced to further improve the installability of the unified heat exchanger 13 in the vehicle.

Furthermore, in the case of performing the heat exchange of the rear seat side conditioning air with the high pressure refrigerant at the first heat exchanging arrangement 131 and with the low pressure refrigerant at the second heat exchanging arrangement 132 at the time of, for example, the dehumidifying and heating operation, the heat releasing area (effective surface area), which can be used for the releasing of the heat at the outer fin 134, changes depending on a change in the temperature of the high pressure refrigerant, which flows through the corresponding high-pressure side tube 131a, and a change in the temperature of the low pressure refrigerant, which flows through the corresponding low-pressure side tube 132a.

For example, in the case where the high pressure refrigerant, which has the relatively low temperature, flows through the high-pressure side tube 131a at the time of, for example, the first dehumidifying and heating operation, the heat releasing area (effective surface area) of the outer fin 134, which can be used for the releasing of the heat, becomes small. In contrast, for example, in the case where the high pressure refrigerant, which has the relatively high temperature, flows through the high-pressure side tube 131a at the time of, for example, the fourth dehumidifying and heating operation, the heat releasing area (effective surface area) of the outer fin 134, which can be used for the releasing of the heat, becomes large.

As discussed above, the heat releasing area (effective surface area) of the outer fin 134, which can be used for the heat releasing, is appropriately changed depending on the temperature of the refrigerant that flows in each corresponding tube 131a, 132a. Therefore, the appropriate heat exchange between the high pressure refrigerant and the rear seat side conditioning air and the appropriate heat exchange between low pressure refrigerant and the rear seat side conditioning air can be achieved.

Ninth Embodiment

Figure 14:
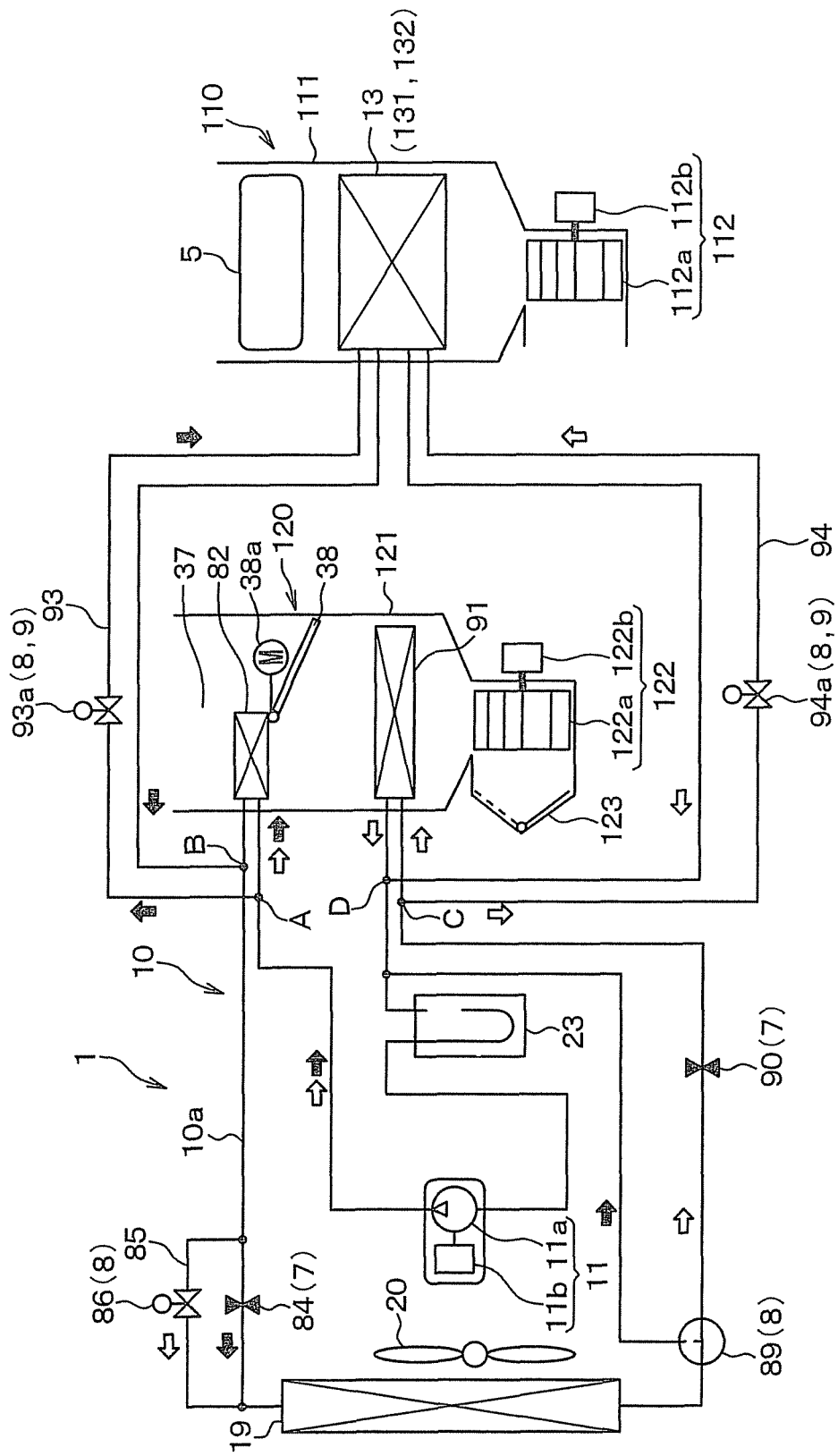
FIG. 14 is a schematic diagram showing a structure of a vehicle air conditioning system according to a ninth embodiment of the present disclosure.

Next, a ninth embodiment of the present disclosure will be described with reference to FIG. 14. FIG. 14 is a schematic diagram showing a structure of the vehicle air conditioning system 1 of the present embodiment. In the discussion of the following embodiments including the discussion of the present embodiment, the components, which are similar to those of the eighth embodiment will be indicated by the same reference numerals and will not be discussed in detail. Furthermore, in the following embodiments, although the control unit 100, which is shown in FIG. 12 and discussed above in the eighth embodiment, is not depicted in the drawings for the sake of simplicity, the control unit 100, which is similar to that of FIG. 12, is also provided in the vehicle air conditioning system 1 of each of the following embodiments.

In the present embodiment, the rear seat side air conditioning unit 50 of the eighth embodiment is modified to a battery temperature adjusting unit 110, which adjusts the temperature of the vehicle battery 5. In this embodiment, the basic structure of the vehicle refrigeration cycle system 10 is the same as that of the eighth embodiment.

The battery temperature adjusting unit 110 is placed at, for example, a rear side of the back seat in the vehicle cabin or in a luggage room of the vehicle. The battery temperature adjusting unit 110 includes a casing 111, which forms an outer shell of the battery temperature adjusting unit 110 and receives the vehicle battery 5 and the unified heat exchanger 13 that is similar to that of eighth embodiment.

The casing 111 forms an air passage of conditioning air (battery conditioning air), which is blown toward a battery accommodating space (second temperature adjusting subject), in which the vehicle battery 5 is placed. The basic structure of the casing 111 is the same as that of the casing 51 of the rear seat side air conditioning unit 50 of the eighth embodiment. In the present embodiment, the battery conditioning air corresponds to the second subject heat exchanging fluid.

A blower 112, which draws and blows the cabin inside air (internal air), is placed at an upstream end portion of the casing 111. Similar to the blower 52 of the rear seat side air conditioning unit 50 of the eighth embodiment, the blower 112 is an electric blower, which includes a centrifugal multi-blade fan (a sirocco fan) 112*a* and an electric motor 112*b*. The electric motor 112*b* drives the centrifugal multi-blade fan 112*a*. The unified heat exchanger 13 is placed on the downstream side of the blower 112 in the flow direction of the air. The vehicle battery 5 is placed on the downstream side of the unified heat exchanger 13 in the flow direction of the air.

The vehicle battery 5 functions as an electric power storage device or mechanism (electric power storage means), which stores electric power to be supplied to various electric devices installed in the vehicle. The vehicle battery 5 needs to be operated (charged or discharged) in a predetermined temperature range. For example, when the vehicle battery 5 is operated (discharging its electricity) in a state where the temperature (i.e., the battery temperature) of the vehicle battery 5 is equal to or lower than a predetermined lower limit temperature, the vehicle battery 5 may not be able to have its proper function. Furthermore, when the vehicle battery 5 is operated in a state where the temperature of the vehicle battery 5 is equal to or higher than a predetermined upper limit temperature, the vehicle battery 5 may be rapidly deteriorated. A battery temperature sensor (not shown), which senses the battery temperature, is provided to the vehicle battery 5, and a measurement signal of the battery temperature sensor is outputted to the control unit 100 (see FIG. 12).

Next, operations of the present embodiment will be described. In the vehicle air conditioning system 1 of the present embodiment, a battery cooling operation for cooing the vehicle battery 5 is executable during the cooling operation of the conditioning unit (now serving as an indoor air conditioning unit for air conditioning the entire vehicle cabin) 120, and a battery heating operation for heating the vehicle battery 5 is executable during the heating operation of the air conditioning unit 120. The cooling operation, the heating operation and the dehumidifying and heating operation of the air conditioning unit 120 are similar to those discussed in the eighth embodiment and thereby will not be discussed further.

(a) Battery Cooling Operation

The battery cooling operation is executed when the temperature of the vehicle battery 5, which is sensed with, for example, the battery temperature sensor, is higher than a predetermined first reference temperature.

In the battery cooling operation, the vehicle refrigeration cycle system 10 is switched to the refrigerant flow paths set for the cooling operation discussed in the eighth embodiment, and the refrigerant passage 93 is closed by the first flow quantity adjusting valve 93*a* (full closing), and the refrigerant passage 94 is opened by the second flow quantity adjusting valve 94*a* (throttling state). In this way, the refrigerant, which is outputted from the compressor 11, flows in the vehicle refrigeration cycle system 10 in the direction of the white open arrows in the refrigerant circuit passage 10*a* in FIG. 14.

After the switching of the refrigerant flow paths, the control unit 100 computes a battery target temperature of the battery conditioning air to be blown toward the vehicle battery 5 based on the measurement signals of the sensors and the manipulation signals of the manipulation panel. Then, the control unit 100 determines the operational state of each corresponding control subject device connected to the output side of the control unit 100 based on the computed battery target temperature, the measurement signals of the sensors and the manipulation signals of the manipulation panel.

For example, a control signal, which is outputted to the second flow quantity adjusting valve 94*a*, is determined such that the flow quantity of the refrigerant supplied to the second heat exchanging arrangement 132 of the unified heat exchanger 13 through the second flow quantity adjusting valve 94*a* results in that the outlet air temperature of the conditioning air (outlet air), which is outputted from the unified heat exchanger 13, approaches the battery target temperature. Specifically, the flow quantity of the refrigerant, which is supplied to the second heat exchanging arrangement 132 of the unified heat exchanger 13, is increased in response to an increase in a difference between the outlet air temperature of the battery conditioning air at the unified heat exchanger 13 and the battery target temperature.

Thereby, in the vehicle refrigeration cycle system 10, the refrigerant (high pressure refrigerant), which is outputted from the compressor 11, flows through the indoor condenser 82, the expansion valve bypass passage 85, the outdoor heat exchanger 19 and the cooling expansion valve 90 in this order. The low pressure refrigerant, which is depressurized through the cooling expansion valve 90, is supplied to both of the indoor evaporator 91 and the second heat exchanging arrangement 132 of the unified heat exchanger 13.

Then, the low pressure refrigerant, which is supplied to the second heat exchanging arrangement 132 of the unified heat exchanger 13, absorbs the heat from the battery conditioning air blown from the blower 112 and is thereby evaporated. In this way, the battery conditioning air is cooled.

The refrigerant, which is outputted from the indoor evaporator 91, and the refrigerant, which is outputted from the second heat exchanging arrangement 132 of the unified heat exchanger 13, are merged at the merging portion D, and this merged refrigerant is supplied to the accumulator 23 where the merged refrigerant is separated into the gas phase refrigerant and the liquid phase refrigerant. Then, the gas phase refrigerant, which is separated at the accumulator 23, is drawn into the compressor 11 and is compressed once again at the compressor 11.

As discussed above, at the time of the battery cooling operation, the battery conditioning air, which is cooled by the second heat exchanging arrangement 132 of the unified heat exchanger 13, is blown into the battery accommodating space to reduce the temperature around the vehicle battery 5. In this way, the cooling of the vehicle battery 5 is achieved.

(b) Battery Heating Operation

The battery heating operation is executed in a case where the temperature of the vehicle battery 5, which is sensed with the battery temperature sensor, is lower than a predetermined second reference temperature, which is lower than the first predetermined reference temperature.

In the battery heating operation, the vehicle refrigeration cycle system 10 is switched to the refrigerant flow paths set for the heating operation discussed in the eighth embodiment, and the refrigerant passage 93 is opened by the first flow quantity adjusting valve 93*a* (throttling state), and the refrigerant passage 94 is closed by the second flow quantity adjusting valve 94*a* (full closing). In this way, in the vehicle refrigeration cycle system 10, the refrigerant (high pressure refrigerant), which is outputted from the compressor 11, flows in the direction of the black arrows in the refrigerant circuit passage 10*a* in FIG. 14.

A control signal, which is outputted to the first flow quantity adjusting valve 93*a*, is determined such that the flow quantity of the refrigerant supplied to the first heat exchanging arrangement 131 of the unified heat exchanger 13 through the first flow quantity adjusting valve 93*a* results in that the outlet air temperature of the conditioning air (outlet air), which is outputted from the unified heat exchanger 13, approaches the battery target temperature. For example, the control signal, which is outputted to the first flow quantity adjusting valve 93a, is determined such that the flow quantity of the refrigerant, which is supplied to the first heat exchanging arrangement 131 of the unified heat exchanger 13, is increased in response to an increase in a difference between the outlet air temperature of the battery conditioning air at the unified heat exchanger 13 and the battery target temperature.

Thereby, in the vehicle refrigeration cycle system 10, the refrigerant, which is outputted from the compressor 11, is supplied to both of the indoor condenser 82 and the first heat exchanging arrangement 131 of the unified heat exchanger 13. Then, the high pressure refrigerant, which is supplied to the first heat exchanging arrangement 131 of the unified heat exchanger 13, releases the heat to the battery conditioning air blown from the blower 112. In this way, the battery conditioning air is heated.

The refrigerant, which is outputted from the indoor condenser 82, and the refrigerant, which is outputted from the first heat exchanging arrangement 131 of the unified heat exchanger 13, are merged at the merging portion B, and this merged refrigerant flows through the heating expansion valve 84, the outdoor heat exchanger 19 and the accumulator 23 in this order. Then, the gas phase refrigerant, which is separated at the accumulator 23, is drawn into the compressor 11 and is compressed once again at the compressor 11.

As discussed above, at the time of the battery heating operation, the battery conditioning air, which is heated by the first heat exchanging arrangement 131 of the unified heat exchanger 13, is blown into the battery accommodating space to increase the temperature around the vehicle battery 5. In this way, the heating of the vehicle battery 5 is achieved.

In the vehicle air conditioning system 1 of the present embodiment, as discussed above, the various cycle structures are implemented by switching the refrigerant flow paths in the vehicle refrigeration cycle system 10, so that the appropriate temperature adjustment of the vehicle cabin space (the first temperature adjusting subject) and the appropriate temperature adjustment of the vehicle battery 5 can be achieved.

Particularly, in the battery temperature adjusting unit 110 of the present embodiment, the temperature of the battery conditioning air (second subject heat exchanging fluid) to be blown toward the vehicle battery 5 can be achieved with the single heat exchanger, i.e., the unified heat exchanger 13. Therefore, the installability of the unified heat exchanger 13 and thereby of the battery temperature adjusting unit 110 in the vehicle can be improved.

Tenth Embodiment

Figure 15:
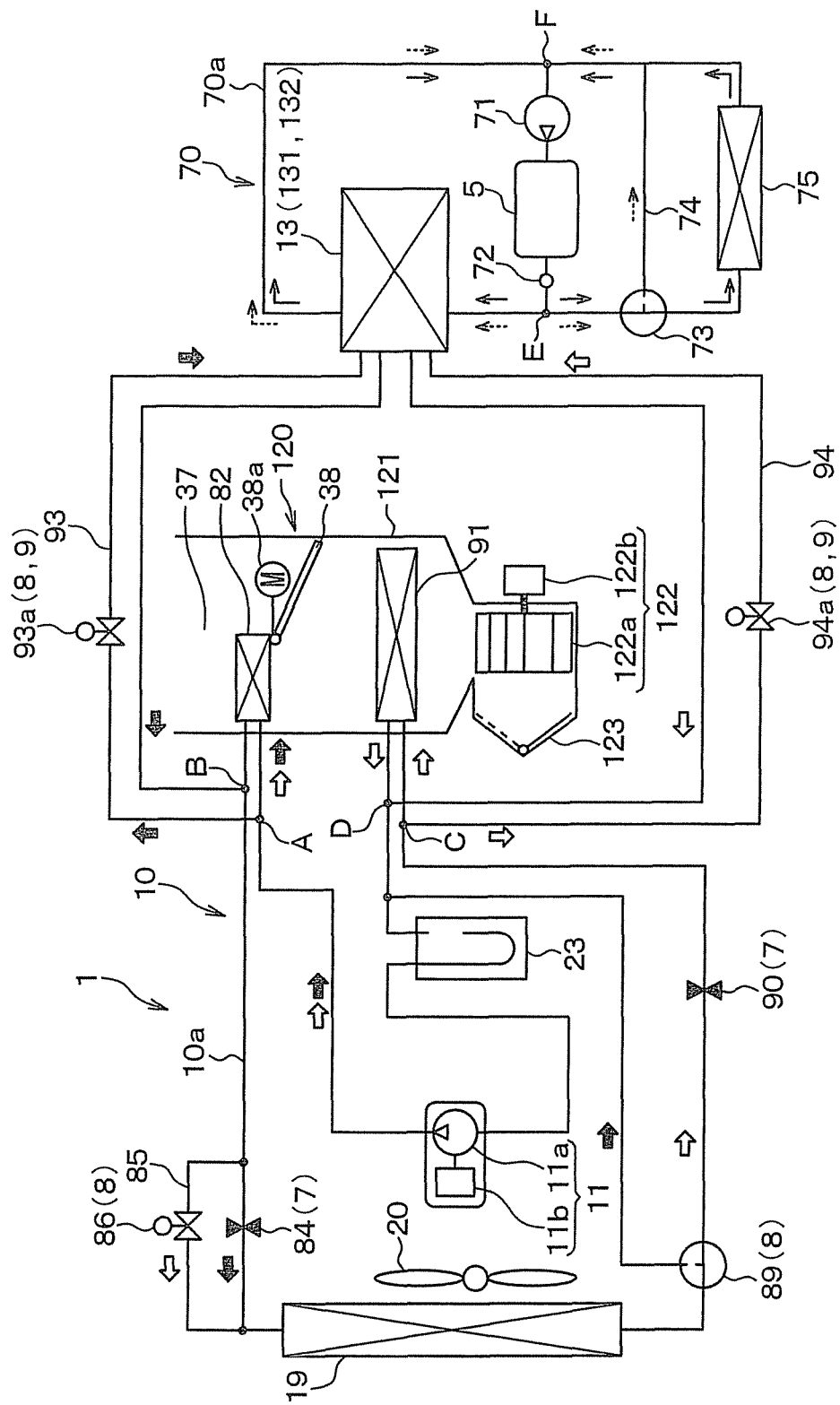
FIG. 15 is a schematic diagram showing a structure of a vehicle air conditioning system according to a tenth embodiment of the present disclosure.

Next, a tenth embodiment of the present disclosure will be described with reference to FIG. 15. FIG. 15 is a schematic diagram showing a structure of the vehicle air conditioning system 1 of the present embodiment.

In the ninth embodiment, the battery conditioning air to be blown toward the battery accommodating space is adjusted by the battery temperature adjusting unit 110 to adjust the temperature of the vehicle battery 5.

In the present embodiment, there is provided a brine circuit 70, which circulates brine (serving as heating medium or temperature-adjustable fluid) through a brine circuit passage (also referred to as a fluid circuit passage) 70a. The temperature of the brine is adjusted at the unified heat exchanger 13, and the temperature adjusted brine is used to adjust the temperature of the vehicle battery 5. In the present embodiment, the vehicle battery 5 corresponds to the second heat adjusting subject, and the brine corresponds to the second subject heat exchanging fluid. For instance, aqueous ethylene glycol solution may be used as the brine.

The unified heat exchanger 13 of the present embodiment may be constructed as follows. Each brine passage (one or a plurality of brine passages) of the brine circuit passage 70a, which conducts the brine, is provided between the corresponding adjacent high-pressure side tube 131a of the first heat exchanging arrangement 131 and the corresponding adjacent low-pressure side tube 132a of the second heat exchanging arrangement 132. The brine is conducted through the brine passage to exchange the heat with both of the refrigerant, which flows in the high-pressure side tube 131a, and the refrigerant, which flows in the low-pressure side tube 132a.

The brine circuit 70 is a heating medium circulation circuit, which adjusts the temperature of the vehicle battery 5 by conducting the brine through the brine passage formed in the inside of the vehicle battery 5. A brine pump 71, a brine temperature sensor 72, an electric three-way valve 73, a radiator 75 and a bypass passage 74 are arranged in the brine circuit 70. The brine temperature sensor 72 senses the temperature of the brine. The radiator 75 releases the heat of the brine to the outside air, which is blown from a blower fan (not shown), through heat exchange between the brine and the outside air. The bypass passage 74 conducts the brine while bypassing the radiator 75.

The brine pump 71 is an electric pump, which pumps the brine to the brine passage formed in the inside of the vehicle battery 5. A rotational speed (flow quantity) of the brine pump 71 is controlled by a control signal outputted from the control unit 100 (see FIG. 12).

The brine temperature sensor 72 is placed at the outlet of the brine passage of the vehicle battery 5 and functions as a temperature sensing device or mechanism (temperature sensing means), which senses the temperature of the brine outputted from the vehicle battery 5. An inlet of the brine passage of the unified heat exchanger 13 and an inlet of the three-way valve 73 are connected to a downstream side portion of the brine circuit 70, which is located on the downstream side of the brine temperature sensor 72 in the flow direction of the brine, through a branching portion E.

The three-way valve 73 functions as a brine flow path switching device or mechanism (brine flow path switching means) that switches between a brine flow path, which connects between a valve side outlet (i.e., an outlet on the three-way valve 73 side) of the branching portion E and an inlet of the radiator 75, and a brine flow path, which connects between the valve side outlet of the branching portion E and the bypass passage 74.

Specifically, the brine circuit 70 can be switched between the brine flow path, which conducts the brine through the brine pump 71, the vehicle battery 5, the brine passage of the unified heat exchanger 13 on one side of the branching portion E and the radiator 75 on the other side of the branching portion E upon branching at the branching portion E and the brine pump 71 once again in this order, and the brine flow path, which conducts the brine through the brine pump 71, the vehicle battery 5, the brine passage of the unified heat exchanger 13 on the one side of the branching portion E and the bypass passage 74 on the other side of the branching portion E upon branching at the branching portion E and the brine pump 71 once again in this order. The operation of the three-way valve 73 is controlled by a control signal outputted from the control unit 100.

Next, operations of the present embodiment will be described. In the vehicle air conditioning system 1 of the present embodiment, similar to the ninth embodiment, the battery cooling operation for cooling the vehicle battery 5 and the battery heating operation for heating the vehicle battery 5 can be executed.

(a) Battery Cooling Operation

The battery cooling operation is executed when the temperature of the vehicle battery 5, which is sensed with, for example, the battery temperature sensor, is higher than the predetermined first reference temperature.

In the battery cooling operation of the present embodiment, in the case where the battery target temperature of the vehicle battery 5 is higher than the outside air temperature, the vehicle refrigeration cycle system 10 is not operated, and the three-way valve 73 of the brine circuit 70 is switched to the brine flow path, which connects between the valve side outlet of the branching portion E and the inlet of the radiator 75.

In this way, in the brine circuit 70, as indicated by solid line arrows in FIG. 15, the brine, which is pumped from the brine pump 71, is circuited through the vehicle battery 5, the brine passage of the unified heat exchanger 13 on the one side of the branching portion E and the radiator 75 on the other side of the branching portion E upon branching at the branching portion E and the brine pump 71 once again in this order.

At this time, the brine, which is cooled through the radiator 75, flows in the brine passage formed in the inside of the vehicle battery 5 and absorbs the heat from the vehicle battery 5, so that the vehicle battery 5 is cooled.

Furthermore, in the battery cooling operation, in the case where the battery target temperature of the vehicle battery 5 is equal to or lower than the outside air temperature, the vehicle refrigeration cycle system 10 is switched to the refrigerant flow paths, which are set for the battery cooling operation discussed in the ninth embodiment, and the three-way valve 73 of the brine circuit 70 is switched to the brine flow path, which connects between the valve side outlet of the branching portion E and the inlet of the radiator 75.

Then, the control signal, which is outputted to the second flow quantity adjusting valve 94*a*, is determined such that the flow quantity of the refrigerant, which is supplied to the second heat exchanging arrangement 132 of the unified heat exchanger 13 through the second flow quantity adjusting valve 94*a*, is set based on the measurement value of the brine temperature sensor 72. For example, the control signal, which is outputted to the second flow quantity adjusting valve 94*a*, is determined such that the flow quantity of the refrigerant, which is supplied to the second heat exchanging arrangement 132 of the unified heat exchanger 13, is increased in response to an increase in a difference between the measurement value of the brine temperature sensor 72 and the battery target temperature.

In this way, in the brine circuit 70, as indicated by solid line arrows in FIG. 15, the brine, which is pumped from the brine pump 71, is circuited through the vehicle battery 5, the brine passage of the unified heat exchanger 13 on the one side of the branching portion E and the radiator 75 on the other side of the branching portion E upon branching at the branching portion E and the brine pump 71 once again in this order.

At this time, the brine, which is cooled through the second heat exchanging arrangement 132 of the unified heat exchanger 13, flows in the brine passage formed in the inside of the vehicle battery 5 and absorbs the heat from the vehicle battery 5, so that the vehicle battery 5 is cooled.

As discussed above, at the time of the battery cooling operation, the brine, which is cooled through the radiator 75, or the brine, which is cooled at the second heat exchanging arrangement 132 of the unified heat exchanger 13, is supplied through the brine passage formed in the inside of the vehicle battery 5, so that the cooling of the vehicle battery 5 is achieved.

(b) Battery Heating Operation

The battery heating operation is executed in a case where the temperature of the vehicle battery 5, which is sensed with the battery temperature sensor, is lower than a predetermined second reference temperature, which is lower than the first predetermined reference temperature.

In the battery heating operation of the present embodiment, the vehicle refrigeration cycle system 10 is switched to the refrigerant flow paths set for the battery heating operation discussed in the ninth embodiment, and the three-way valve 73 of the brine circuit 70 is switched to the brine flow path, which connects between the valve side outlet of the branching portion E and the inlet of the bypass passage 74.

In this way, in the brine circuit 70, as indicated by dotted line arrows in FIG. 15, the brine, which is pumped from the brine pump 71, is circuited through the vehicle battery 5, the brine passage of the unified heat exchanger 13 on the one side of the branching portion E and the bypass passage 74 on the other side of the branching portion E upon branching at the branching portion E and the brine pump 71 once again in this order.

At this time, the brine, which is heated at the first heat exchanging arrangement 131 of he unified heat exchanger 13, flows through the brine passage, which is formed in the inside of the vehicle battery 5, so that the heat of the brine is released to the vehicle battery 5, and thereby the vehicle battery 5 is heated.

As discussed above, at the time of executing the battery heating operation, the brine, which is heated at the first heat exchanging arrangement 131 of the unified heat exchanger 13, is conducted through the brine passage formed in the inside of the vehicle battery 5, so that the heating of the vehicle battery 5 is achieved.

In the vehicle air conditioning system 1 of the present embodiment, the advantages, which are similar to those discussed in the ninth embodiment, can be achieved.

The above embodiments may be modified as follows.

(1) In the first embodiment, at the time of executing the dehumidifying and heating operation, the compressor 11 and the blower fan 20 function as the heat exchange amount adjusting devices (heat exchange amount adjusting means) of the heat exchange amount adjusting mechanism 6, which adjusts the amount of heat exchange between the refrigerant and the cabin conditioning air at each heat exchanging arrangement 131, 132 of the unified heat exchanger 13. However, the present disclosure is not limited to this.

For example, the depressurizing device or mechanism (depressurizing means), such as the first and second fixed chokes 15, 22 of the first embodiment, may be changed to variable throttle device or mechanism (first and second variable throttles), which can change the throttle opening degree thereof. Then, at least one of the variable throttles may be used to change one of the temperature of the high pressure refrigerant supplied to the first heat exchanging arrangement 131 and the temperature of the low pressure refrigerant supplied to the second heat exchanging arrangement 132 to adjust the amount of heat exchange between the refrigerant and the cabin conditioning air at each heat exchanging arrangement 131, 132. In such a case, the chokes (the first and second variable throttles) 15, 22 function as heat exchange amount adjusting devices (heat exchange amount adjusting means) of the heat exchange amount adjusting mechanism 6, which adjusts the amount of heat exchange between the refrigerant and the cabin conditioning air at each heat exchanging arrangement 131, 132 of the unified heat exchanger 13.

Furthermore, in the eighth to tenth embodiments, the compressor 11, the blower fan 20, the heating expansion valve 84, the cooling expansion valve 90 may function as the heat exchange amount adjusting devices (heat exchange amount adjusting means) of the heat exchange amount adjusting mechanism 6 discussed in the first embodiment.

Furthermore, each of the first and second three-way valves 12, 21 of the first embodiment, which functions as the flow passage switching device or mechanism (flow passage switching means), may be changed to a three-way valve of a diverting type (also referred to as a three-way diverting valve), which can adjust the flow quantity of the refrigerant that is outputted therefrom, and at least one of these three-way valves of the diverting type may be used to change at least one of the flow quantity of the high pressure refrigerant, which is supplied to the first heat exchanging arrangement 131, and the flow quantity of the low pressure refrigerant, which is supplied to the second heat exchanging arrangement 132, to adjust the amount of heat exchange between the refrigerant and the cabin conditioning air at each of the first and second heat exchanging arrangements 131, 132. In such a case, the first and second three-way valves 12, 21 function as heat exchange amount adjusting devices (heat exchange amount adjusting means) of the heat exchange amount adjusting mechanism 6, which adjusts the amount of heat exchange between the refrigerant and the cabin conditioning air at each heat exchanging arrangement 131, 132 of the unified heat exchanger 13.

(2) In the second embodiment, the size of the heat exchanging surface area of the second heat exchanging arrangement 132 is increased relative to the size of the heat exchanging surface area of the first heat exchanging arrangement 131 in the unified heat exchanger 13. However, the present disclosure is not limited to this.

For example, the size of the heat exchanging surface area of the first heat exchanging arrangement 131 may be increased relative to the size of the heat exchanging surface area of the second heat exchanging arrangement 132. In such a case, the size of the heat exchanging surface area of each heat exchanging arrangement 131, 132 of the unified heat exchanger 13 may be changed by placing the partition plate 135 in the inside of the low-pressure side header tank 132*b* of the second heat exchanging arrangement 132.

(3) In the second embodiment, the partition plate 135 is placed in the inside of the high-pressure side header tank 131*b* of the unified heat exchanger 13 to change the heat exchanging surface area of each heat exchanging arrangement 131, 132 of the unified heat exchanger 13. However, the present disclosure is not limited to this.

For example, the number of the high-pressure side tubes 131*a* of the first heat exchanging arrangement 131 and the number of the low-pressure side tubes 132*a* of the second heat exchanging arrangement 132 may be changed to change the size of the heat exchange surface area of each heat exchanging arrangement 131, 132 of the unified heat exchanger 13.

(3) In the third embodiment, the engine 200 is used as the external heat source. However, the present disclosure is not limited to this. For example, in a case where the vehicle refrigeration cycle system 10 is applied to a stationary air conditioning system, a cold temperature storage, a cooling/heating apparatus of a vending machine, the electric device, such as the drive electric motor or the inverter, which supplies the electric power to the drive electric motor, may be used as the external heat source. Furthermore, in the case where the vehicle refrigeration cycle system 10 is applied to the stationary air conditioning system, the cold temperature storage, the cooling/heating apparatus of the vending machine, the drive device or mechanism (drive means) of the compressor, such as the electric motor or the inverter, may be used as the external heat source. In such a case, the heating medium, which cools the device used as the external heat source, serves as the first fluid.

(4) In the fourth to seventh and ninth to tenth embodiments, the vehicle battery 5 is used as the subject operational device, the temperature of which needs to be controlled to the predetermined temperature range. However, the present disclosure is not limited to this. For example, another electric device, which is not used as the external heat source, may be used as the subject operational device. In such a case, the temperature adjusting medium, which is used to adjust the temperature of such a subject operational device, serves as the subject heat exchanging fluid.

(5) In the first to seventh embodiments, there is discussed the heat exchange system, in which the high pressure refrigerant or the engine coolant of the vehicle refrigeration cycle system 10 is used as the first fluid, and the low pressure refrigerant of the vehicle refrigeration cycle system 10 is used as the second fluid. Furthermore, the cabin conditioning air, the battery conditioning air or the brine is used as the subject heat exchanging fluid. However, the first fluid, the second fluid and the subject heat exchanging fluid are not limited to the above-described ones. That is, the first fluid, the second fluid and the subject heat exchanging fluid may be changed to any other appropriate fluids as long as the temperature of the first fluid and the temperature of the second fluid are different from each other.

(6) As discussed above, it is desirable to place the outer fin 134 in the conditioning air passage 133, which is formed between the adjacent high-pressure side tube 131*a* and the adjacent low-pressure side tube 132*a* in the unified heat exchanger 13. However, the outer fin 134 may be eliminated in a case where, for example, the air flow resistance needs to be further reduced.

(7) In the above embodiments, the high-pressure side tubes 131*a* and the low-pressure side tubes 132*a* are alternately arranged through the entire range of the unified heat exchanger 13. However, the present disclosure is not limited to this. Specifically, it is possible to alternately arrange the high-pressure side tubes 131*a* and the low-pressure side tubes 132*a* only in a portion of the unified heat exchanger 13. Furthermore, only at least one of the high-pressure side tubes 131*a* and/or the low-pressure side tubes 132*a* may be interposed between the other ones of the high-pressure side tubes 131*a* and/or the low-pressure side tubes 132*a*.

(8) In the above embodiments, the ordinary chlorofluorocarbon refrigerant is used as the refrigerant. However, the type of the refrigerant is not limited to this. For example, natural refrigerant (e.g., carbon dioxide) or hydrocarbon refrigerant may be used as the refrigerant of the present disclosure.

(9) In each of the eighth to tenth embodiments, the first flow quantity adjusting valve 93*a* is provided in the refrigerant passage 93 between the branching portion A and the first heat exchanging arrangement 131 of the unified heat exchanger 13, and the second flow quantity adjusting valve 94*a* is provided in the refrigerant passage 94 between the branching portion C and the second heat exchanging arrangement 132 of the unified heat exchanger 13. However, the present disclosure is not limited to this. For example, in a case where the target temperature of the first temperature adjusting subject and the target temperature of the second temperature adjusting subject are in the same temperature range, the first and second flow quantity adjusting valves 93a, 94a may be eliminated, or the first and second flow quantity adjusting valves 93a, 94a may be changed to simple opening and closing valves, respectively, each of which is operable only between a full open state and a full close state.

(10) In the above embodiments, the specific structure of the unified heat exchanger 13 is described. However, any other appropriate heat exchanger may be used in place of the unified heat exchanger 13 as long as such a heat exchanger is formed integrally, and the high pressure refrigerant and the low pressure refrigerant of the refrigeration cycle can exchange the heat with the second subject heat exchanging fluid at such a heat exchanger.

(11) In the eighth embodiment, the front seat side space (first temperature adjusting subject) and the rear seat side space (second temperature adjusting subject) are temperature adjusted. In the ninth and tenth embodiments, the entire vehicle cabin space (first temperature adjusting subject) and the vehicle battery (second temperature adjusting subject) are temperature adjusted. However, the present disclosure is not limited to this. That is, any other space and/or any other subject operational device, which require the temperature adjustment, may be used as the first temperature adjusting subject and/or the second temperature adjusting subject in place of one or more of the above described ones.

Furthermore, any one or more components of any one of the above embodiments and modifications thereof may be combined with any one or more components of any other one of the above embodiments and modifications thereof within a scope and sprit of the present disclosure.

Additional advantages and modifications will readily occur to those skilled in the art. The present disclosure in its broader terms is therefore not limited to the specific details, representative apparatus, and illustrative examples shown and described.

What is claimed is:

1. A heat exchange system comprising:
   a unified heat exchanger that includes:
      a first heat exchanging arrangement that exchanges heat between first fluid and subject heat exchanging fluid; and
      a second heat exchanging arrangement that exchanges heat between second fluid and the subject heat exchanging fluid, wherein:
   a temperature of the first fluid, which is supplied to the first heat exchanging arrangement is different from a temperature of the second fluid, which is supplied to the second heat exchanging arrangement;
   the first heat exchanging arrangement and the second heat exchanging arrangement are integrated together and are arranged to enable heat exchange of the subject heat exchanging fluid with both of the first fluid and the second fluid;
   a temperature of the subject heat exchanging fluid at the unified heat exchanger is adjustable by adjusting at least one of an amount of heat exchange between the first fluid and the subject heat exchanging fluid at the first heat exchanging arrangement and an amount of heat exchange between the second fluid and the subject heat exchanging fluid at the second heat exchanging arrangement;
   the heat exchange system further comprises a heat exchange amount adjusting mechanism, which adjusts at least one of the amount of heat exchange between the first fluid and the subject heat exchanging fluid at the first heat exchanging arrangement, and the amount of heat exchange between the second fluid and the subject heat exchanging fluid at the second heat exchanging arrangement;
   the first heat exchanging arrangement includes a plurality of first fluid side tubes, which conduct the first fluid;
   the second heat exchanging arrangement includes a plurality of second fluid side tubes, which conduct the second fluid;
   the plurality of first fluid side tubes and the plurality of second fluid side tubes each have a first row and a second row arranged in a flow direction of the subject heat exchanging fluid;
   the plurality of first fluid side tubes and the plurality of second fluid side tubes are held between a first header tank and a second header tank, the first header tank having a first distributing space that conducts the first fluid from a first inflow conduit to the first row of the plurality of first fluid side tubes and a first collecting space that conducts the first fluid from the second row of the plurality of first fluid side tubes to a first outflow conduit, and the second header tank having a second distributing space that conducts the second fluid from a second inflow conduit to the first row of the plurality of second fluid side tubes and a second collecting space that conducts the second fluid from the second row of the plurality of second fluid side tubes to a second outflow conduit;
   a subject heat exchanging fluid passage is formed between an outer surface of a corresponding one of the plurality of first fluid side tubes and an outer surface of a corresponding one of the plurality of second fluid side tubes to conduct the subject heat exchanging fluid;
   at least one tube selected from one of the plurality of first fluid side tubes and the plurality of second fluid side tubes is interposed between and is spaced from adjacent two tubes selected from the other one of the plurality of first fluid side tubes and the plurality of second fluid side tubes to form the subject heat exchanging fluid passage between the at least one tube selected from the one of the plurality of first fluid side tubes and the plurality of second fluid side tubes and each of the adjacent two tubes selected from the other one of the plurality of first fluid side tubes and the plurality of second fluid side tubes;
   an outer fin is placed in the subject heat exchanging fluid passage to promote heat exchange at each of the first heat exchanging arrangement and the second heat exchanging arrangement;
   the first heat exchanging arrangement is a heating heat exchanging arrangement that heats the subject heat exchanging fluid by exchanging the heat between the first fluid, which flows through the plurality of first fluid side tubes, and the subject heat exchanging fluid, which flows around the plurality of first fluid side tubes; and
   the second heat exchanging arrangement is a cooling heat exchanging arrangement that cools the subject heat exchanging fluid by exchanging the heat between the second fluid, which flows through the plurality of second fluid side tubes, and the subject heat exchanging fluid, which flows around the plurality of second fluid side tubes.

2. The heat exchange system according to claim 1, wherein:
   the heat exchange amount adjusting mechanism adjusts at least one of the temperature of the first fluid, which is supplied to the first heat exchanging arrangement and the temperature of the second fluid, which is supplied to the second heat exchanging arrangement.

3. The heat exchange system according to claim 1, wherein:
the heat exchange amount adjusting mechanism adjusts at least one of a flow quantity of the first fluid, which is supplied to the first heat exchanging arrangement, and a flow quantity of the second fluid, which is supplied to the second heat exchanging arrangement.

4. The heat exchange system according to claim 1, wherein:
the heat exchange system is provided in a system that includes a vapor compression refrigeration cycle;
the first fluid is high pressure refrigerant of the refrigeration cycle; and
the second fluid is low pressure refrigerant of the refrigeration cycle.

5. The heat exchange system according to claim 1, wherein:
the heat exchange system is provided in a system that includes a vapor compression refrigeration cycle and an external heat source;
the first fluid is heating medium, which has heat absorbed from the external heat source; and
the second fluid is low pressure refrigerant of the refrigeration cycle.

6. The heat exchange system according to claim 4, wherein:
the system is a vehicle air conditioning system that blows conditioning air, which is temperature adjusted, to an air conditioning subject space of a vehicle; and
the subject heat exchanging fluid is the conditioning air.

7. The heat exchange system according to claim 4, wherein:
the system is a temperature adjusting system that adjusts a temperature of a subject operational device, wherein the temperature of the subject operational device needs to be adjusted within a predetermined temperature range; and
the subject heat exchanging fluid is temperature adjusting medium, which adjusts the temperature of the subject operational device.

8. The heat exchange system according to claim 1, further comprising a fluid circuit passage, which circulates temperature-adjustable fluid, wherein:
the unified heat exchanger is placed in the fluid circuit passage;
the first fluid is the temperature-adjustable fluid in a first temperature state; and
the second fluid is the temperature-adjustable fluid in a second temperature state, which is different from the first temperature state.

9. The heat exchange system according to claim 8, wherein:
the heat exchange system is provided in a system that has a vapor compression refrigeration cycle, which includes the fluid circuit;
the temperature-adjustable fluid is refrigerant that is circulated through the fluid circuit passage in the vapor compression refrigeration cycle;
the refrigerant in the first temperature state is high pressure refrigerant; and
the refrigerant in the second temperature state is low pressure refrigerant.

10. The heat exchange system according to claim 8, wherein:
a heat exchanger, at which the temperature-adjustable fluid releases or absorbs the heat, is inserted in the fluid circuit passage; and
one of the first heat exchanging arrangement and the second heat exchanging arrangement is connected to the heat exchanger in series in the fluid circuit passage.

11. The heat exchange system according to claim 8, wherein:
the fluid circuit includes a heat exchanger, at which the temperature-adjustable fluid releases or absorbs heat; and
one of the first heat exchanging arrangement and the second heat exchanging arrangement is connected to the heat exchanger in parallel in the fluid circuit passage.

12. A vehicle refrigeration cycle system that adjusts a temperature of first subject heat exchanging fluid, which is used to adjust a temperature of a first heat adjusting subject in a vehicle, and a temperature of a second subject heat exchanging fluid, which is used to adjust a temperature of a second heat adjusting subject in the vehicle, the vehicle refrigeration cycle system comprising:
a compressor that compresses and discharges refrigerant;
a radiator that releases heat from the refrigerant outputted from the compressor;
a depressurizing mechanism that depressurizes the refrigerant outputted from the radiator;
an evaporator that evaporates the refrigerant depressurized through the depressurizing mechanism; and
a unified heat exchanger that includes a first heat exchanging arrangement, which receives the refrigerant as high pressure refrigerant, and a second heat exchanging arrangement, which receives the refrigerant as low pressure refrigerant, wherein:
at least one of the radiator and the evaporator is used to adjust the temperature of the first subject heat exchanging fluid;
the unified heat exchanger is used to adjust the temperature of the second subject heat exchanging fluid and includes a heat conduction promoting member, through which the heat is released to the second subject heat exchanging fluid;
the first heat exchanging arrangement includes a plurality of high-pressure side tubes that conduct the high pressure refrigerant;
the first heat exchanging arrangement is a heating heat exchanging arrangement that heats the second subject heat exchanging fluid by exchanging heat between the high pressure refrigerant, which flows through the plurality of high-pressure side tubes, and the second subject heat exchanging fluid;
the second heat exchanging arrangement includes a plurality of low-pressure side tubes that conduct the low pressure refrigerant;
the second heat exchanging arrangement is a cooling heat exchanging arrangement that cools the second subject heat exchanging fluid by exchanging heat between the low pressure refrigerant, which flows through the plurality of low-pressure side tubes, and the second subject heat exchanging fluid;
the plurality of high-pressure side tubes and the plurality of low-pressure side tubes each have a first row and a second row arranged in a flow direction of the second subject heat exchanging fluid;
the plurality of high-pressure side tubes and the plurality of low-pressure side tubes are held between a first header tank and a second header tank, the first header tank having a first distributing space that conducts the high pressure refrigerant from a first inflow conduit to the first row of the plurality of high-pressure side tubes and a first collecting space that conducts the high pressure refrigerant from the second row of the plurality of high-pressure side tubes to a first outflow conduit, and the second header tank having a second distributing space that conducts the low pressure refrigerant from a second inflow conduit to the first row of the plurality of low-pressure side tubes and a second collecting space that conducts the low pressure refrigerant from the second row of the plurality of low-pressure side tubes to a second outflow conduit;

the first heat exchanging arrangement and the second heat exchanging arrangement are integrated together and are arranged to enable heat exchange of the second subject heat exchanging fluid with both of the high pressure refrigerant and the low pressure refrigerant;

at least one of the plurality of high-pressure side tubes is placed between corresponding adjacent two of the plurality of low-pressure side tubes;

at least one of the plurality of low-pressure side tubes is placed between corresponding adjacent two of the plurality of high-pressure side tubes;

a subject heat exchanging fluid passage, which conducts the second subject heat exchanging fluid, is formed between a corresponding one of the plurality of high-pressure side tubes and a corresponding adjacent one of the plurality of low-pressure side tubes, while the corresponding adjacent one of the plurality of low-pressure side tubes is spaced from and is placed adjacent to the corresponding one of the plurality of high-pressure side tubes; and the heat conduction promoting member is placed in the subject heat exchanging fluid passage and is commonly used by the first heat exchanging arrangement and the second heat exchanging arrangement.

13. The vehicle refrigeration cycle system according to claim 12, further comprising a refrigerant flow quantity adjusting mechanism that adjusts at least one of:

a flow quantity of the high pressure refrigerant, which is supplied to the first heat exchanging arrangement; and a flow quantity of the low pressure refrigerant, which is supplied to the second heat exchanging arrangement.

14. A vehicle refrigeration cycle system that adjusts a temperature of first subject heat exchanging fluid, which is used to adjust a temperature of a first heat adjusting subject in a vehicle, and a temperature of a second subject heat exchanging fluid, which is used to adjust a temperature of a second heat adjusting subject in the vehicle, the vehicle refrigeration cycle system comprising:

a compressor that compresses and discharges refrigerant;

a first utilizing side heat exchanger that exchanges heat between the refrigerant and the first subject heat exchanging fluid;

an outdoor heat exchanger that exchanges heat between the refrigerant and outside air;

a depressurizing mechanism that depressurizes the refrigerant;

a second utilizing side heat exchanger that exchanges heat between the refrigerant and the first subject heat exchanging fluid;

a refrigerant flow path switching mechanism that switches between:

a refrigerant flow path that guides the refrigerant, which is outputted from the compressor as high pressure refrigerant, to the first utilizing side heat exchanger; and a refrigerant flow path that guide the refrigerant, which is outputted from the depressurizing mechanism as low pressure refrigerant, to the second utilizing side heat exchanger; and a unified heat exchanger that includes a first heat exchanging arrangement, which receives the high pressure refrigerant, and a second heat exchanging arrangement, which receives the low pressure refrigerant, wherein:

the unified heat exchanger is used to adjust the temperature of the second subject heat exchanging fluid and includes a heat conduction promoting member, through which the heat is released to the second subject heat exchanging fluid;

the first heat exchanging arrangement includes a plurality of high-pressure side tubes that conduct the high pressure refrigerant;

the first heat exchanging arrangement is a heating heat exchanging arrangement that heats the second subject heat exchanging fluid by exchanging heat between the high pressure refrigerant, which flows through the plurality of high-pressure side tubes, and the second subject heat exchanging fluid;

the second heat exchanging arrangement includes a plurality of low-pressure side tubes that conduct the low pressure refrigerant;

the second heat exchanging arrangement is a cooling heat exchanging arrangement that cools the second subject heat exchanging fluid by exchanging heat between the low pressure refrigerant, which flows through the plurality of low-pressure side tubes, and the second subject heat exchanging fluid;

the plurality of high-pressure side tubes and the plurality of low-pressure side tubes each have a first row and a second row arranged in a flow direction of the second subject heat exchanging fluid;

the plurality of high-pressure side tubes and the plurality of low-pressure side tubes are held between a first header tank and a second header tank, the first header tank having a first distributing space that conducts the high pressure refrigerant from a first inflow conduit to the first row of the plurality of high-pressure side tubes and a first collecting space that conducts the high pressure refrigerant from the second row of the plurality of high-pressure side tubes to a first outflow conduit, and the second header tank having a second distributing space that conducts the low pressure refrigerant from a second inflow conduit to the first row of the plurality of low-pressure side tubes and a second collecting space that conducts the low pressure refrigerant from the second row of the plurality of low-pressure side tubes to a second outflow conduit;

the first heat exchanging arrangement and the second heat exchanging arrangement are integrated together and are arranged to enable heat exchange of the second subject heat exchanging fluid with both of the high pressure refrigerant and the low pressure refrigerant;

at least one of the plurality of high-pressure side tubes is placed between corresponding adjacent two of the plurality of low-pressure side tubes;

at least one of the plurality of low-pressure side tubes is placed between corresponding adjacent two of the plurality of high-pressure side tubes;

a subject heat exchanging fluid passage, which conducts the second subject heat exchanging fluid, is formed between a corresponding one of the plurality of high-pressure side tubes and a corresponding adjacent one of the plurality of low-pressure side tubes, while the corresponding adjacent one of the plurality of low-pressure side tubes is spaced from and is placed adjacent to the corresponding one of the plurality of high-pressure side tubes; and the heat conduction promoting member is placed in the subject heat exchanging fluid passage and is commonly used by the first heat exchanging arrangement and the second heat exchanging arrangement.

15. The vehicle refrigeration cycle system according to claim 14, wherein:
the first heat exchanging arrangement is connected to the first utilizing side heat exchanger in parallel; and
the second heat exchanging arrangement is connected to the second utilizing side heat exchanger in parallel.

16. The vehicle refrigeration cycle system according to claim 14, wherein:
the refrigerant flow path switching mechanism enables flow of the low pressure refrigerant to the second utilizing side heat exchanger and the second heat exchanging arrangement in a first operation mode;
the refrigerant flow path switching mechanism enables flow of the high pressure refrigerant to the first utilizing side heat exchanger and the first heat exchanging arrangement in a second operation mode; and
the refrigerant flow path switching mechanism enables flow of the high pressure refrigerant to the first utilizing side heat exchanger and the first heat exchanging arrangement and flow of the low pressure refrigerant to the second utilizing side heat exchanger and the second heat exchanging arrangement in a third operation mode.

17. The vehicle refrigeration cycle system according to claim 14, further comprising a refrigerant flow quantity adjusting mechanism that adjusts at least one of:
a flow quantity of the high pressure refrigerant, which is supplied to the first heat exchanging arrangement; and
a flow quantity of the low pressure refrigerant, which is supplied to the second heat exchanging arrangement.

18. The heat exchange system according to claim 1, wherein:
the first row of the plurality of first fluid side tubes and the first row of the plurality of second fluid side tubes are placed on an upstream side of the second row of the plurality of first fluid side tubes and the second row of the plurality of second fluid side tubes in the flow direction of the subject heat exchanging fluid;
the first fluid flows in the first row of the plurality of first fluid side tubes in a first flow direction;
the first fluid flows in the second row of the plurality of first fluid side tubes in a second flow direction, which is opposite from the first flow direction;
the second fluid flows in the first row of the plurality of second fluid side tubes in the first flow direction; and
the second fluid flows in the second row of the plurality of second fluid side tubes in the second flow direction.

19. The heat exchange system according to claim 12, wherein:
the first row of the plurality of high-pressure side tubes and the first row of the plurality of low-pressure side tubes are placed on an upstream side of the second row of the plurality of high-pressure side tubes and the second row of the plurality of low-pressure side tubes in the flow direction of the second subject heat exchanging fluid;
the high pressure refrigerant flows in the first row of the plurality of high-pressure side tubes in a first flow direction;
the high pressure refrigerant flows in the second row of the plurality of high-pressure side tubes in a second flow direction, which is opposite from the first flow direction;
the low pressure refrigerant flows in the first row of the plurality of low-pressure side tubes in the first flow direction; and
the low pressure refrigerant flows in the second row of the plurality of low-pressure side tubes in the second flow direction.

20. The heat exchange system according to claim 14, wherein:
the first row of the plurality of high-pressure side tubes and the first row of the plurality of low-pressure side tubes are placed on an upstream side of the second row of the plurality of high-pressure side tubes and the second row of the plurality of low-pressure side tubes in the flow direction of the second subject heat exchanging fluid;
the high pressure refrigerant flows in the first row of the plurality of high-pressure side tubes in a first flow direction;
the high pressure refrigerant flows in the second row of the plurality of high-pressure side tubes in a second flow direction, which is opposite from the first flow direction;
the low pressure refrigerant flows in the first row of the plurality of low-pressure side tubes in the first flow direction; and
the low pressure refrigerant flows in the second row of the plurality of low-pressure side tubes in the second flow direction.

* * * * *